(12) United States Patent
Guyatt

(10) Patent No.: US 11,437,796 B2
(45) Date of Patent: Sep. 6, 2022

(54) MOUNTING GUIDE FOR PLACEMENT OF A GANG BOX

(71) Applicant: Brett Palmer Guyatt, Lake Havasu City, AZ (US)

(72) Inventor: Brett Palmer Guyatt, Lake Havasu City, AZ (US)

( * ) Notice: Subject to any disclaimer, the term of this patent is extended or adjusted under 35 U.S.C. 154(b) by 0 days.

(21) Appl. No.: 17/341,975

(22) Filed: Jun. 8, 2021

(65) Prior Publication Data

US 2021/0296873 A1   Sep. 23, 2021

Related U.S. Application Data

(63) Continuation-in-part of application No. 16/926,777, filed on Jul. 13, 2020.
(60) Provisional application No. 62/872,798, filed on Jul. 11, 2019, provisional application No. 62/872,792, filed on Jul. 11, 2019.

(51) Int. Cl.
*H02G 3/00* (2006.01)
*H02G 3/12* (2006.01)
*F16L 3/26* (2006.01)
*F16L 5/00* (2006.01)

(52) U.S. Cl.
CPC ............... *H02G 3/121* (2013.01); *F16L 3/26* (2013.01); *F16L 5/00* (2013.01)

(58) Field of Classification Search
CPC ............. H02G 3/10; H02G 3/121; H02G 3/30
See application file for complete search history.

(56) References Cited

U.S. PATENT DOCUMENTS

| 7,019,211 | B2* | 3/2006 | Rose | H02G 3/08 |
| | | | | 174/54 |
| 2006/0061978 | A1* | 3/2006 | Palermo | H02G 3/14 |
| | | | | 361/807 |
| 2016/0079742 | A1* | 3/2016 | Petak | H02G 3/081 |
| | | | | 248/231.9 |

* cited by examiner

*Primary Examiner* — Pete T Lee
(74) *Attorney, Agent, or Firm* — Jose W. Jimenez; Jimenez Law Firm

(57) ABSTRACT

A mounting rail and gang box member installation system for placing a gang box on a wall structure in a desired horizontal and/or vertical location to accommodate for construction anomalies. The mounting rail and gang box member system includes an elongate mounting rail assembly and any one of an extendable box assembly, slidable bracket assembly or a rail channel structure that in combination with a gang box member and/or mud ring member provide for flexibility in locating and mounting wiring receptacles and wiring devices on a wall structure. Finally, the installation system includes wire or cable fastening configurations that are used in combination with cable ties or zip-ties to secure wires of cables without having to use staples.

20 Claims, 66 Drawing Sheets

20A

Figure 51A
Figure 51B
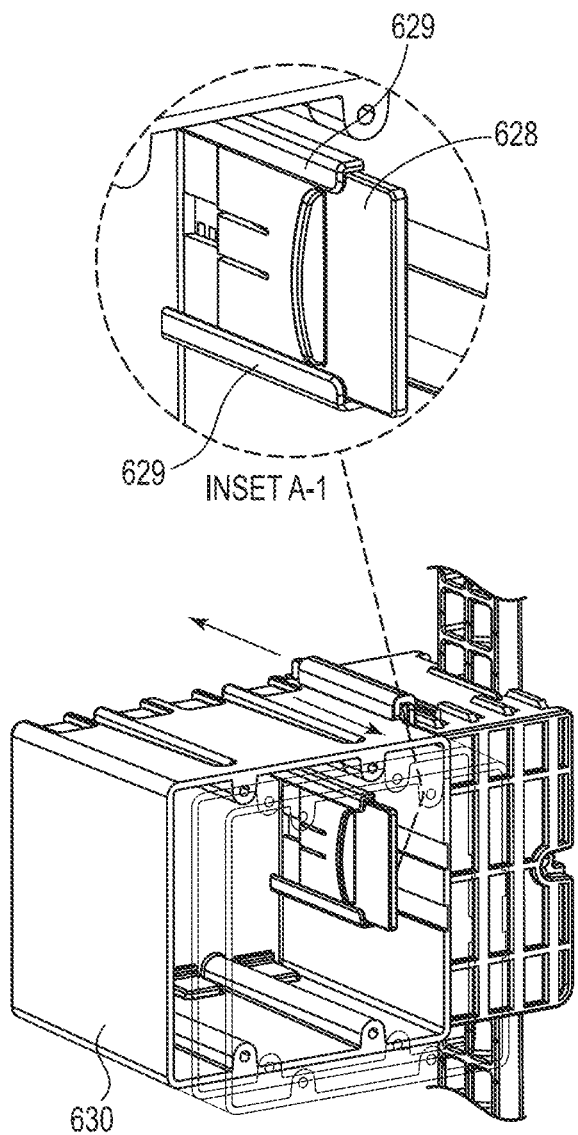
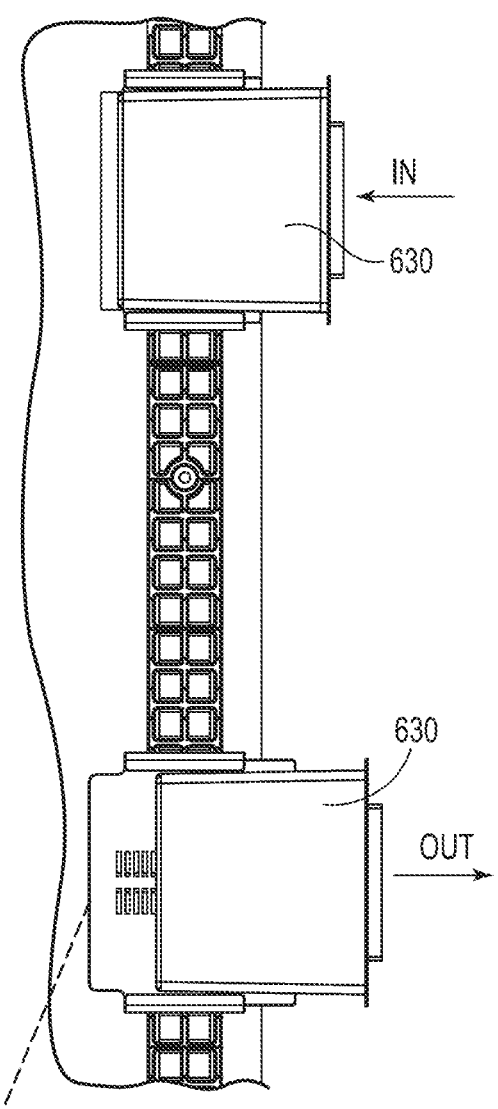
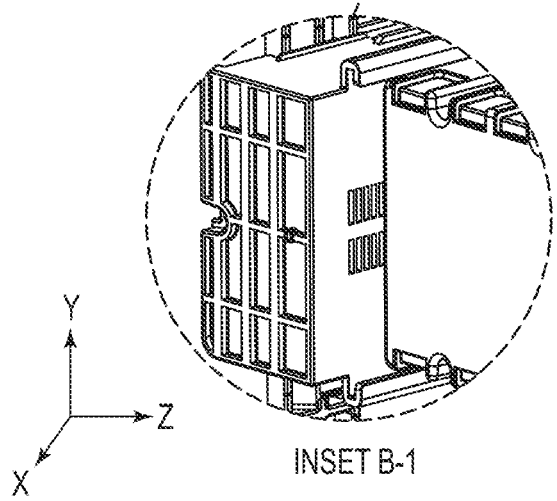

Figure 52A
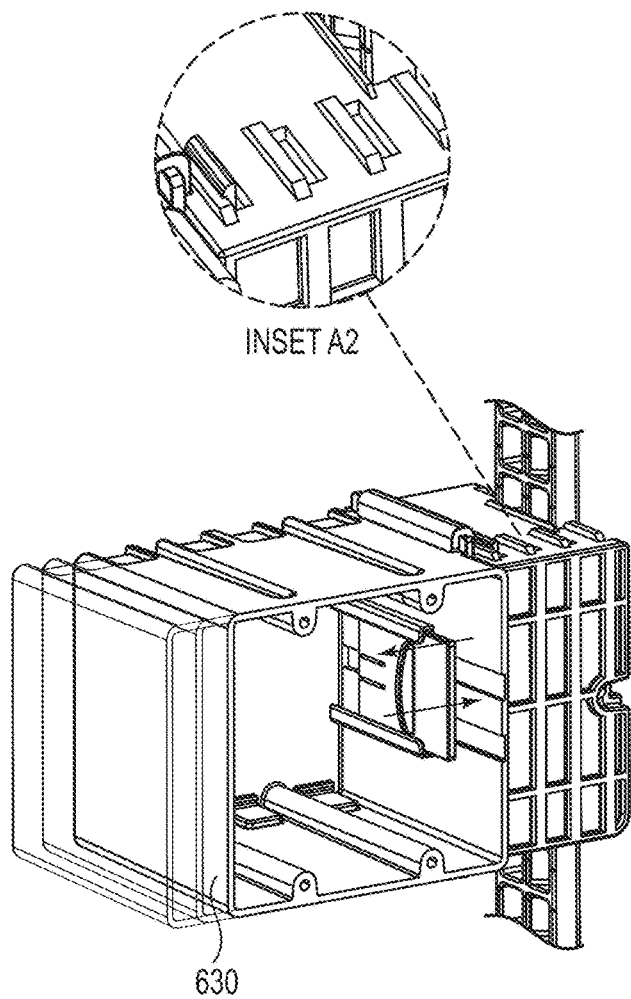
Figure 52B
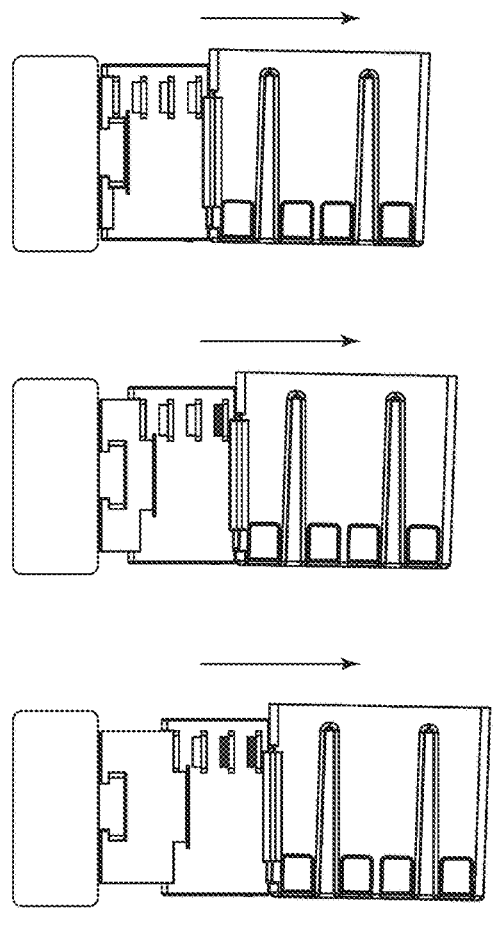
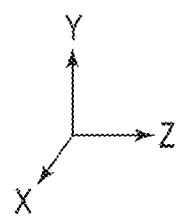

Figure 57A
Figure 57B
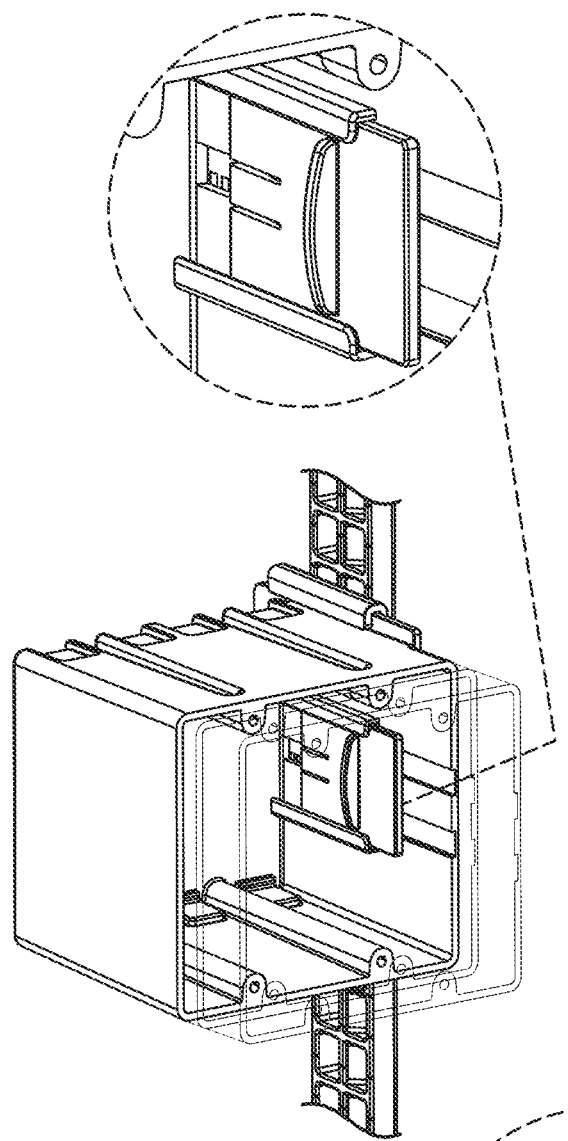
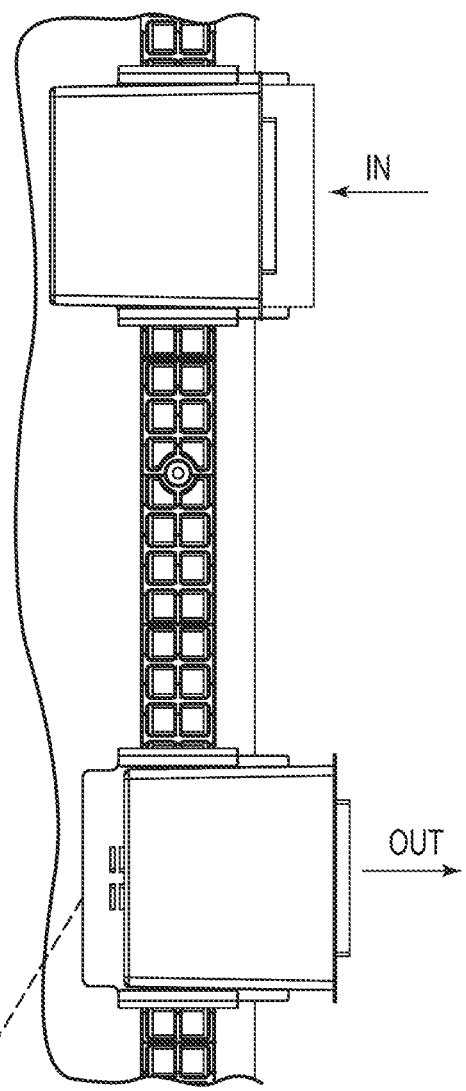
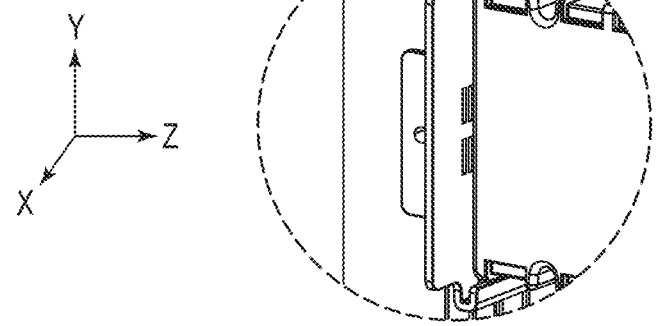

Figure 63A
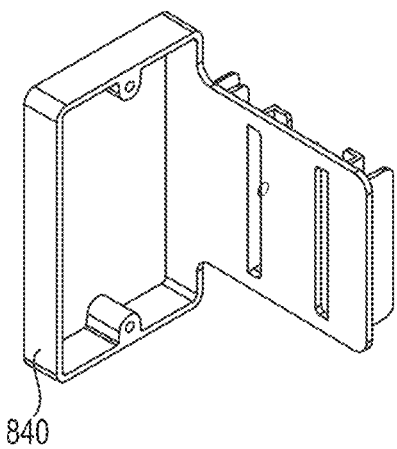
Figure 63F
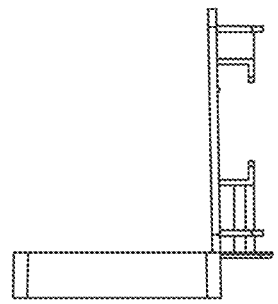
Figure 63D  Figure 63B  Figure 63C
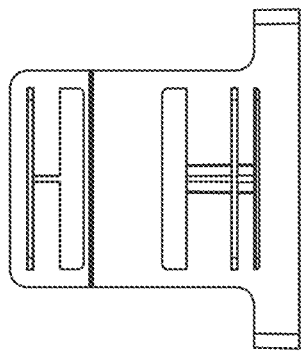 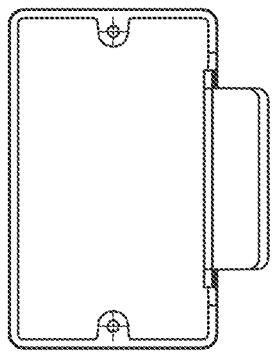 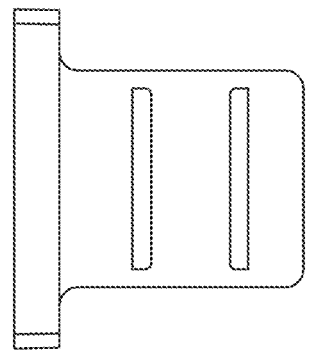
Figure 63E
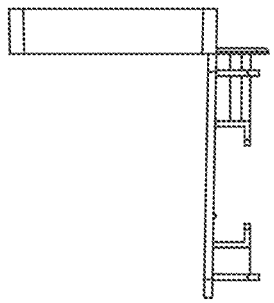

850

Figure 68A
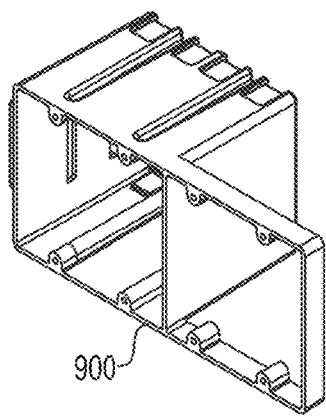
Figure 68F
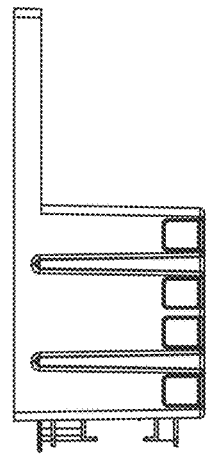
Figure 68C   Figure 68D   Figure 68B
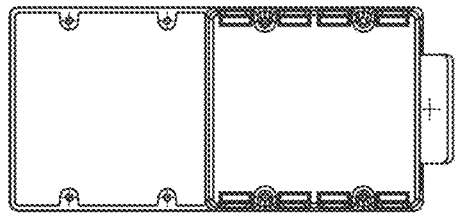 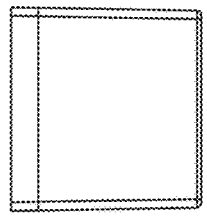 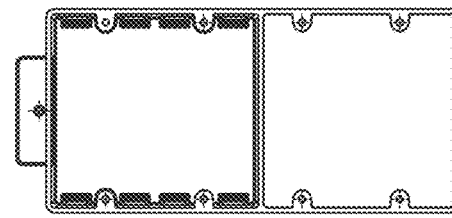
Figure 68E
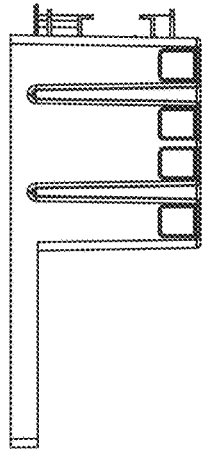

MOUNTING GUIDE FOR PLACEMENT OF A GANG BOX

CLAIM OF PRIORITY

This application is a continuation in part and claims priority to and the benefit of U.S. patent application having Ser. No. 16/926,777 and filed on Jul. 13, 2020, titled Mounting Guide For Placement of A Gang Box. This continuation in part application also claims priority to and the benefit of the following applications: US Provisional Application with Ser. No. 62/872,798 filed on Jul. 11, 2019 entitled Mounting Guide for the Placement of a Gang Box; and US Provisional Application with Ser. No. 62/872,792 filed on Jul. 11, 2019 entitled UNIFORM RECEPTACLE BOX INSTALLATION TOOL, which are all hereby incorporated by reference in their entireties.

FIELD OF THE INVENTION

The inventive concept relates generally to a tool and mounting guide for the placement and support of a gang box for the installation of switches and outlets.

BACKGROUND

Currently, there are a number of solutions for installing gang boxes and other receptacle boxes used in a structure for electrical wiring. One of these solutions attempts to measure out a distance with a tape measure for the placement of a gang box, but this solution fails to meet the needs of the market because the approach is time consuming, and the user may make measuring mistakes. Still another solution seeks to offer gang box installation kits, but this solution also fails to meet market needs because the installation kits do not include proper code measurements and are generally not adjustable. Therefore, there currently exists a need in the market for an apparatus that is a guide for the placement of gang boxes for switches and outlets.

SUMMARY OF THE INVENTION

The inventive concept in one embodiment is a mounting guide for placing a gang box on a wall structure in a predetermined location. An elongate substantially planar vertical frame assembly has a longitudinal axis through a vertical body and has a top, middle and bottom portion, the middle portion formed by a first lateral wall and a second lateral wall protruding laterally from the vertical body, wherein the first and second lateral walls are perpendicular to the longitudinal axis. A laterally extendable box member is designed to be mounted within the middle portion of the vertical frame assembly and is disposed between the top and bottom portions, the extendable box member designed to move laterally away from the vertical body as upper and lower screw members that secure the box member are axially rotated, the upper and lower screw members perpendicular to the longitudinal axis and aligned with the first lateral wall and the second lateral wall. A gang box member is designed to be mounted on a surface of the extendable box member located away from the vertical body, the gang box having an open end forming a plane that is parallel to the longitudinal axis of the vertical frame assembly. One or more hoop or clip assemblies are disposed on the frame assembly designed to secure at least one wire assembly. One or more hole portions are disposed through the frame assembly designed to receive a fastener assembly therethrough.

In one embodiment of the mounting guide for placing a gang box on a wall structure, the one or more loop or clip assemblies are designed to secure the at least one wire assembly with one or more cable tie assemblies.

In one embodiment of the mounting guide for placing a gang box on a wall structure, the one or more loop assemblies or clip assemblies is a metal-clad wiring bundle style wire holder assembly as exemplified by a Romex clip. One of ordinary skill in the art would recognize that other loop or clip assemblies may be used.

In one embodiment of the mounting guide for placing a gang box on a wall structure, the width of the laterally extendable box member is substantially two inches and the laterally extendable box member is designed to move laterally away from the vertical body up to one and a half inches. This measurement is in accord with a common standard for the placement of gang boxes in construction codes. One of ordinary skill in the art would recognize that the mounting guide could be designed to meet other construction codes now or published in the future.

In another embodiment of the inventive concept, a mounting guide for placing a gang box on a wall structure has an elongate, vertical frame assembly having a longitudinal axis with a vertical body with an upper portion and lower portion, a substantially lower horizontal portion substantially perpendicular to the longitudinal axis and extending from a top end of the lower portion of the frame assembly and a substantially perpendicular upper horizontal portion extending from a bottom end of the upper portion of the frame assembly, the upper horizontal portion and the lower horizontal portion extending laterally at a substantially uniform width, an upper face of the lower horizontal portion opposite a lower face of the upper horizontal portion. A middle portion of the frame assembly is disposed between the upper horizontal portion and the lower horizontal portion and parallel and substantially offset or disposed laterally from the upper portion and lower portion of the frame assembly. One or more hoop or clip assemblies is disposed on the frame assembly designed to secure at least one wire assembly. One or more hole portions is disposed through the frame assembly designed to receive a fastener assembly therethrough.

In one embodiment of the mounting guide for placing a gang box on a wall structure, a substantially horizontally planar foot portion is coupled to a bottom end of the lower portion of the frame assembly, the frame assembly designed to rest on the foot portion when the foot portion is disposed on a surface, the lower portion extending upward from the foot portion a predetermined height for the placement of the gang box between the upper horizontal portion and the lower horizontal portion of the frame assembly.

In one embodiment of the mounting guide for placing a gang box on a wall structure, the lower portion of the frame assembly is substantially ten inches in height. In another embodiment of the mounting guide for placing a gang box on a wall structure, the upper portion of the frame assembly is substantially eight inches or substantially twenty inches in height. One of ordinary skill in the art would recognize that other measurements for the frame assembly could be used and specified.

In one embodiment of the mounting guide for placing a gang box on a wall structure, one or more loop or clip assemblies are spaced substantially six inches from the top end of the lower portion of the frame assembly or the bottom end of the upper portion of the frame assembly. One of ordinary skill in the art would recognize that other measurements for the loop or clip spacing could be used and specified.

In one embodiment of the mounting guide for placing a gang box on a wall structure, the substantially perpendicular lower horizontal portion extending from the top end of the lower portion of the frame assembly and the substantially perpendicular upper horizontal portion extending from the bottom end of the upper portion of the frame assembly, the upper horizontal portion and the lower horizontal portion extending laterally a substantially uniform width, are configured to enable the securing of the gang box to the frame assembly.

In one embodiment of the mounting guide for placing a gang box on a wall structure, the spacing between the substantially perpendicular lower horizontal portion and the substantially perpendicular upper horizontal portion is substantially equal to the vertical height of the mounted gang box assembly, the perpendicular lower horizontal portion and the perpendicular upper horizontal portion designed to couple substantially contiguously to a bottom portion of the gang box assembly and a top portion of the gang box assembly to hold the gang box assembly substantially in place.

In one embodiment of the mounting guide for placing a gang box on a wall structure, at least one clip and hook assembly is coupled to the lower horizontal portion and the upper horizontal portion of the frame assembly and designed to secure the gang box assembly, the gang box assembly held substantially in place by the lower horizontal portion and the upper horizontal portion.

In one embodiment of the mounting guide for placing a gang box on a wall structure, one or more protrusions are disposed on the upper face of the lower horizontal portion of the frame assembly and the lower face of the upper horizontal portion of the frame assembly and designed to prevent the gang box assembly from sliding outward from the lower horizontal portion and the upper horizontal portion of the frame assembly by coupling to corresponding groove portions of the gang box assembly. One of ordinary skill in the art would recognize that friction may be at least partially employed in holding the gang box in place.

In one embodiment of the inventive concept, a method for placing a gang box on a wall structure includes mounting to a surface an elongate substantially planar vertical frame assembly having a longitudinal axis through a vertical body and having a top, middle, and bottom portion, the middle portion formed by a first lateral wall and a second lateral wall protruding laterally from the vertical body, wherein the first and second lateral walls are perpendicular to the longitudinal axis. This method further involves disposing one or more fastener assemblies through one or more hole portions of the vertical frame assembly to secure the vertical frame assembly to the surface. This exemplary method further involves laterally extending a predetermined distance an extendable box member disposed between the top and bottom portions of the frame assembly. This exemplary method further involves positioning a gang box member mounted on a surface of the extendable box member, the box member located away from the vertical body, the gang box having an open end forming a plane that is parallel to the longitudinal axis of the vertical frame assembly, the gang box positioned in a predetermined location as measured by extending the box member. One of ordinary skill in the art would recognize that the predetermined locations are typically set to meet construction codes.

One embodiment of the method for placing a gang box on a wall structure involves the extendable box member being moved laterally away from the vertical body by axially rotating an upper screw member and a lower screw member disposed perpendicularly to the longitudinal axis of the frame assembly and aligned with the first lateral wall and the second lateral wall.

One embodiment of the method for placing a gang box on a wall structure involves the laterally extendable box member being substantially two inches in width and being laterally extended up to one and a half inches from the vertical body.

One embodiment of the method for placing a gang box on a wall structure involves one or more cable tie assemblies being used to attach at least one wire assembly to at least one loop or clip assembly on the vertical frame assembly. One of ordinary skill in the art would recognize that many types of wire could be used.

In another embodiment of the mounting guide for placing a gang box on a wall structure, an elongate, horizontal frame assembly has a longitudinal axis with a horizontal body with a proximal portion and distal portion, a substantially proximal vertical portion substantially perpendicular to the longitudinal axis and extending from a distal end of the proximal portion of the frame assembly and a substantially perpendicular distal vertical portion extending from a proximal end of the distal portion of the frame assembly, the distal vertical portion and the proximal vertical portion extending laterally at a substantially uniform width, a distal face of the proximal vertical portion opposite a proximal face of the distal vertical portion. A middle portion of the frame assembly is disposed between the distal vertical portion and the proximal vertical portion and parallel and substantially offset or disposed laterally from the distal portion and proximal portion of the frame assembly. One or more hoop or clip assemblies is disposed on the frame assembly designed to secure at least one wire assembly. One or more hole portions is disposed through the frame assembly designed to receive a fastener assembly therethrough. One of ordinary skill in the art would recognize that this embodiment provides a horizontal orientation for the inventive concept. In this embodiment, a support attachment may be used to mount a gang box to the inventive concept to reflect the downward pull of gravity on the gang box when the inventive concept is in a horizontal orientation.

In one embodiment of the mounting guide for placing a gang box on a wall structure, this embodiment also being a horizontally oriented embodiment of the inventive concept, a paddle fan box or other type of box holding electrical wires may be attached to the frame assembly.

A gang box is a metal or plastic box used to securely hold electrical components. In electrical work, a gang box is a metal or polymer box used to securely hold electrical components. One of ordinary skill in the art would recognize many types of gang boxes such as a round box for ceiling light fixtures, smoke alarms, carbon monoxide detectors and wall sconce light fixtures, a single-gang box for a typical outlet or switch, and a double-gang box for two light switches together in the same box, or two duplex receptacle outlets. Boxes may go by other names such as vanity boxes and pancake boxes. Gang boxes may also be 3-gang boxes, 4-gang boxes, 5-gang boxes and possibly other numerical variations. The inventive concept may be designed to fit these or other metal or polymer boxes for containing at least one wire assembly.

In electrical work, a gang box is a metal or plastic box used to securely hold electrical components and may be termed a receptacle because the gang box serves as a receptacle for electrical components.

There may be provided within the inventive concept a wire spacing and bracing management system for use in residential and commercial construction that reduces installation time while meeting code regulations for electrical installations. It would be advantageous to have a mounting guide for placing a gang box on a wall structure that is adjustable and easily configurable to accommodate the existing structure. A wall structure may also be a support structure. Furthermore, it would also be advantageous to have a mounting guide for placing a gang box on a wall structure that is easily mountable, removable, and durable should it need to be moved.

A fastener for the embodiments herein is a hardware component that mechanically joins or affixes two or more objects together. In general, fasteners are used to create non-permanent joints that can be removed or dismantled without damaging the joining components. Fasteners may be made of steel, substantially stainless steel, carbon steel, or alloy steel as might be a nail, screw, nut and bolt, pin, snap-fastener, or other components. One of ordinary skill in the art would recognize alternative methods of joining materials that could be used for the inventive concept, including crimping, welding, soldering, brazing, taping, gluing, cementing, or the use of other adhesives.

A cable tie is a type of fastener for holding items together, primarily electrical cables or wires. Because of their low cost and ease of use, cable ties are ubiquitous, finding use in a wide range of other applications. A zip tie is a type of cable tie.

One embodiment of the mounting guide for placing a gang box has the mounting configured to aid in the placement and mounting of a gang box for a switch or outlet. The guide, an extendable box member, is generally configured to allow a user to install gang boxes at the proper spacing adjacent to door jambs and onto a stud. The guide may include an adjustable mounting portion configured for extension in a direction outward and opposite the placement from a distance of approximately two (2) inches to three and one-half (3½) inches. The mounting portion in this embodiment includes an adjustment screw to generally adjust the extension of the mounting portion. One of ordinary skill in the art would recognize that other items may be used beside adjustment screws to effect the extension and retraction of the box member, for illustration, a rail member with notches set at predetermined distances. The inventive concept in this embodiment is provided in a symmetrical assembly and configured to work on either the left side or the right side of the stud the device is placed upon.

The mounting portion of the mounting guide for placing a gang box further may include nail slots allowing a user to apply the gang box to the laterally extendable box. The mounting guide for placing a gang box may be configured for the installation and attachment of single, double, triple, and other sizes of gang boxes. A pair of opposed ends of the mounting guide for placing a gang box include an aperture for the placement of a fastener to allow for attachment of the mounting guide for placing a gang box to the stud. These ends further include a plurality of loops to allow for the fastening of wire, such as has a clip suitable for a metal clad wiring bundles as illustrated by Romex style wire holders secured by zip ties.

It would be advantageous to have a mounting guide for placing a gang box that is a guide for installing a gang box in a desired position. Furthermore, it would be advantageous to have a mounting guide for placing a gang box that provides at least one nail slot for installing the gang box. Still further, it would be advantageous to have a mounting guide for placing a gang box that offers hoops to allow for the fastening, preferably through a zip tie, of the associated wires for installation.

The inventive concept advantageously fills the aforementioned deficiencies by providing a mounting guide for gang box placement, which provides a guide and holder for the gang box during installation. The inventive concept fulfills the need for users to follow installation or construction codes. Among other things, it is an advantage of the inventive concept to provide a mounting gang box guide for switches and outlet placement that does not suffer from problems or deficiencies associated with prior solutions. It is still further an advantage of the inventive concept to work for single and multi-gang boxes. Still further, the inventive concept may have an extendable guide configured to adjust the distance between the gang box and door jamb/stud during installation.

In one embodiment of the inventive concept, a mounting guide for placing a gang box is generally provided in a short version and a tall version, generally providing a pair of predetermined heights for the placement of the receptacle box. The mounting guide for placing a gang box in this embodiment includes a first end having a foot configured to offer resting support for the inventive concept on a floor surface. A second end extends a height opposite the first end and culminates in a position generally parallel and co-planar to the first end. The mounting guide for placing a gang box in this embodiment may have a receptacle securing portion generally positioned at the predetermined height for the installation of the receptacle and configured to enable the securing of the receptacle to the device. Preferably, the receptacle securing portion is configured by a jog or lateral extension of the mounting guide for placing a gang box wherein the mounting guide for placing a gang box extends perpendicular to the first end at a first height and extends a width, generally corresponding to the width of a receptacle, extends parallel to the first end to a second height, generally corresponding to the height of the receptacle to form the middle portion of the vertical frame assembly, and returns perpendicularly back a width parallel to the first jog, and then extends coplanar with the first end and culminating in the second end, wherein the device may, in this embodiment, be comprised of a single molded device having a shape for the securing of the receptacle as described in previous embodiments. A second end in this embodiment includes an aperture for the placement of a fastener such as a nail centrally located on the second end and configured to allow the mounting guide for placing a gang box to be secured adjacent to a stud. Along the mounting guide for placing a gang box height in this embodiment of the mounting guide for placing a gang box, a plurality of loops and clips are enabled to secure wires to the device after or prior to placement into the receptacle. Preferably, the short version has a clip suitable for a metal clad wiring bundle such as Romex style wire holders, and the tall version contains loops for securing wiring. The receptacle portion generally receives the receptacle by clipping to a nail of the receptacle or through a friction fit. The receptacle portion may be provided in an assembly for a single box receptacle or multiple box assembly.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 51A and 51B illustrate perspective and side views, respectively, of the Z-direction (in and out away from the stud) adjustability of the gang box member on the rail mounting system.

FIGS. 52A and 52B illustrate perspective and side views, respectively, of the X-direction (laterally outward away from the wall stud) adjustability of the gang box member on the rail mounting system.

FIGS. 57A and 57B illustrate perspective and side views of the two-way Z-direction adjustability of the gang box assembly on the mounting rail.

FIGS. 63A-63F illustrate perspective, front, right and left side, top and bottom views of a single gang mud ring device used with the mounting rail system.

FIGS. 68A-68F illustrate perspective, front, right and left side, top and bottom views of a two-gang box and two-mud ring device used with the mounting rail system.

DETAILED DESCRIPTION OF THE INVENTION

Figure 1:
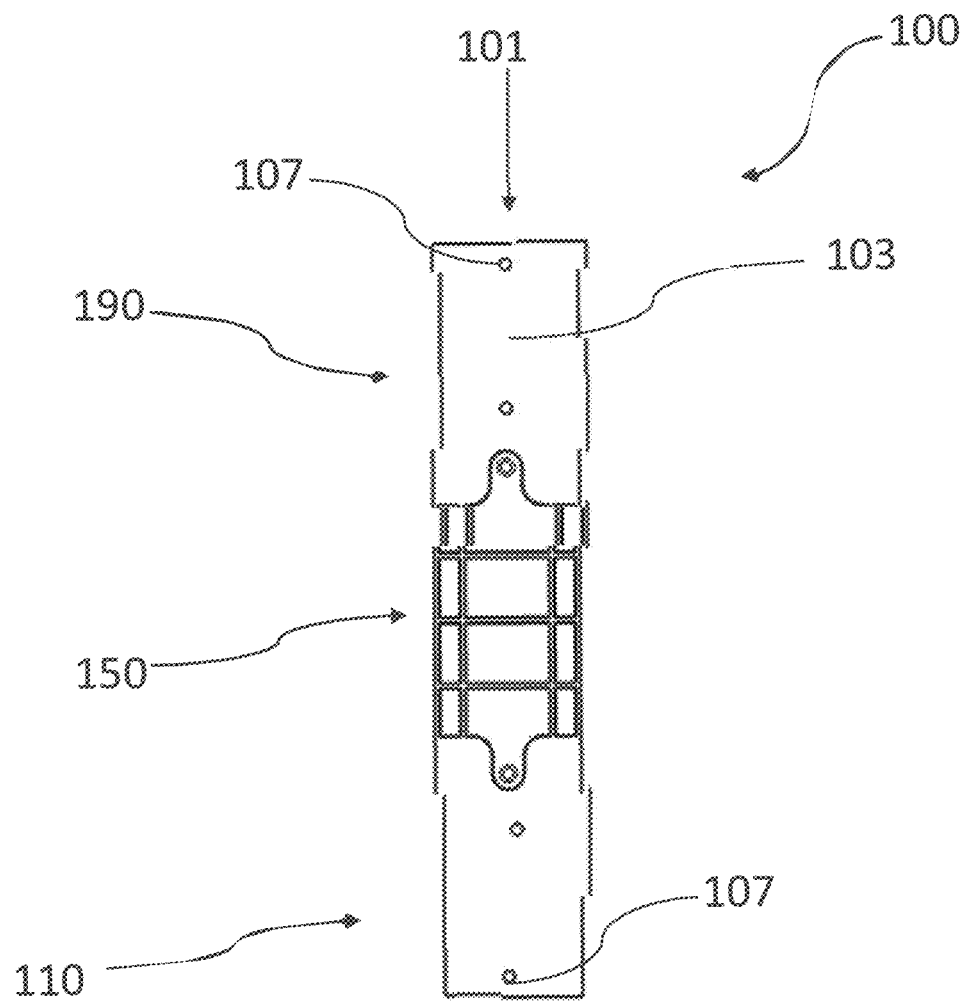
FIG. 1 illustrates a rear view of a mounting guide for placing a gang box with the laterally extendable box member.
Figure 2:
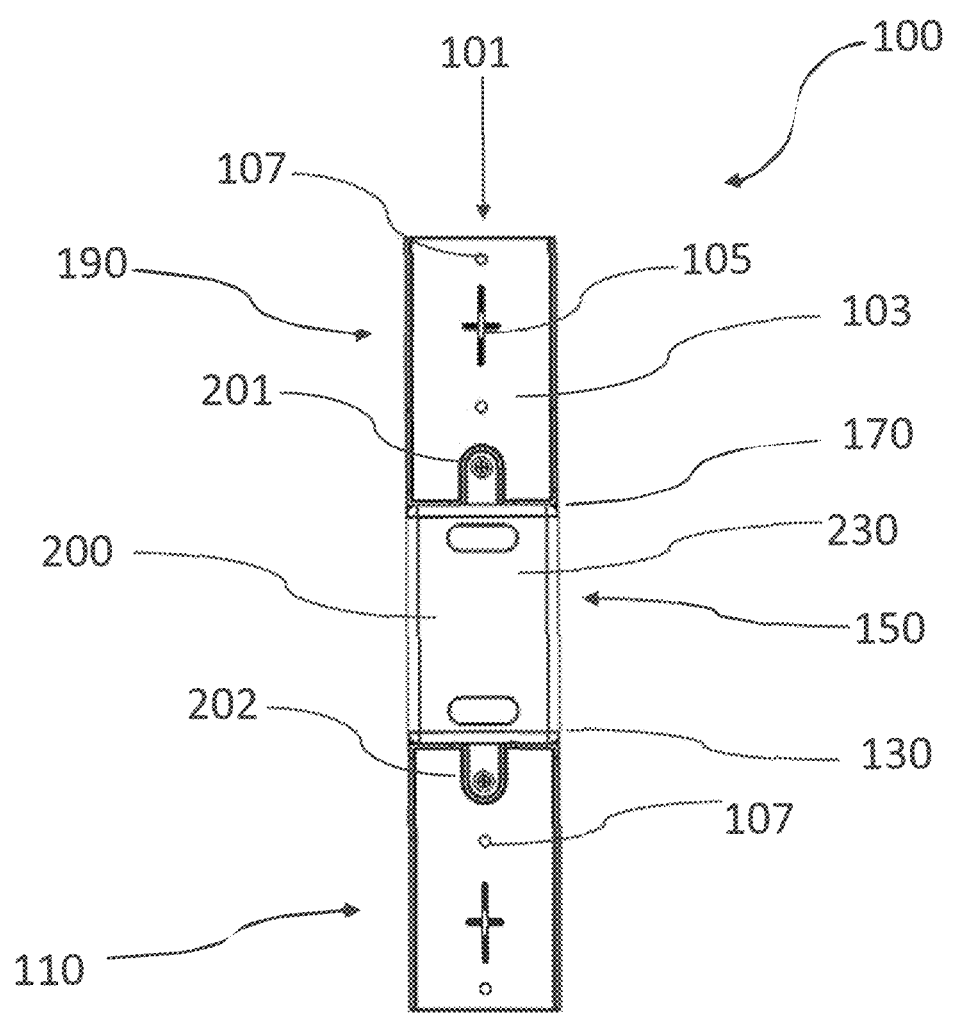
FIG. 2 illustrates a front view of the mounting guide for placing a gang box with the laterally extendable box member.
Figure 3:
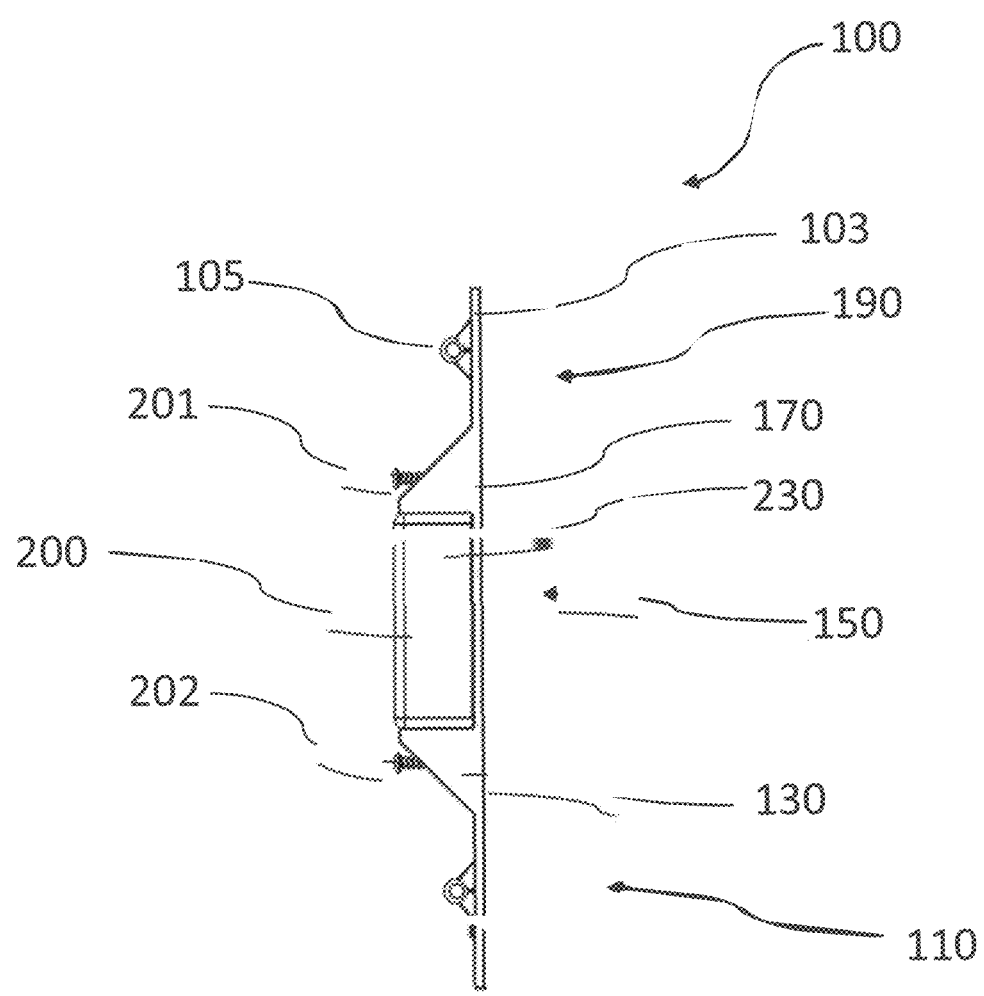
FIG. 3 illustrates the left side view of the mounting guide for placing a gang box with the laterally extendable box member.
Figure 4:
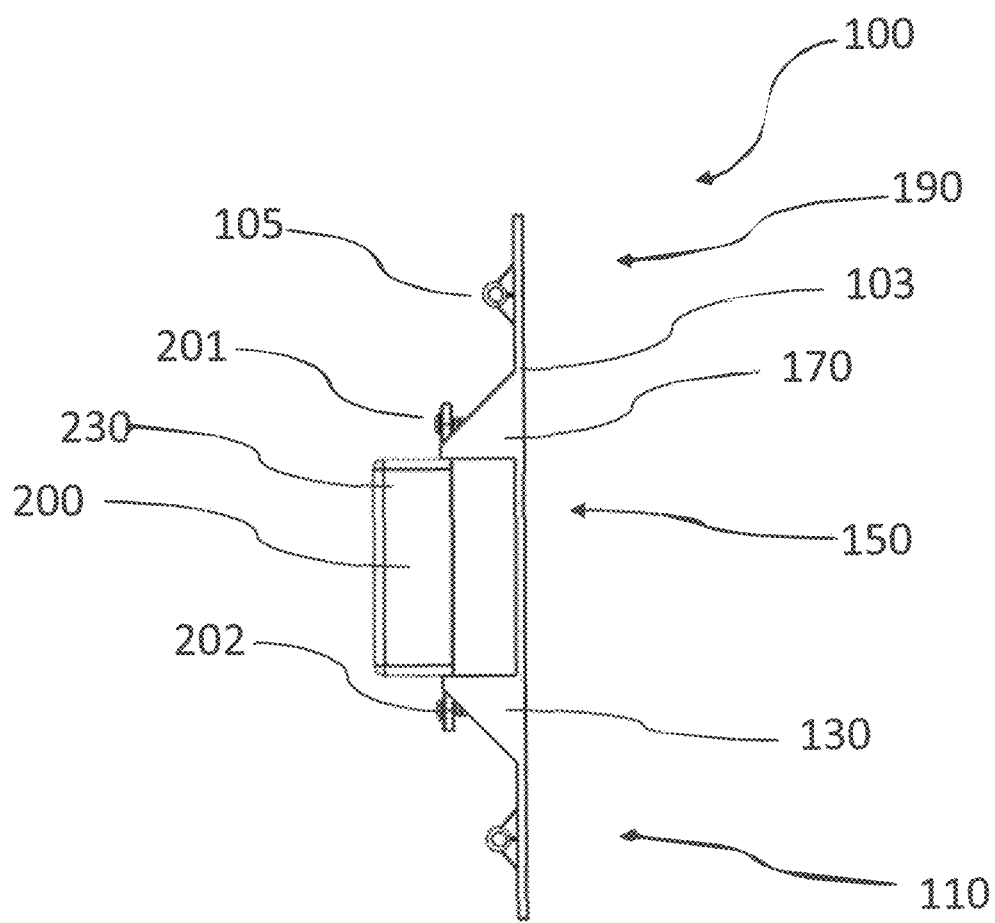
FIG. 4 illustrates the left side view of the mounting guide for placing a gang box with the laterally extendable box member in an extended position.
Figure 5:
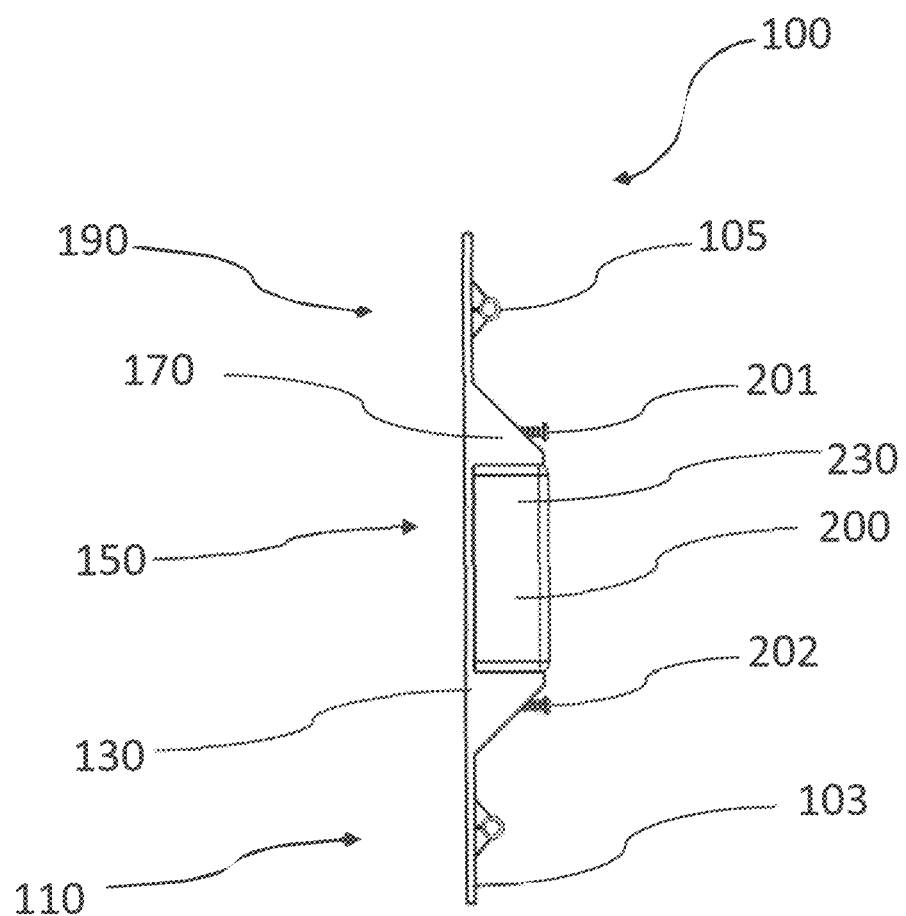
FIG. 5 illustrates the right side view of the mounting guide for placing a gang box with the laterally extendable box member.
Figure 6:
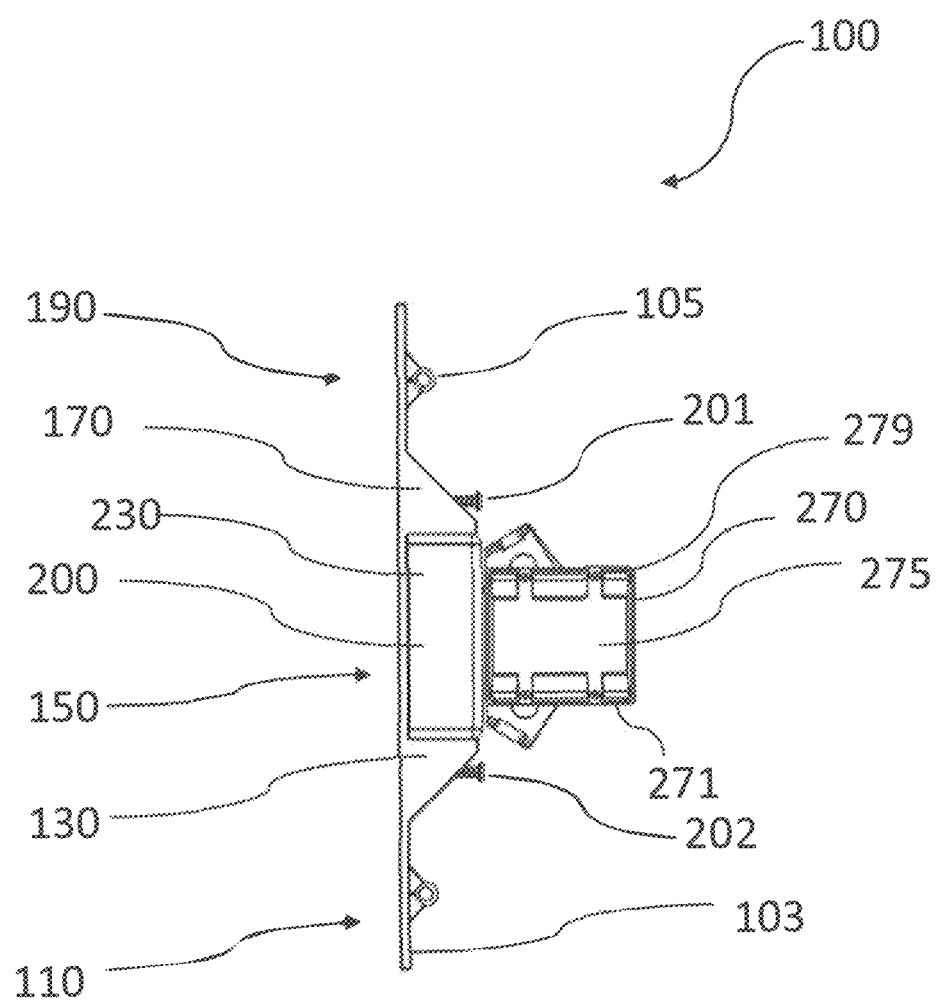
FIG. 6 illustrates the right side view of the mounting guide for placing a gang box with the laterally extendable box member with a gang box.
Figure 7:
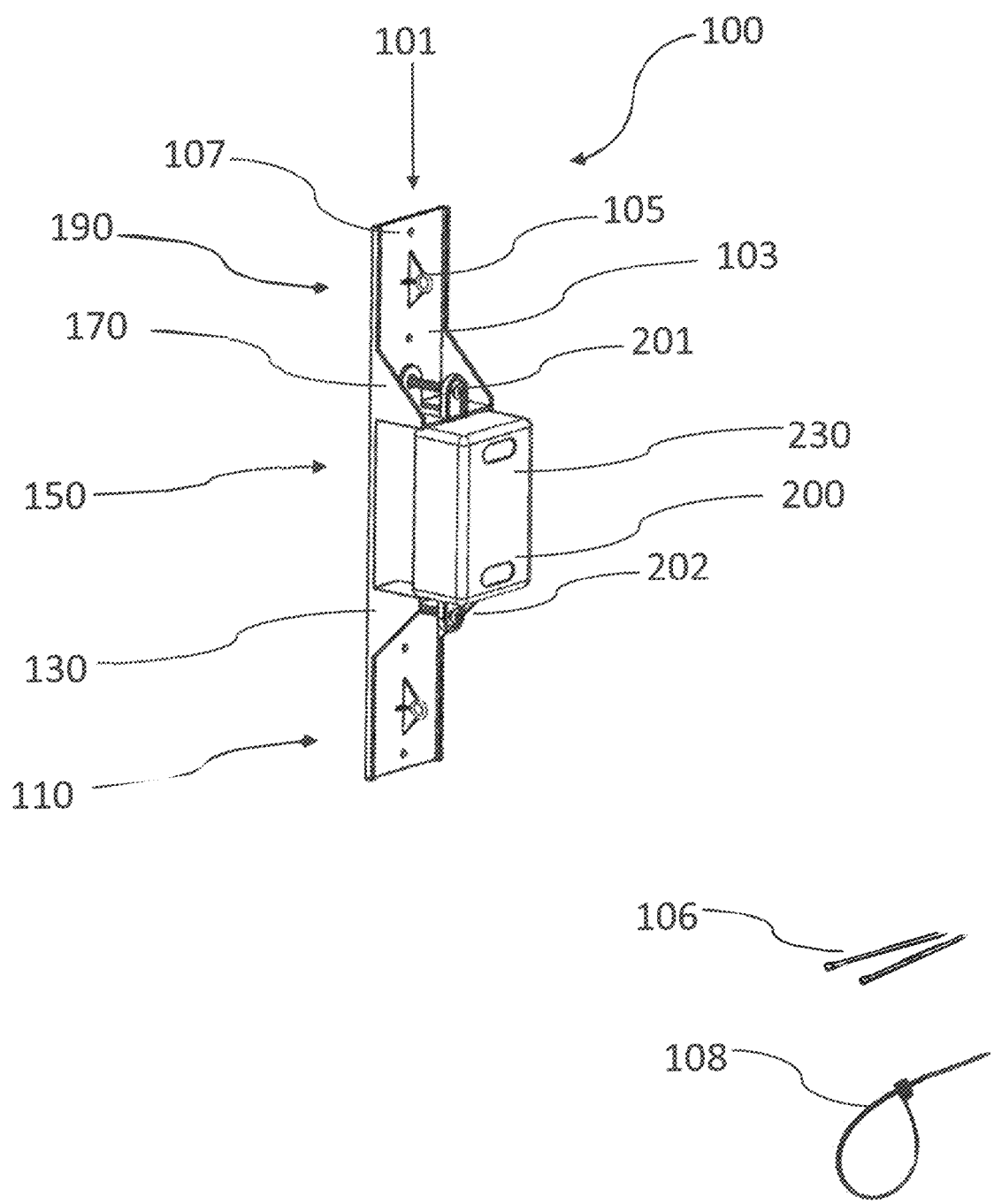
FIG. 7 illustrates a perspective view of the mounting guide for placing a gang box with the laterally extendable box member when in an extended position along with fastener and cable tie assemblies.
Figure 8:
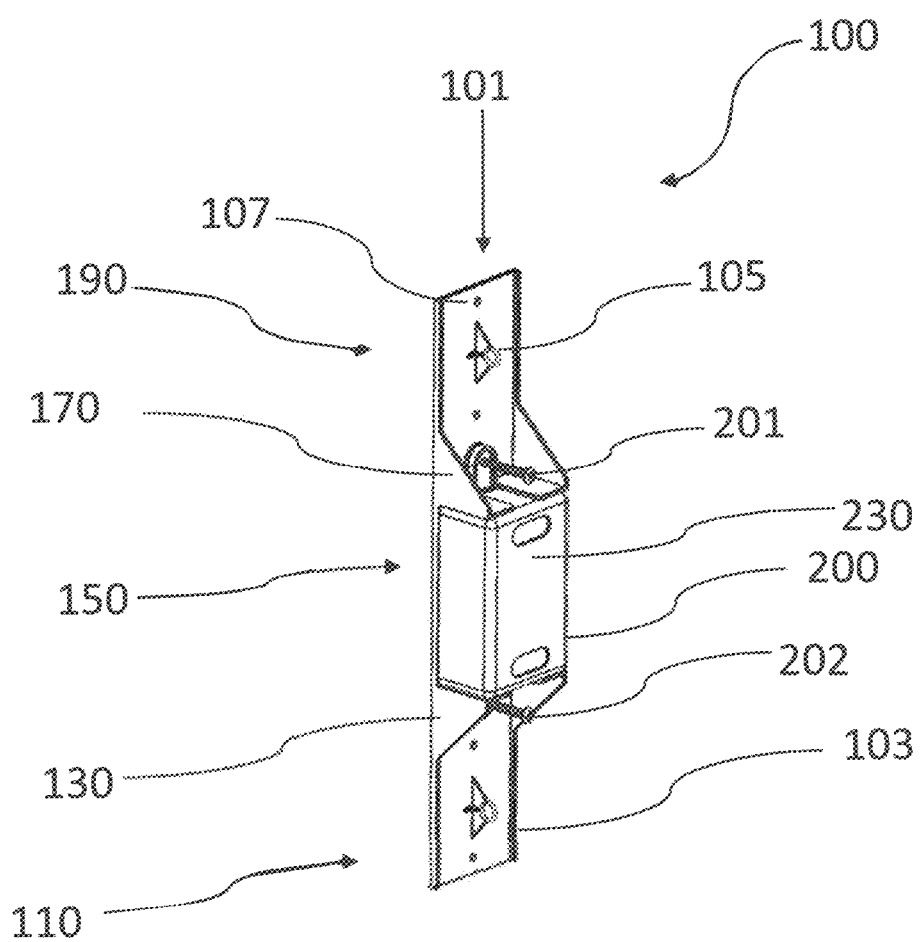
FIG. 8 illustrates a perspective view of the mounting guide for placing a gang box.
Figure 9:
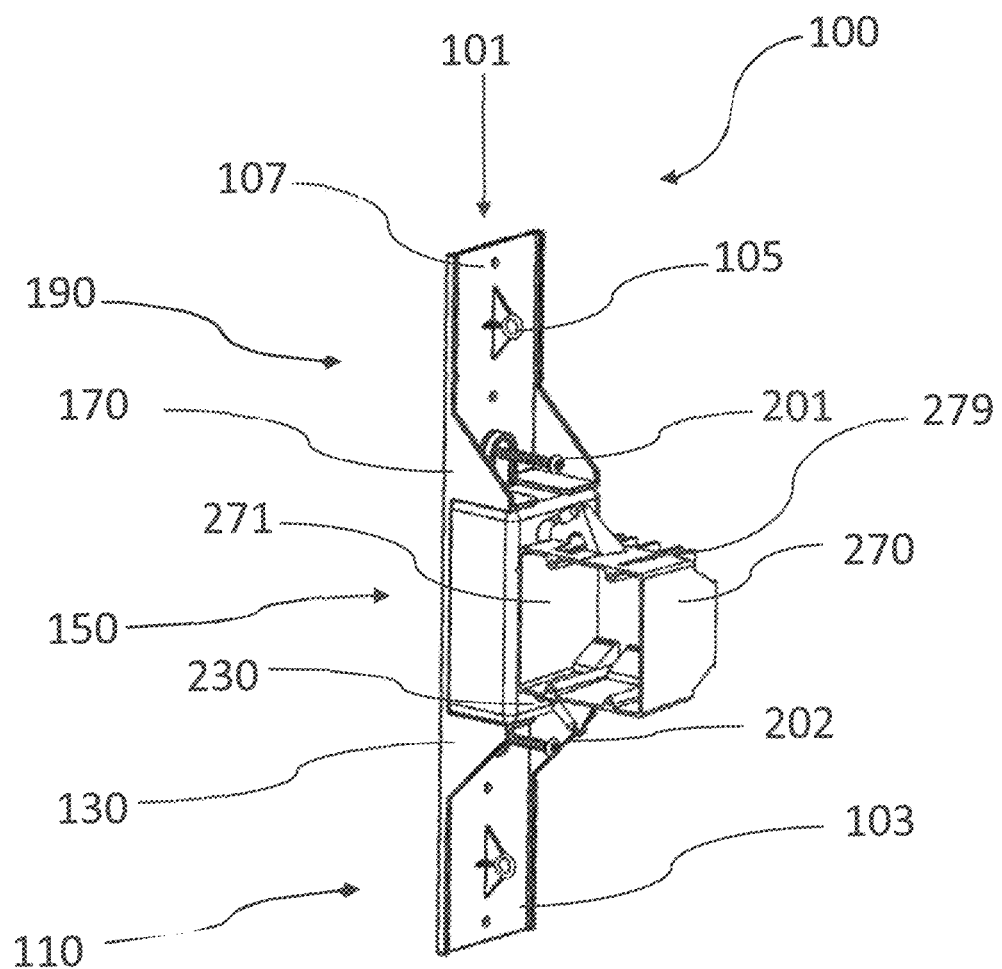
FIG. 9 illustrates a perspective view of the mounting guide for placing a gang box with the laterally extendable box member with a gang box.
Figure 10:
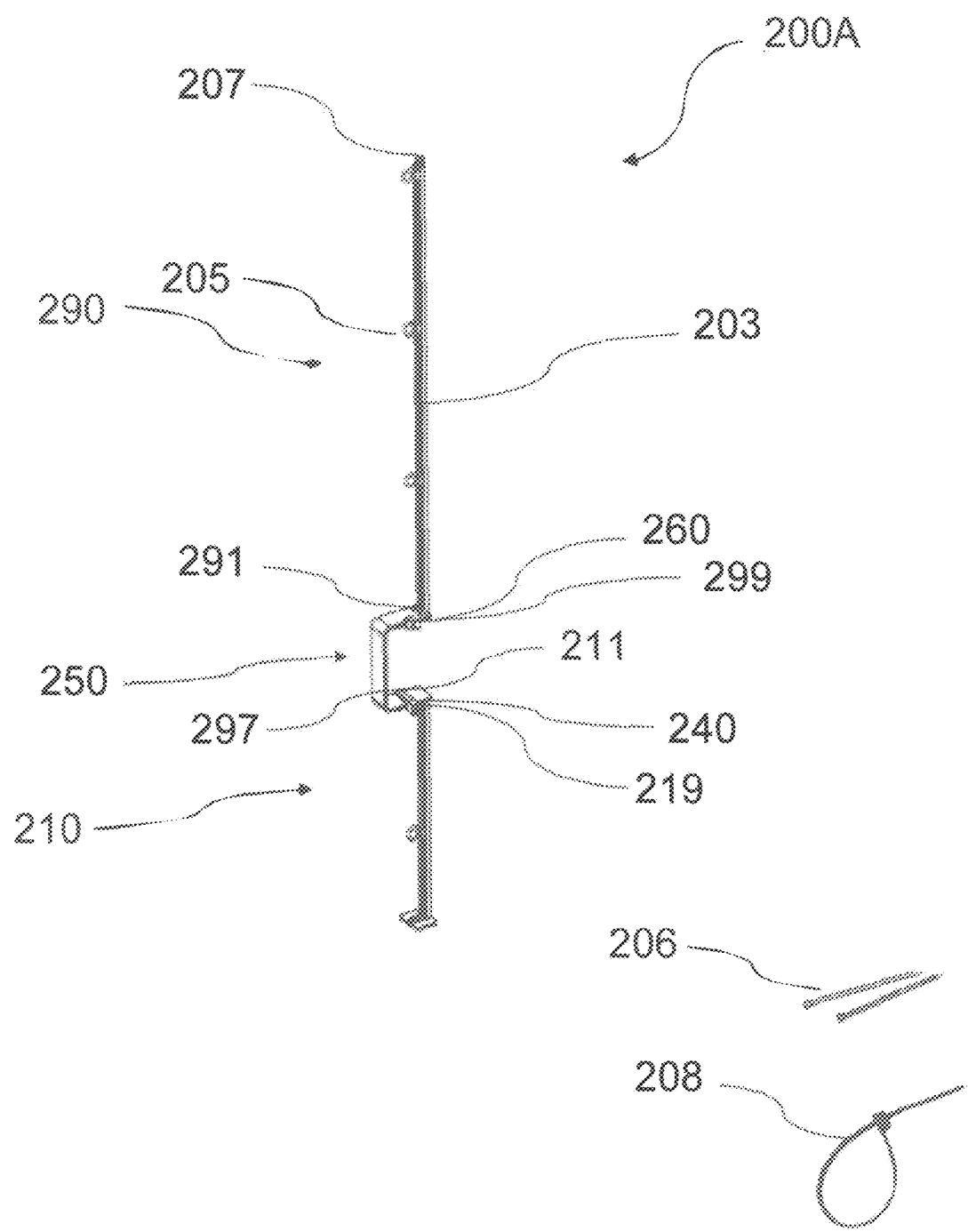
FIG. 10 illustrates a perspective view of another embodiment of a mounting guide for placing a gang box along with fastener and cable tie assemblies which has a tall elongate configuration designed for location on an upright stud member.
Figure 11:
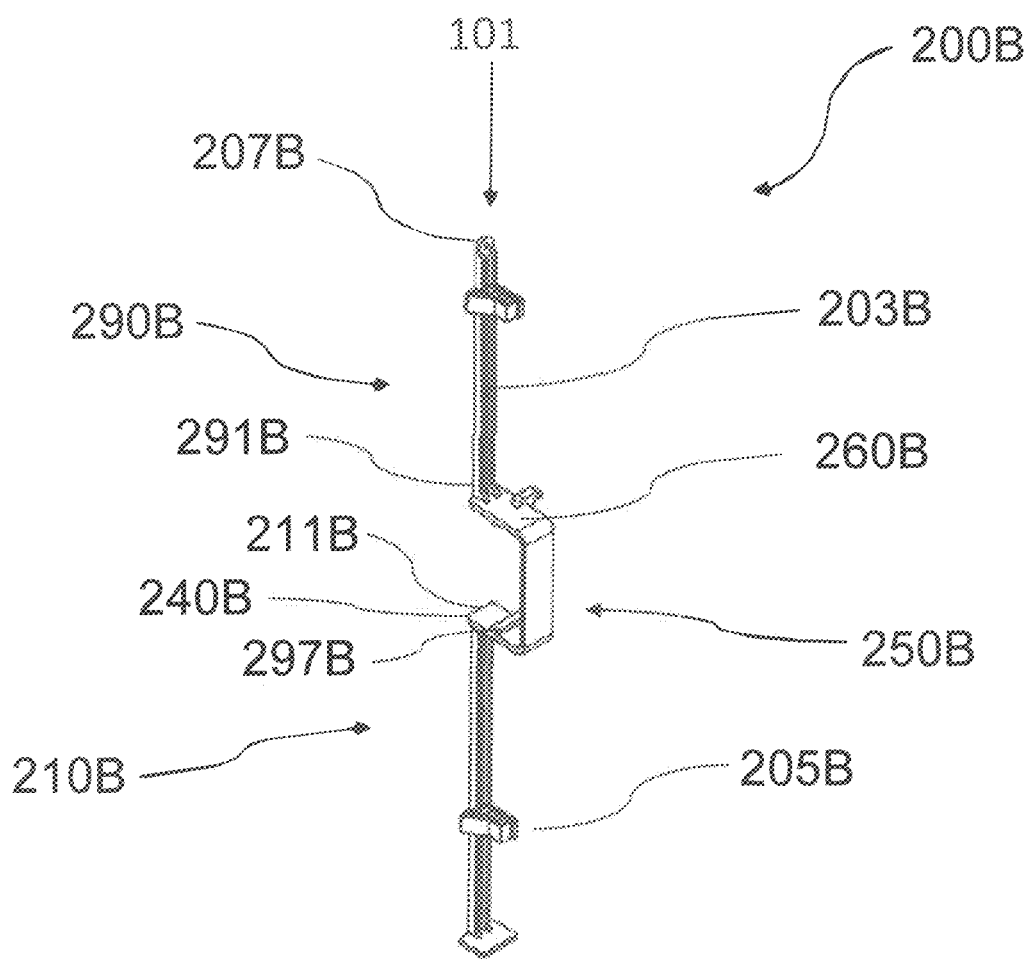
FIG. 11 illustrates a perspective view of yet another embodiment of a mounting guide for placing a gang box which has a shorter elongate configuration designed for location on an upright stud member.
Figure 12:
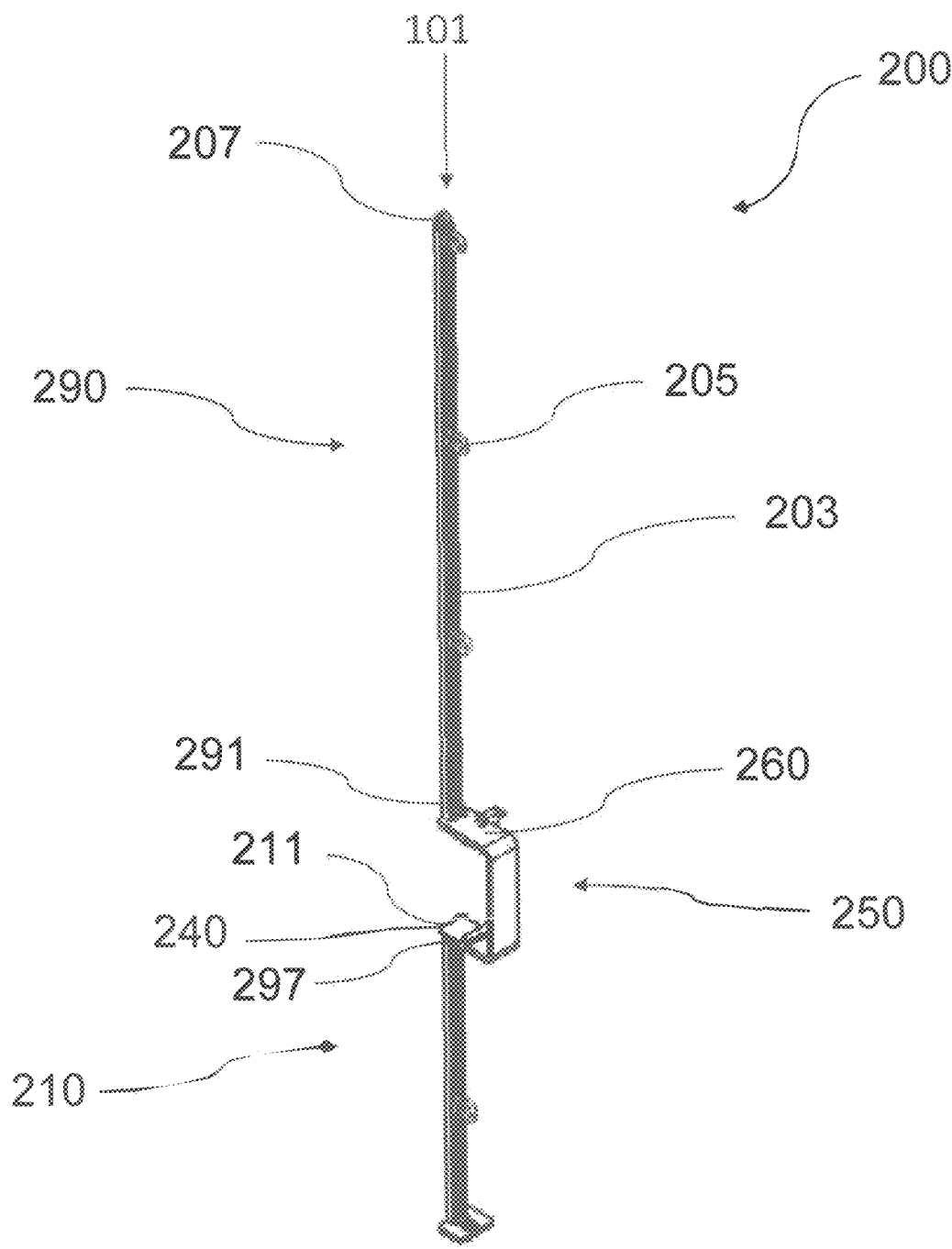
FIG. 12 illustrates a second perspective view of the tall elongate mounting guide for placing a gang box.
Figure 13:
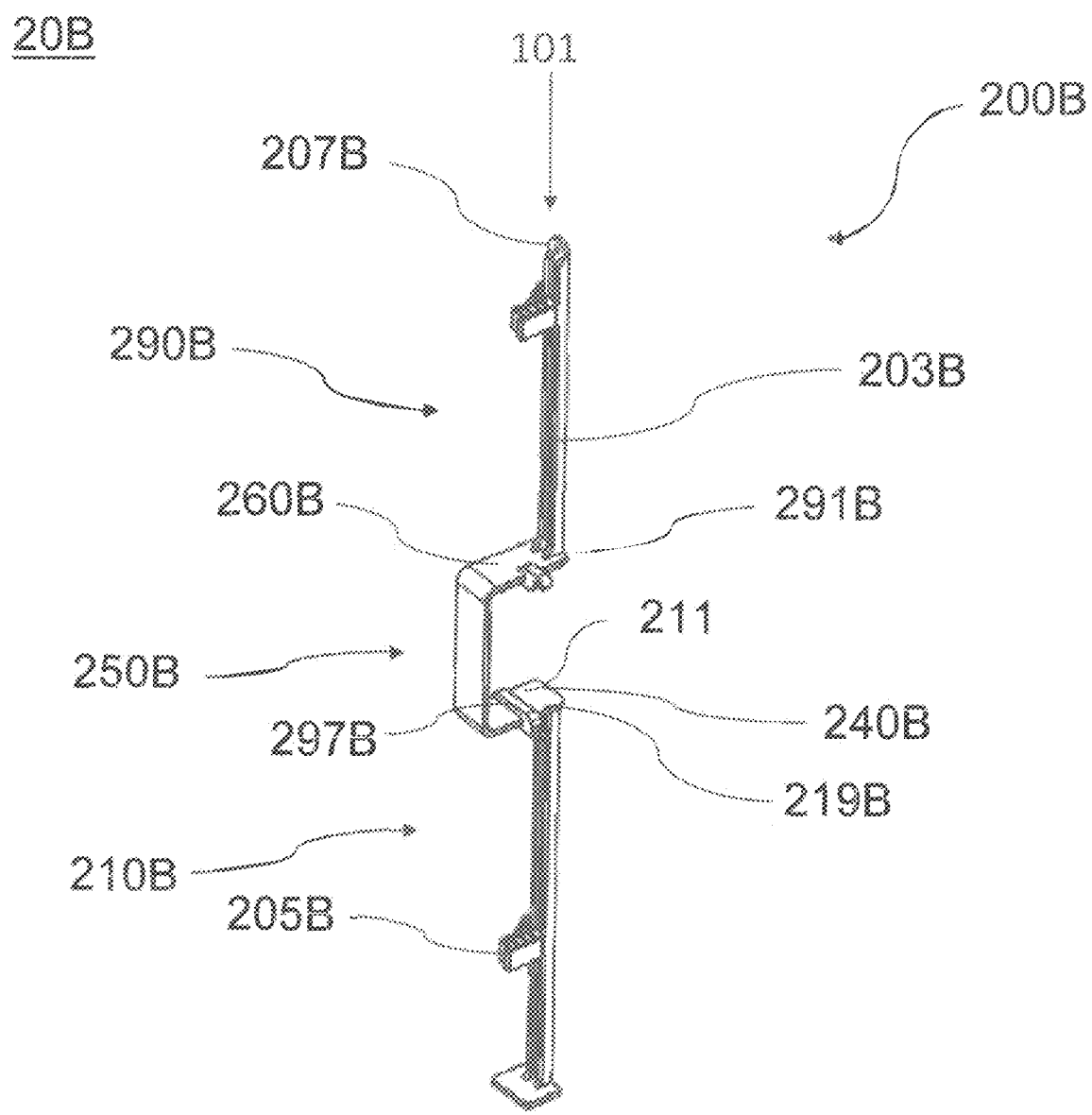
FIG. 13 illustrates a second perspective view of the short elongate mounting guide for placing a gang box when shorter.
Figure 14:
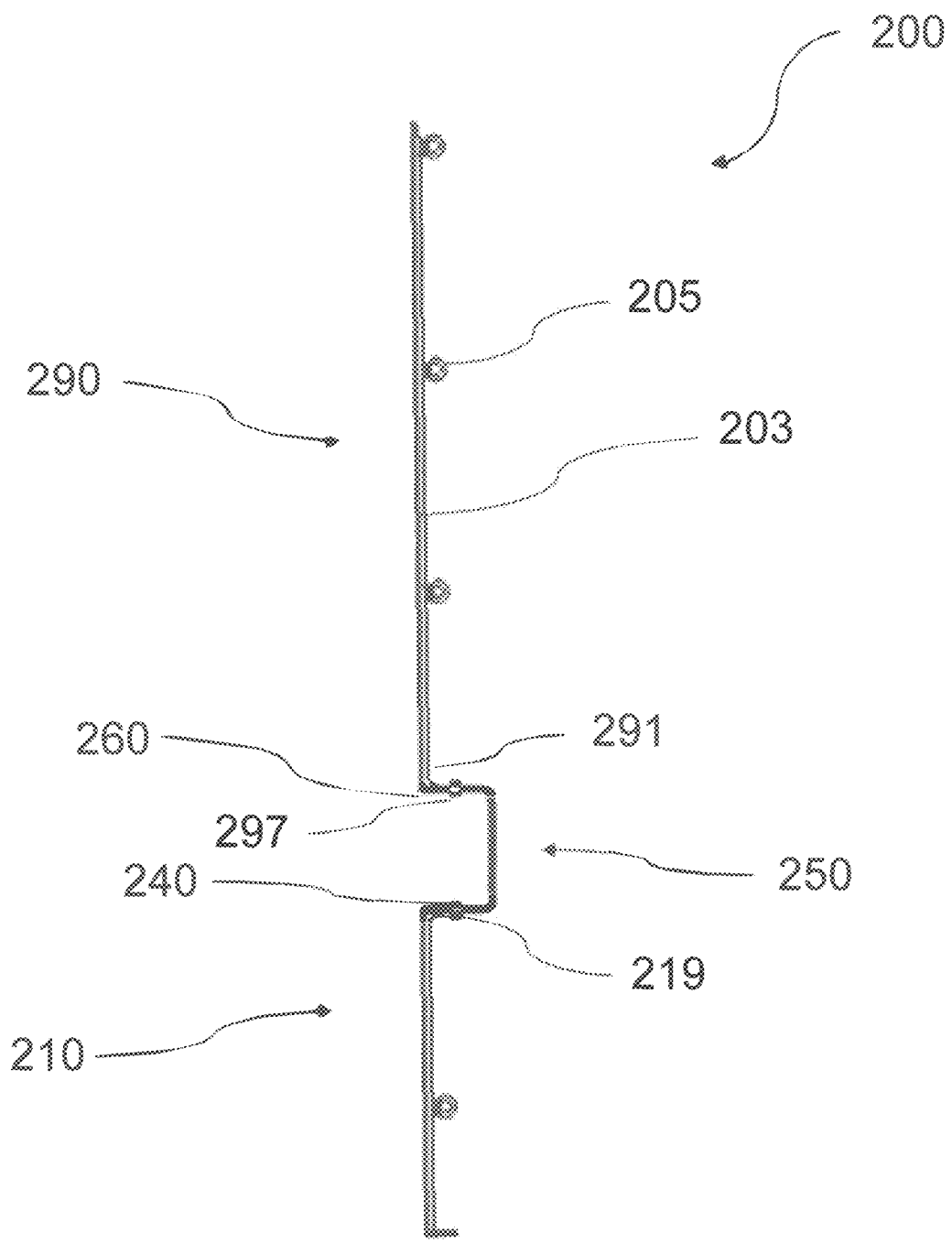
FIG. 14 illustrates a rear view of the tall mounting guide for placing a gang box.
Figure 15:
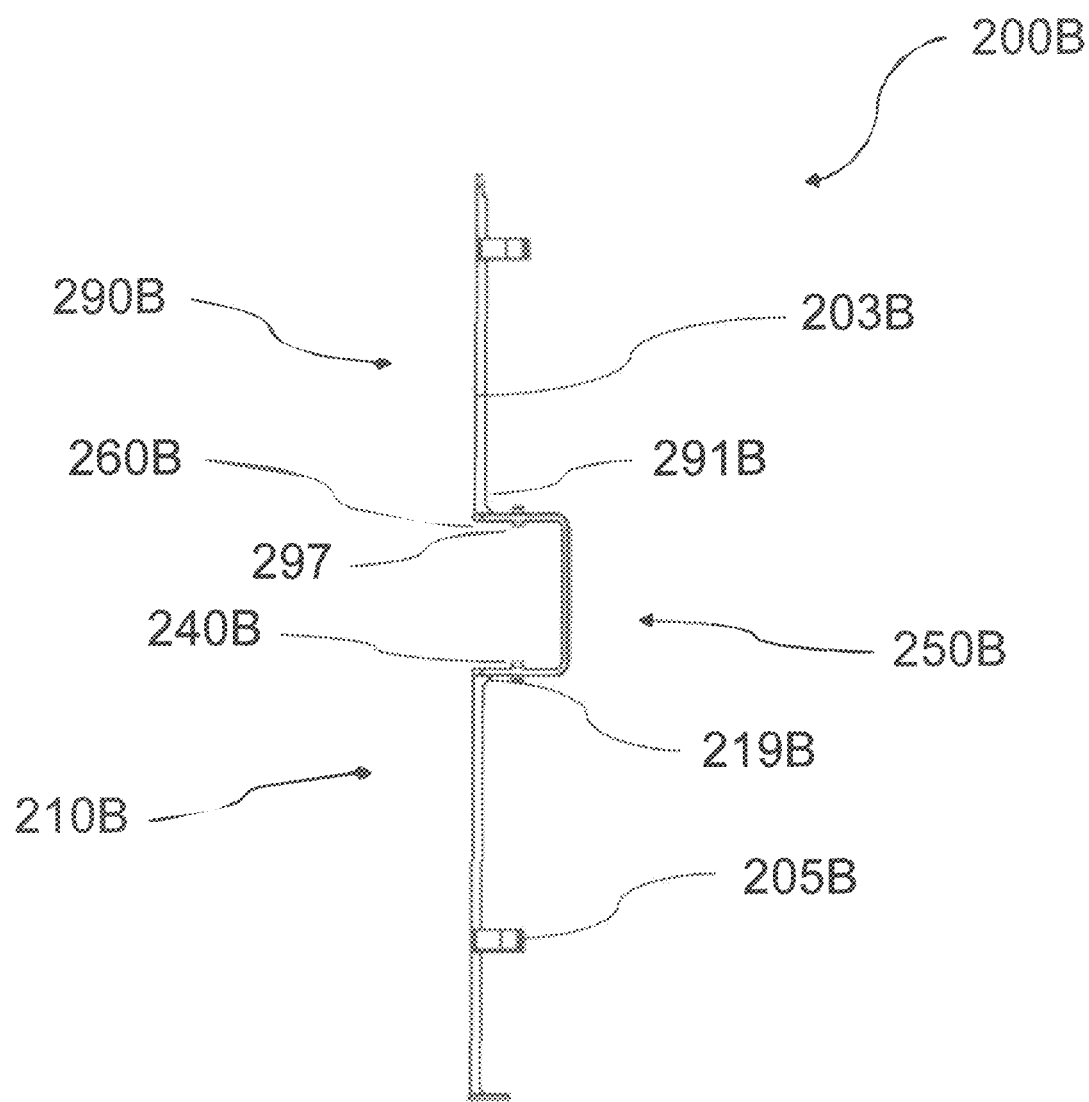
FIG. 15 illustrates the rear view of the short version of the mounting guide for placing a gang box.
Figure 16:
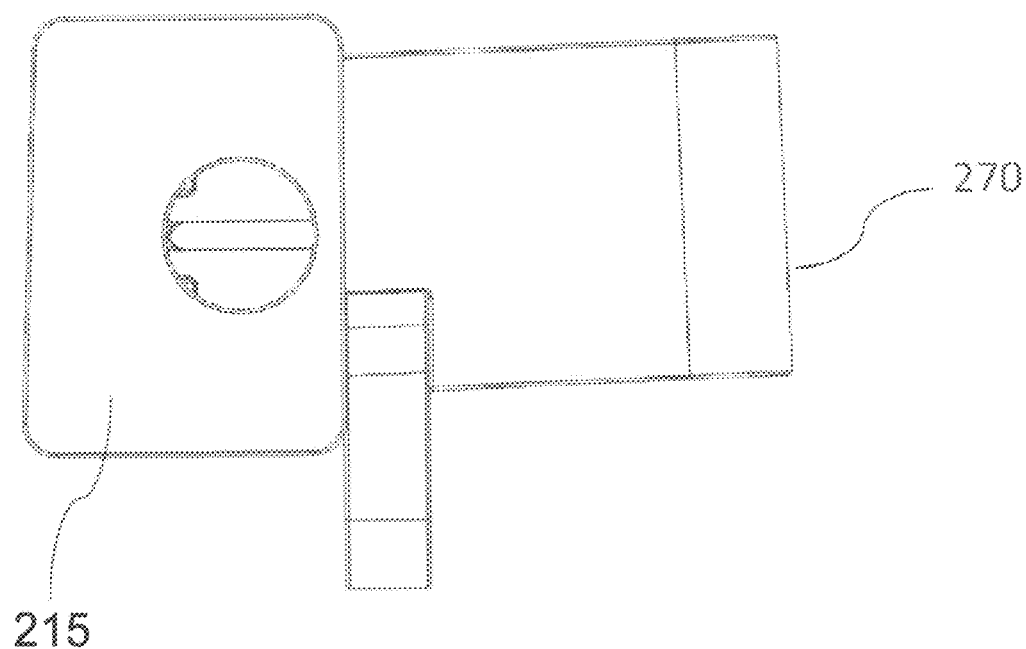
FIG. 16 illustrates a bottom view of the tall mounting guide for placing a gang box.
Figure 17:
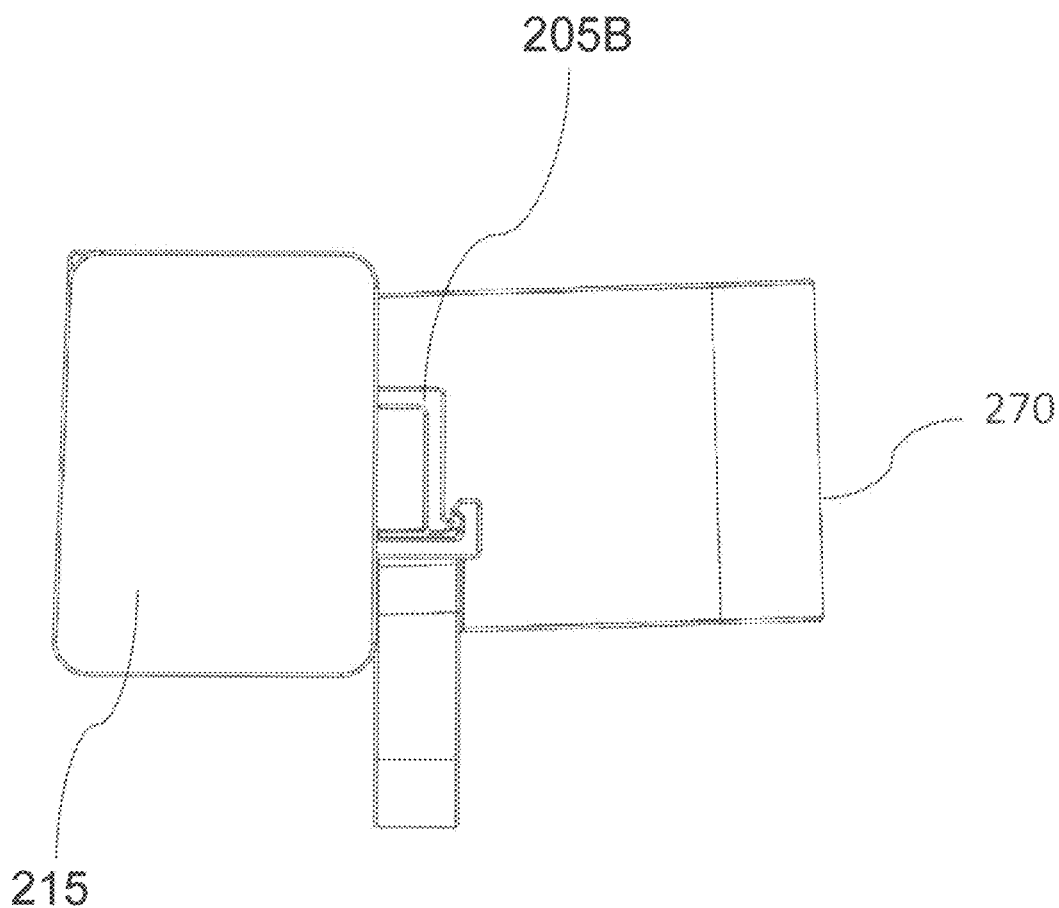
FIG. 17 illustrates a bottom view of the short version of the mounting guide for placing a gang box.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the Figures, FIGS. 1-9 illustrate the inventive concept in one embodiment is a mounting guide 10 for placing a gang box 270 on a wall or upright stud structure in a predetermined location. In this embodiment of mounting guide 10 an elongate substantially planar vertical frame assembly 100 has a longitudinal axis 101 through a vertical body 103 and has a top 190, middle 150, and bottom portion 110, the middle portion 150 formed by a first lateral wall 170 and a second lateral wall 130 protruding laterally from the vertical body 103, wherein the first and second lateral walls 170 and 130 are perpendicular to the longitudinal axis 101. A laterally extendable box member 200 is designed to be mounted within the middle portion 150 of the vertical frame assembly 100 and is disposed between the top and bottom portions 190 and 110, the extendable box member 200 designed to move laterally away from the vertical body 103 as upper and lower screw members 201, 202 that secure the box member 200 are axially rotated. The upper and lower screw members 201, 202 are perpendicular to the longitudinal axis 101 and are aligned with the first lateral wall 170 and the second lateral wall 1300. In this example embodiment, a gang box member 270 is designed to be mounted on a surface 230 of the extendable box member 200 located away from the vertical body 103, the gang box 270 having an open end 275 forming a plane that is parallel to the longitudinal axis 101 of the vertical frame assembly 100.

In this example embodiment, one or more hoop or clip assemblies 105 are disposed on the frame assembly 100 designed to secure at least one wire assembly spanning to and from the gang box member 270. One or more hole portions 107 are disposed through the frame assembly 100 designed to receive a fastener assembly therethrough. In this embodiment of the mounting guide 10 for placing a gang box 270 on a wall structure, the one or more loop or clip assemblies 105 are designed to secure the at least one wire assembly with one or more cable tie assemblies 108. In this embodiment of the mounting guide 10 for placing a gang box 270 on a wall structure, the one or more loop assemblies or clip assemblies 105 is a metal-clad wiring bundle style wire holder assembly 105B.

Referring again to FIGS. 1-9 and 40 there is further illustrated a method 500 for placing a gang box 270 and includes the step 501 of mounting to a surface (such as a wall stud) an elongate substantially planar vertical frame assembly 100 having a longitudinal axis 101 through a vertical body and having a top 190, middle 150 and bottom portion 110, the middle portion 150 formed by a first lateral wall 170 and a second lateral wall 130 protruding laterally from the vertical body 103, wherein the first and second lateral walls 170 and 130 are perpendicular to the longitudinal axis 101. This method 500 further involves the step 502 of disposing one or more fastener assemblies 106 through one or more hole portions 107 of the vertical frame assembly 100 to secure the vertical frame assembly 100 to the surface, such as a wall structure or an upright wall stud. This method further involves the step 503 of laterally extending a predetermined distance of an extendable box member 200 disposed between the top and bottom portions 190, 110 of the frame assembly 100. This method further involves the step 505 of positioning a gang box member 270 mounted on a surface of the extendable box member 230, the box member 200 located away from the vertical body 103, the gang box 270 having an open end 271 forming a plane that is parallel to the longitudinal axis 101 of the vertical frame assembly 100, the gang box 270 positioned in a predetermined location as measured by extending the box member 200. This embodiment of the method 500 for placing a gang box 270 involves the step 504 of the extendable box member 200 being moved laterally away from the vertical body 103 by axially rotating 504 an upper screw member 201 and a lower screw member 202 disposed perpendicularly to the longitudinal axis 101 of the frame assembly 100 and aligned with the first lateral wall 130 and the second lateral wall 270. This embodiment of the method 500 for placing a gang box 270 may further involve the step 503 of laterally extendable box member 200 being substantially two inches in width and being laterally extended up to, but not necessarily limited to, one and a half inches from the vertical body. This embodiment of the method for placing a gang box 270 further involves one or more cable tie assemblies 108 being used to attach at least one wire assembly to a loop or clip assembly 105 on the vertical frame assembly 100.

Referring now to FIGS. 10-38, there is illustrated two related embodiments of elongate mounting guides 20A and 20B, including a tall member 200 and a short member 200B, for placing a gang box 270 on a wall structure where the lower portion 210 of the frame assembly 200 is substantially ten inches in height but not necessarily limited to such a height. In these embodiments of the mounting guide 20A and 20B for placing a gang box 270 on a wall structure, the upper portion of the frame assembly 200 is substantially eight inches (20B) or substantially twenty inches in height (20A) but are not necessarily limited to such dimensions and can be reconfigured to suit the needs of the construction project. For ease of description, common elements are shown in the figures and will be repeated or referenced for clarity.

Referring to FIGS. 10, 12, 14, 16, 18-20, 24, 25, 27-31, 33, 35 and 37 and with reference primarily to mounting guide 20A-15 and 16-38, there is illustrated tall mounting guide 20A for placing a gang box 270 on a wall structure that has an elongate, vertical frame assembly 200 having a longitudinal axis 101 with an elongate vertical body 203 with an upper portion 290 and lower portion 210 and a center portion 250. Center portion 250 is formed from a lower horizontal planar portion 240 substantially perpendicular to the longitudinal axis 101 and extending from a top end 219 of the lower portion 210 of the frame assembly 200A and an upper horizontal portion 260 substantially perpendicular to axis 101 and extending from a bottom end 291 of the upper portion 290 of the frame assembly 200, the upper horizontal portion 290 and the lower horizontal portion 210 extending laterally at a substantially uniform width, an upper face 211A of the lower horizontal portion 211 opposite a lower face 299A of the upper horizontal portion 299. A middle or center portion of the frame assembly 120 is disposed between the upper horizontal portion 260 and the lower horizontal portion 240 and parallel and substantially offset or disposed laterally from the upper portion 290 and lower portion 210 of the frame assembly 200. One or more hoop or clip assemblies 205 is disposed on the frame assembly 200 designed to secure at least one wire assembly.

One or more hole portions 207 is disposed through the frame assembly 200 designed to receive a fastener assembly 206 therethrough. In this embodiment of the mounting guide 20A for placing a gang box 270 on a wall structure includes one or more loop or clip assemblies 205 are designed to secure the at least one wire assembly with one or more cable tie assemblies 208. In this embodiment of the mounting guide for placing a gang box 270 on a wall structure, the one or more loop assemblies or clip assemblies 205 may be a metal-clad wiring bundle style wire holder assembly 205B.

In this example embodiment of the mounting guide 20A is configured for placing a gang box 270 on a wall structure where one or more loop or clip assemblies 205 are spaced substantially six inches from the top end 219 of the lower portion 210 of the frame assembly 200 or the bottom end 291 of the upper portion 290 of the frame assembly 200. In a related embodiment, center portion 250 is formed as a sliding u-shaped bracket that moves up and down vertically along elongate frame 200A so that the user can place the gang box member at any desired height from the floor.

In this example embodiment, there is provided mounting guide 20A (and similarly 20B below) for placing a gang box 270 on a wall structure (see FIGS. 16, 24, 25, 27, 28 and 37) wherein lower horizontal portion 240 (substantially perpendicular to axis 101) extending from the top end 219 of the lower portion 210 of the frame assembly 200 and the upper horizontal portion 260 (perpendicular to axis 101) extending from the bottom end 291 of the upper portion 290 of the frame assembly 200, the upper horizontal portion 260 and the lower horizontal portion 240 extending laterally a substantially uniform width, are configured to enable the securing of the gang box 270 to the frame assembly 200.

Figure 18:
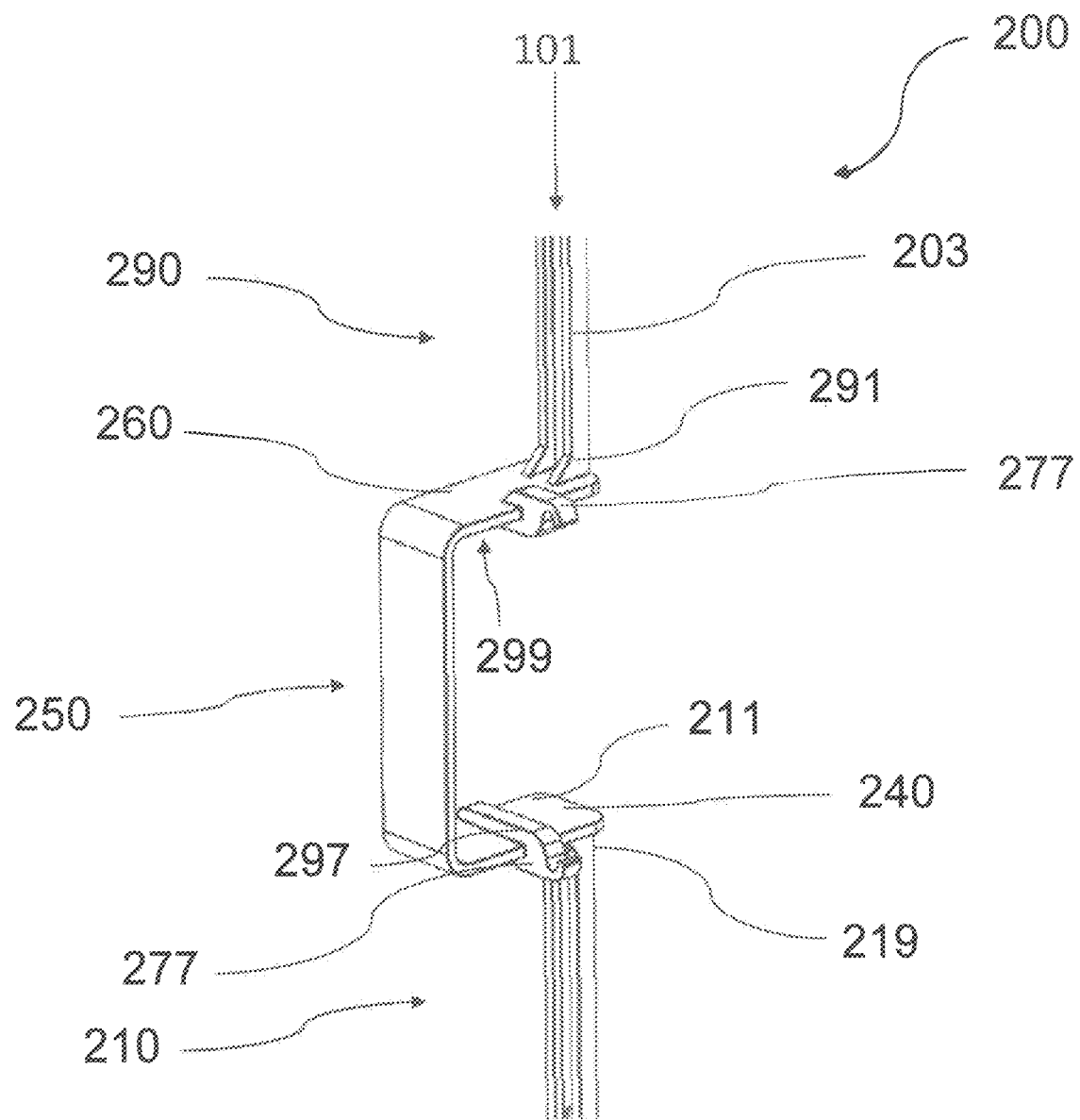
FIG. 18 illustrates a close up perspective view of the tall elongate mounting guide for placing a gang box center.
Figure 19:
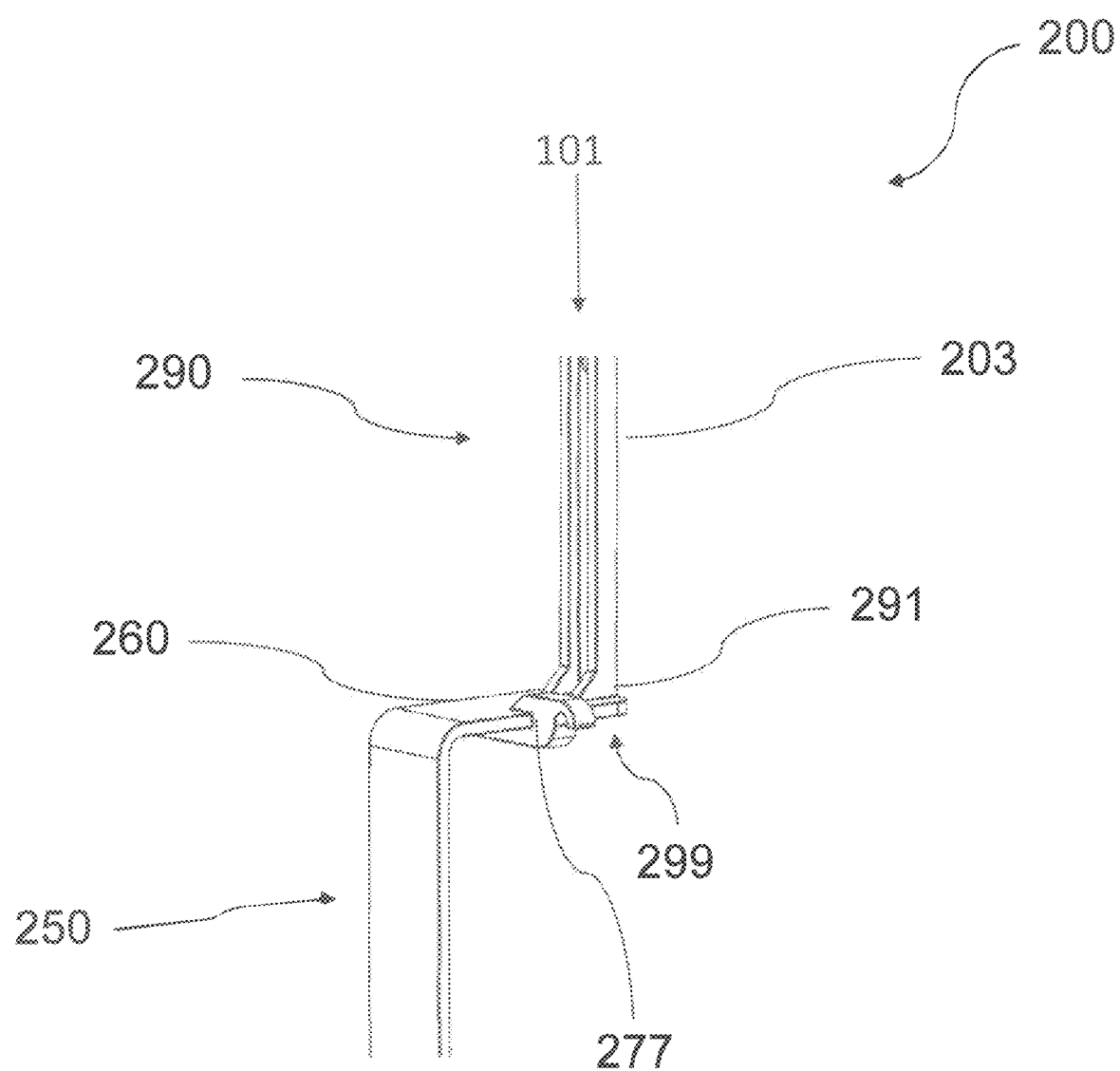
FIG. 19 illustrates a close up perspective view of the short version of the mounting guide for placing a gang box center.
Figure 20:
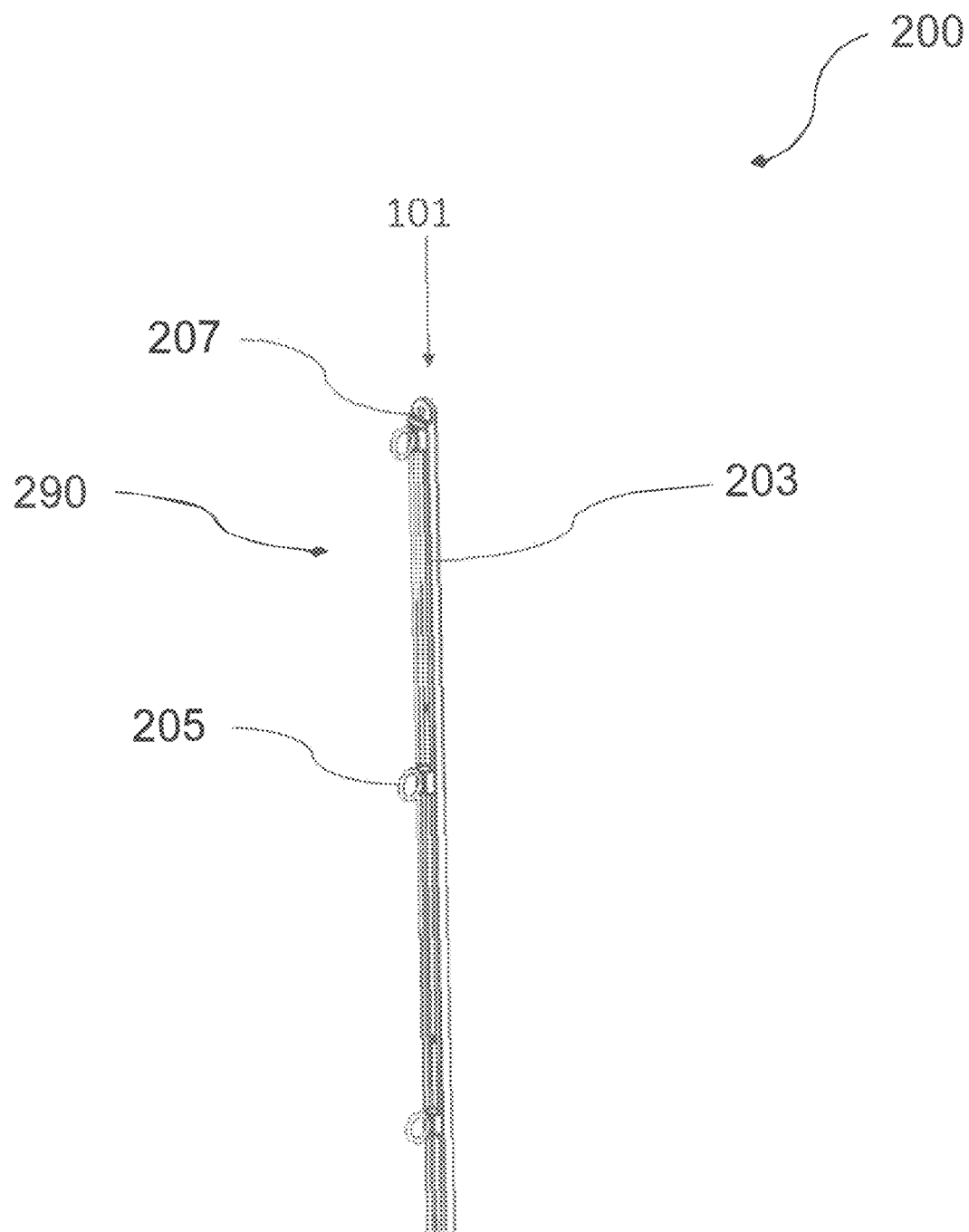
FIG. 20 illustrates a close up perspective view of the tall mounting guide for placing a gang box top.
Figure 21:
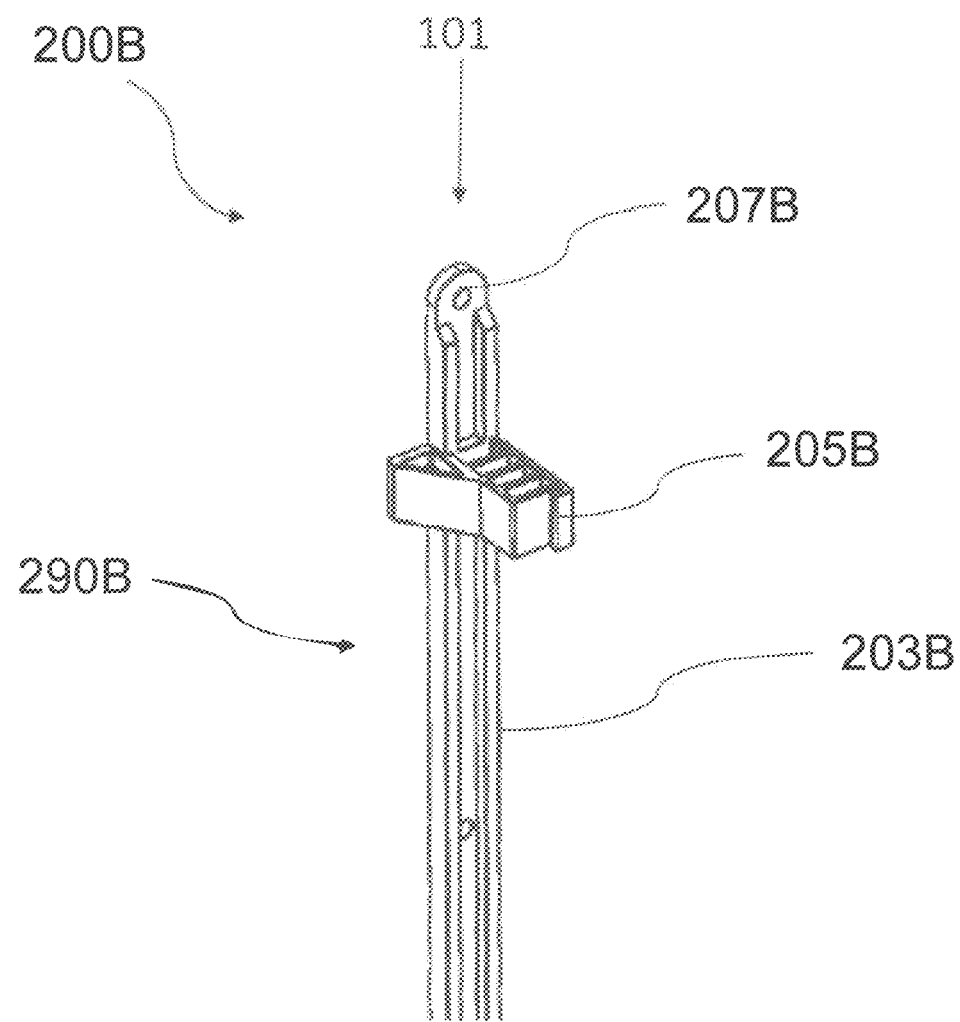
FIG. 21 illustrates a close up perspective view of the short version of the mounting guide for placing a gang box top.
Figure 24:
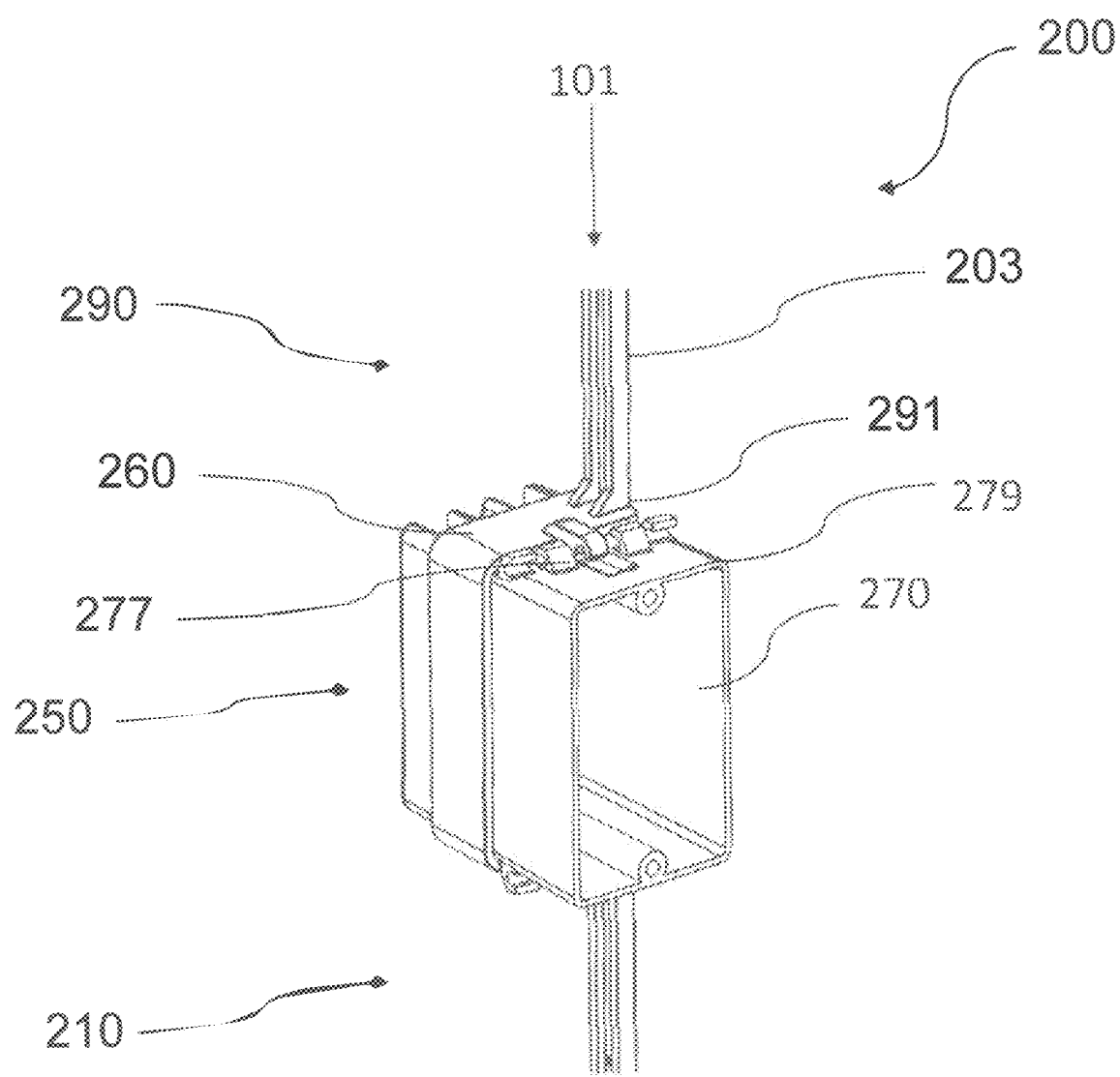
FIG. 24 illustrates a close up perspective view of the tall or short mounting guide for placing a gang box within the mounting guide.

FIGS. 18, 19, and 24 illustrate one embodiment of the mounting guide 20A for placing a gang box 270 on a wall structure wherein at least one clip and hook assembly 277 is coupled to the lower horizontal portion 20 and the upper horizontal portion 260 of the frame assembly 200 and designed to secure the gang box assembly 270, the gang box assembly 270 held substantially in place by the lower horizontal portion 240 and the upper horizontal portion 260.

Figure 25:
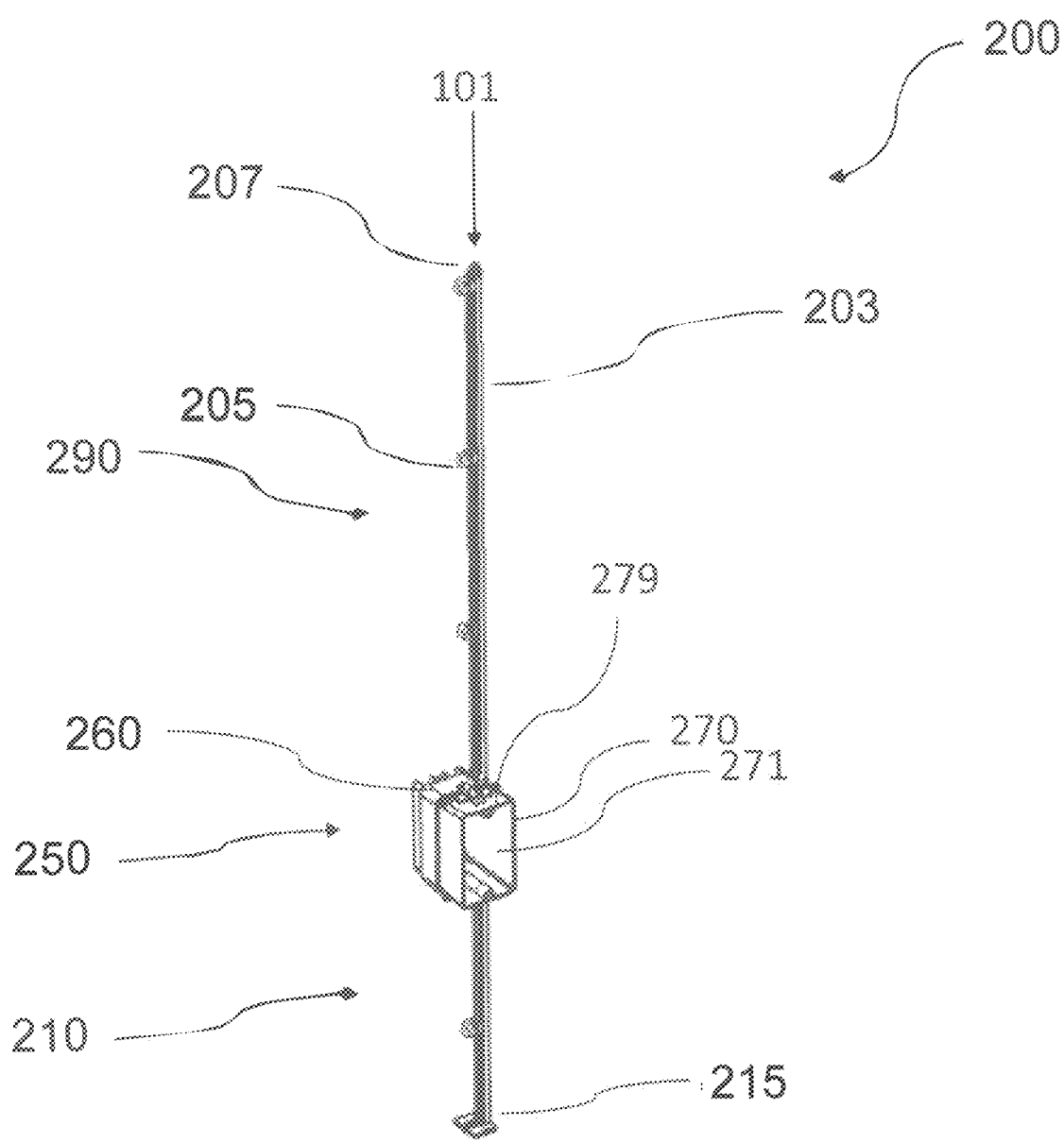
FIG. 25 illustrates the perspective view mounting guide for placing a gang box within the mounting guidecontext.
Figure 27:
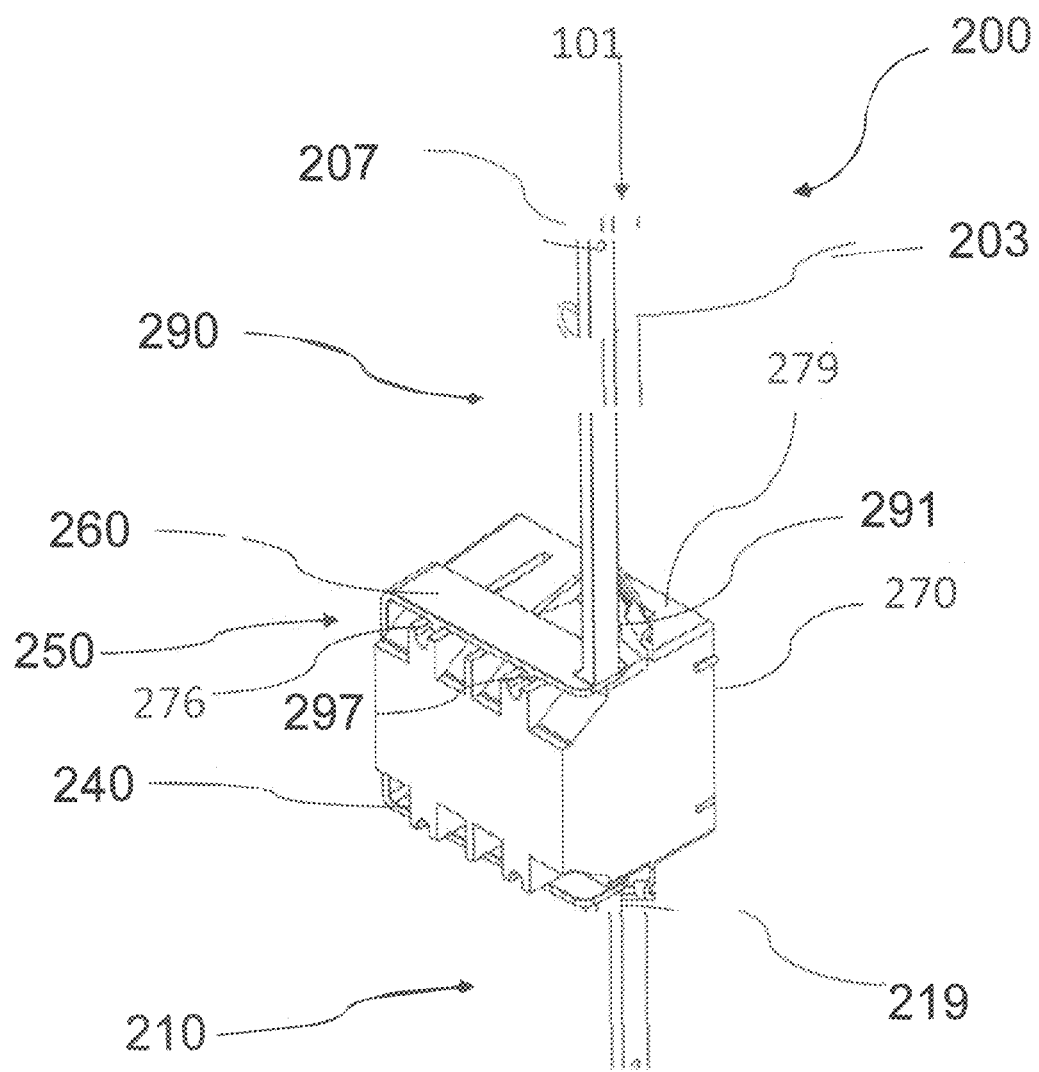
FIG. 27 illustrates arear perspective view the tall mounting guide for a double gang box with an actual box located therein.
Figure 28:
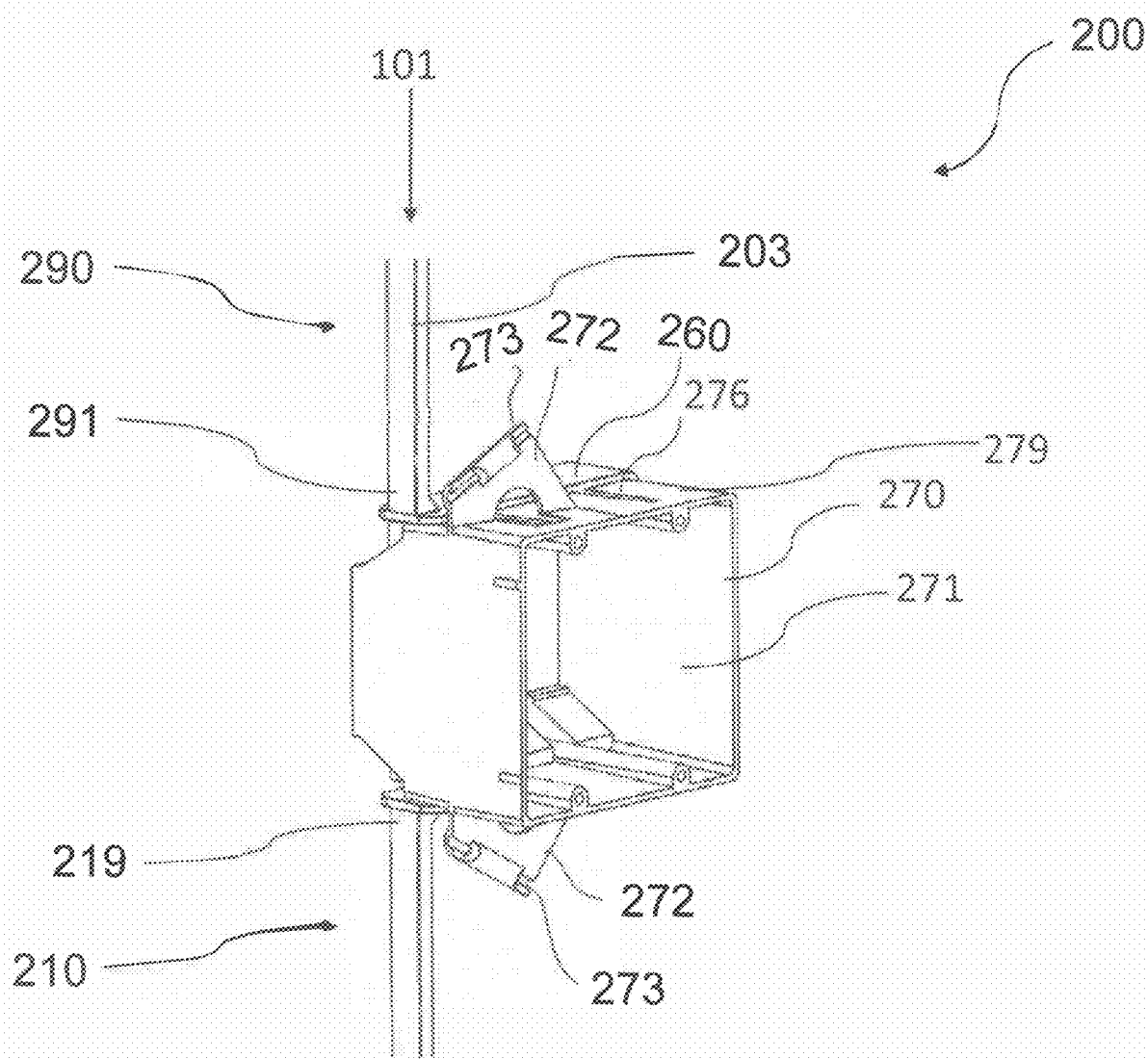
FIG. 28 illustrates a front perspective view short version of the mounting guide for placing a double gang box in context.
Figure 29:
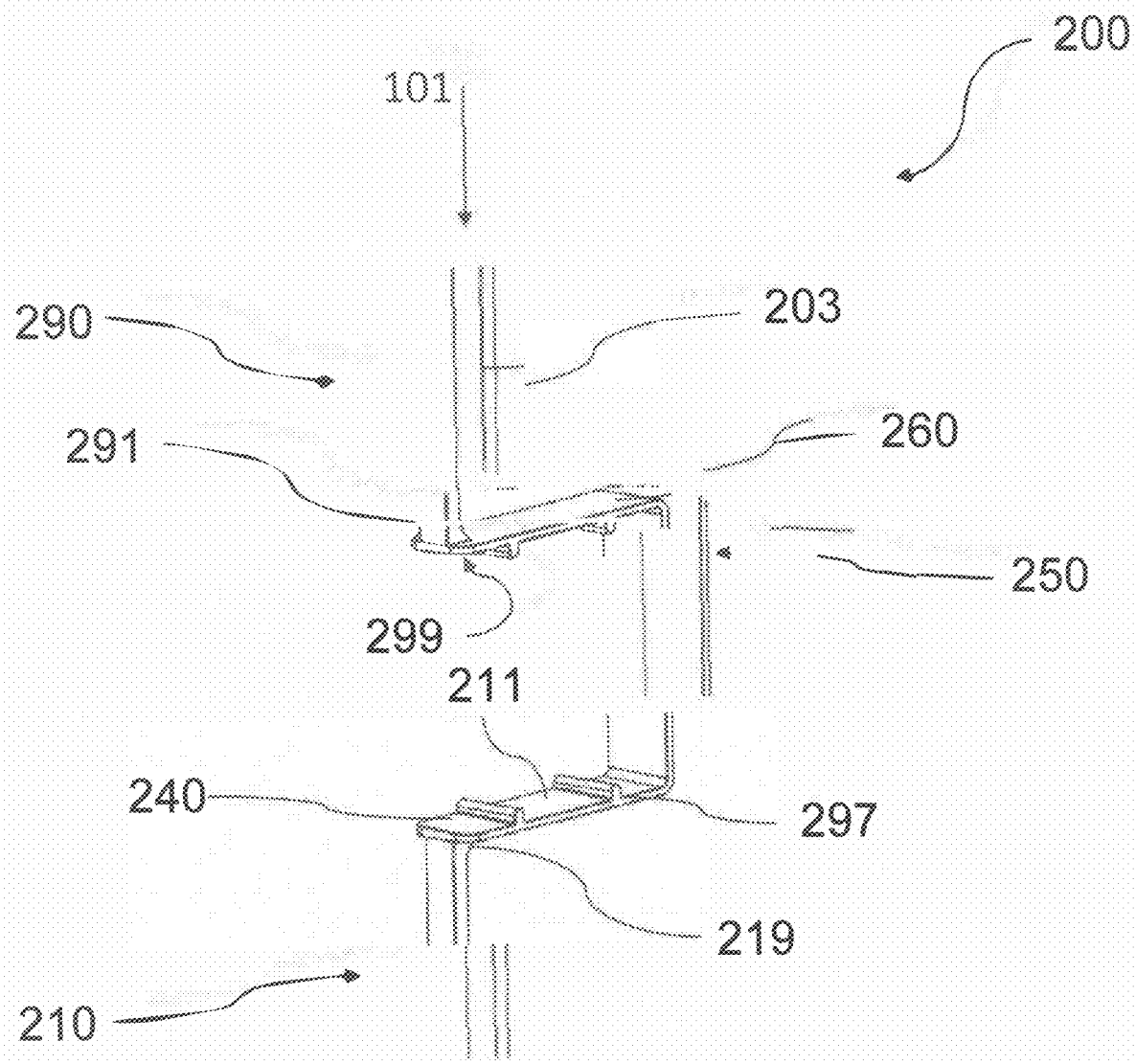
FIG. 29 illustrates perspective view the mounting guide for a double gang box.
Figure 30:
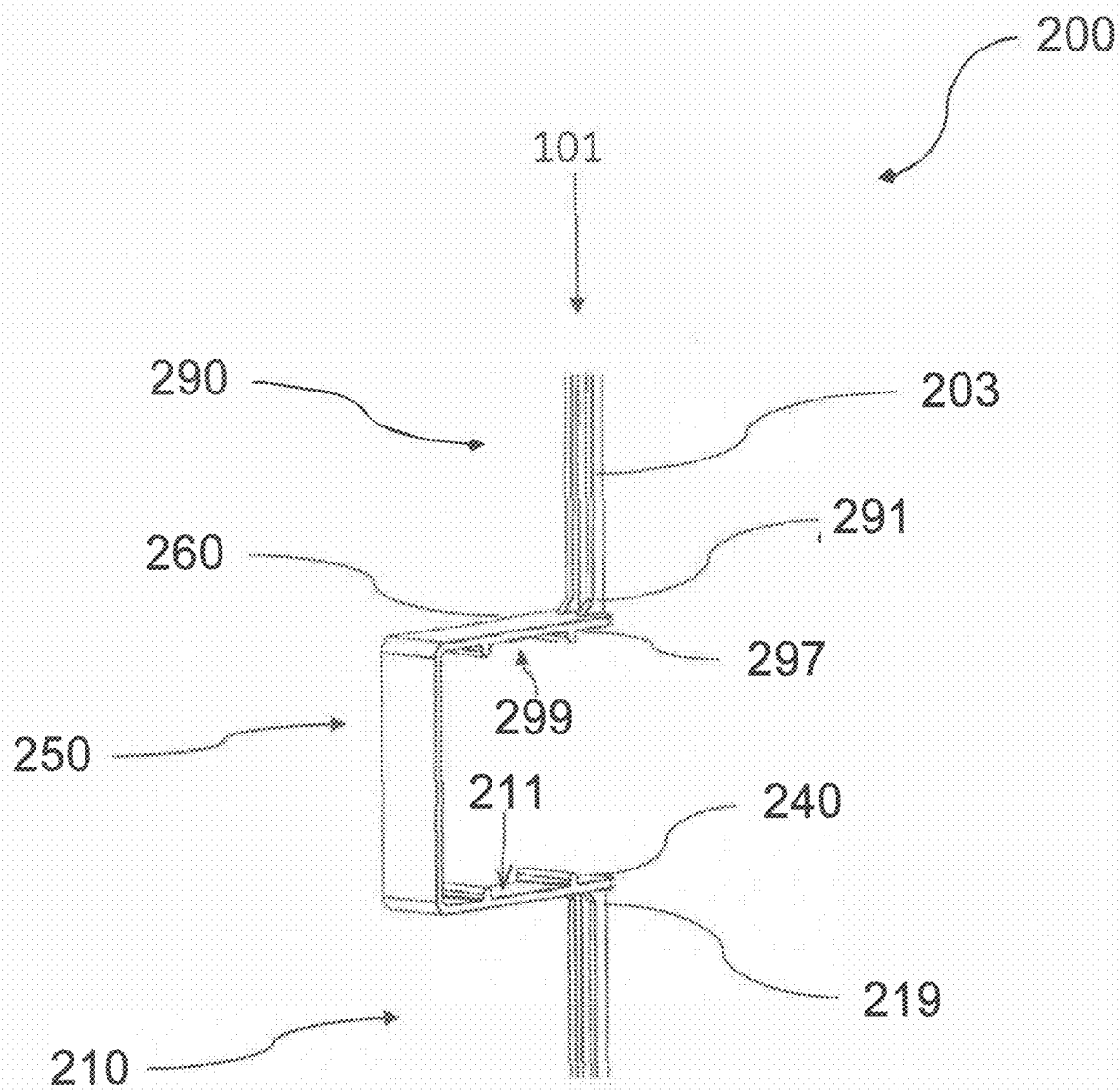
FIG. 30 illustrates perspective view the short version of the mounting guide for placing a double gang box.
Figure 31:
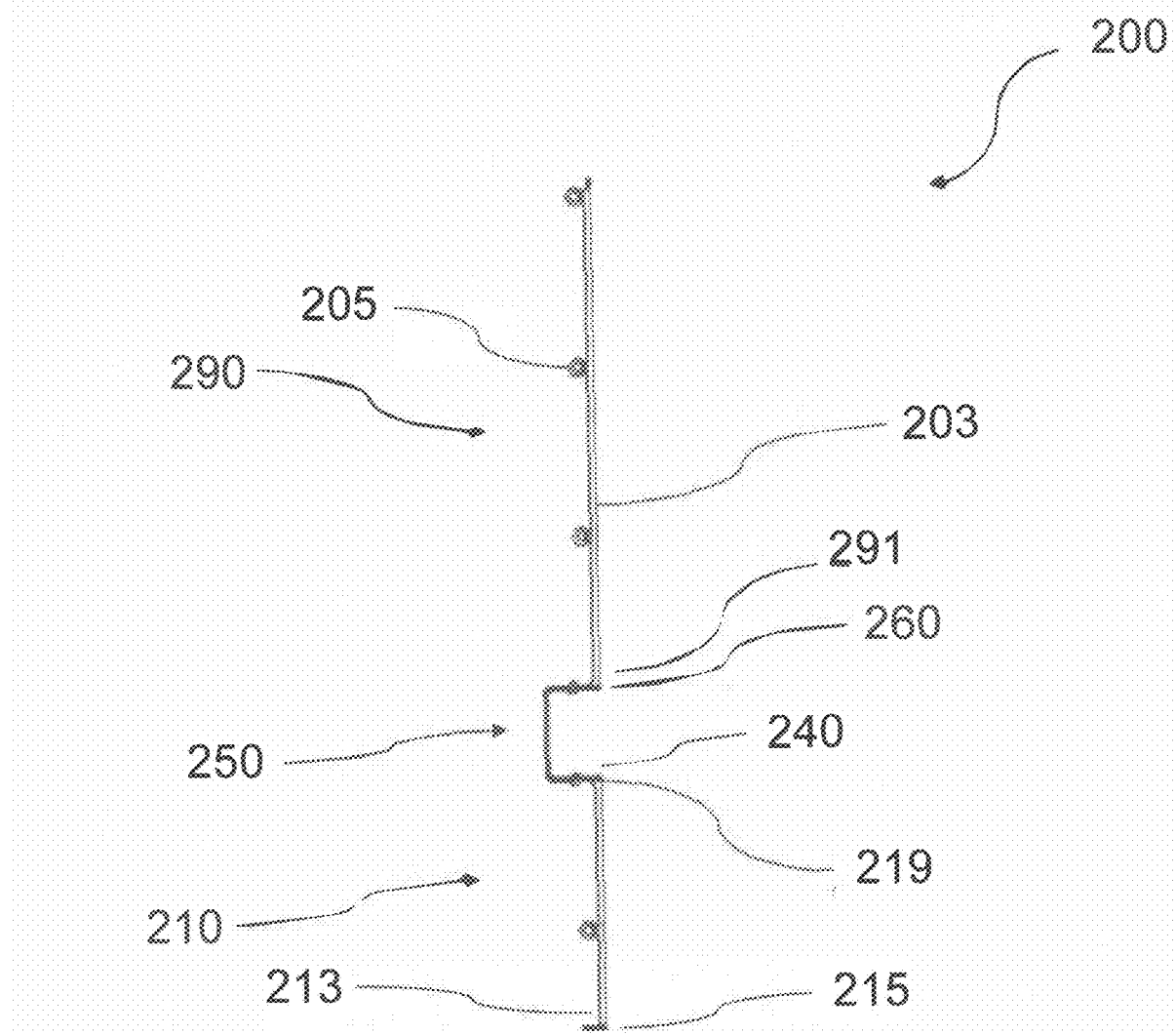
FIG. 31 illustrates a side view of the tall mounting guide for placing a gang box.
Figure 32:
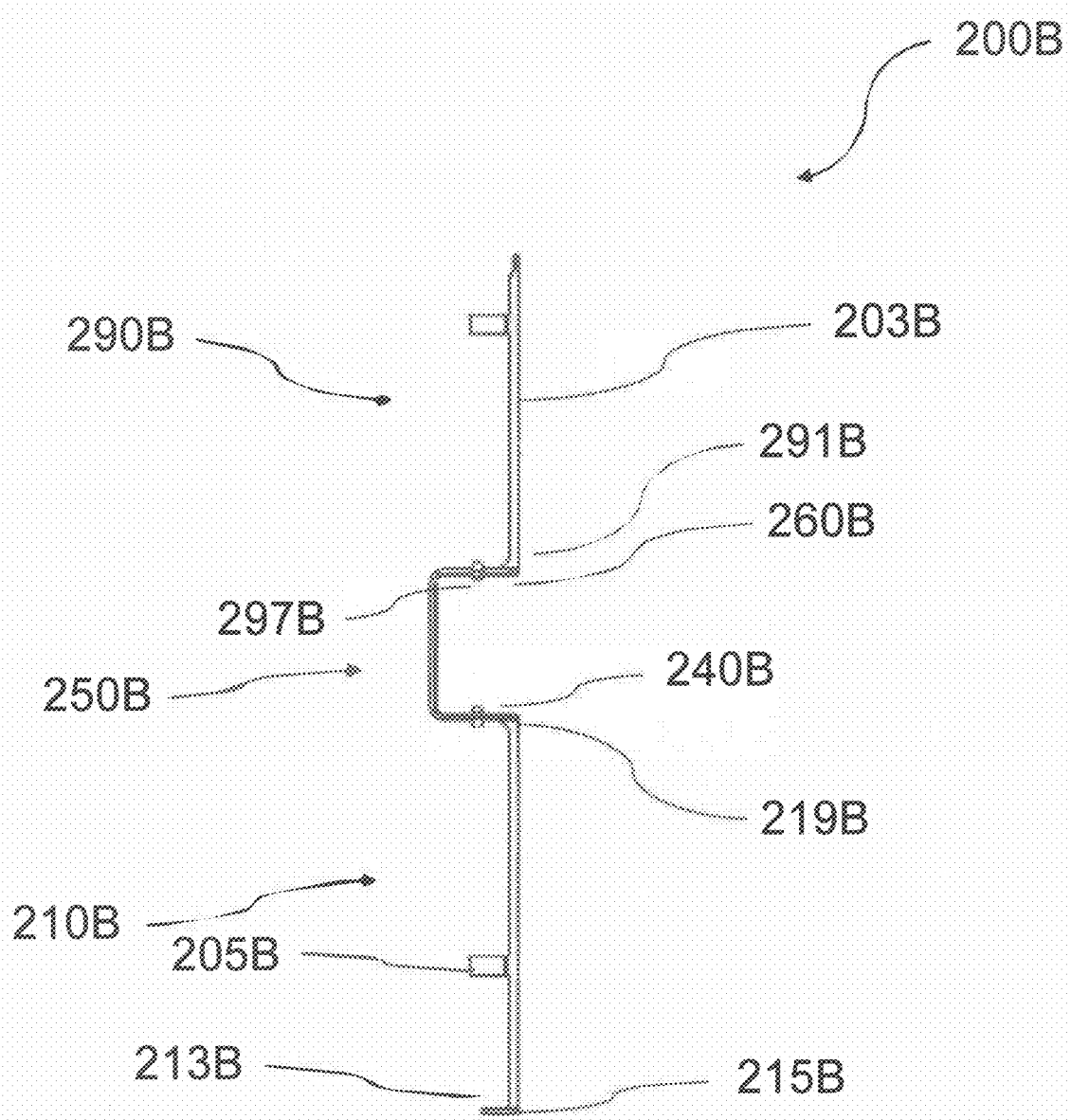
FIG. 32 illustrates a side view of the short version of the mounting guide for placing a gang box.
Figure 33:
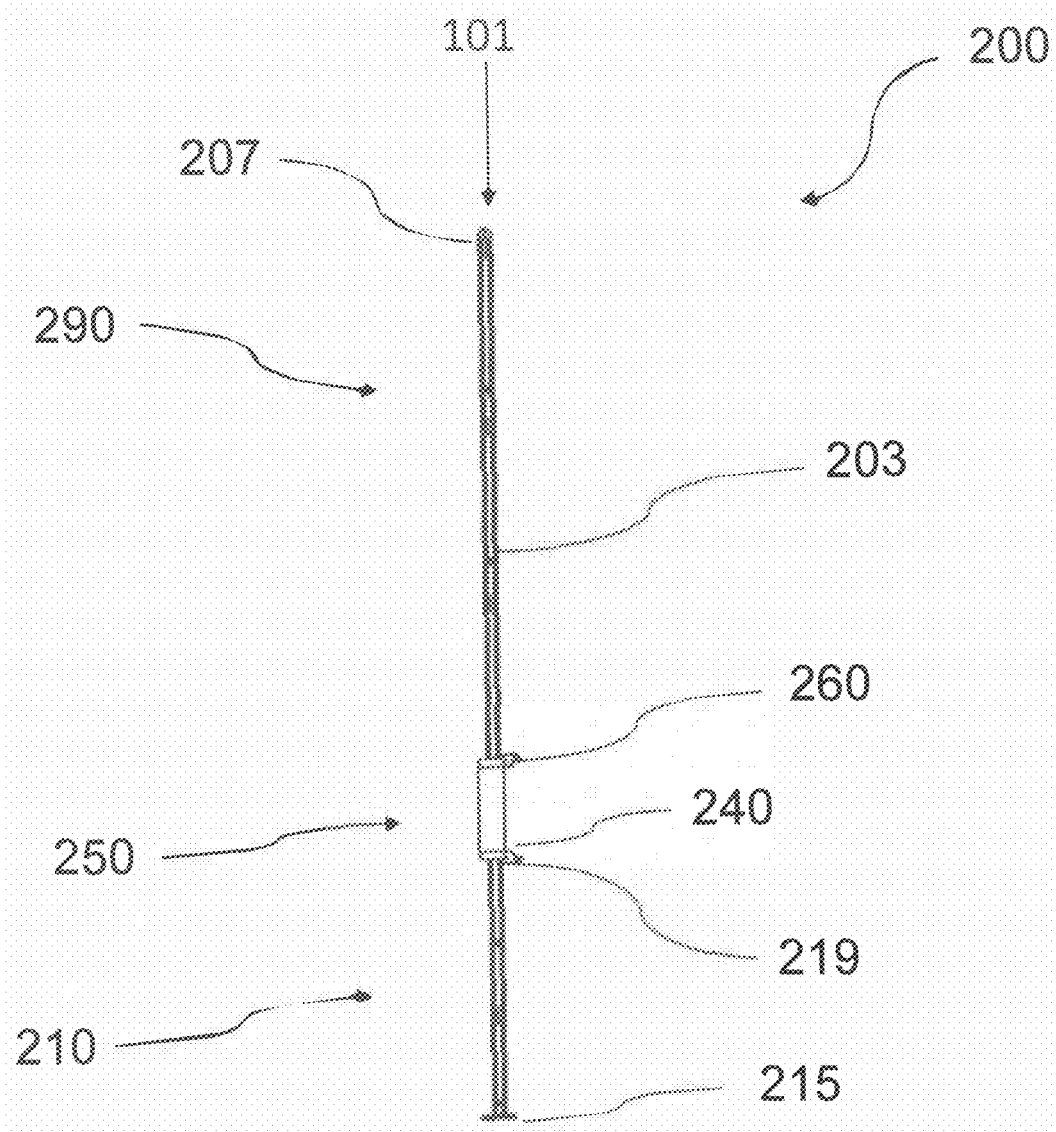
FIG. 33 illustrates the front view of the tall mounting guide for placing a gang box.
Figure 34:
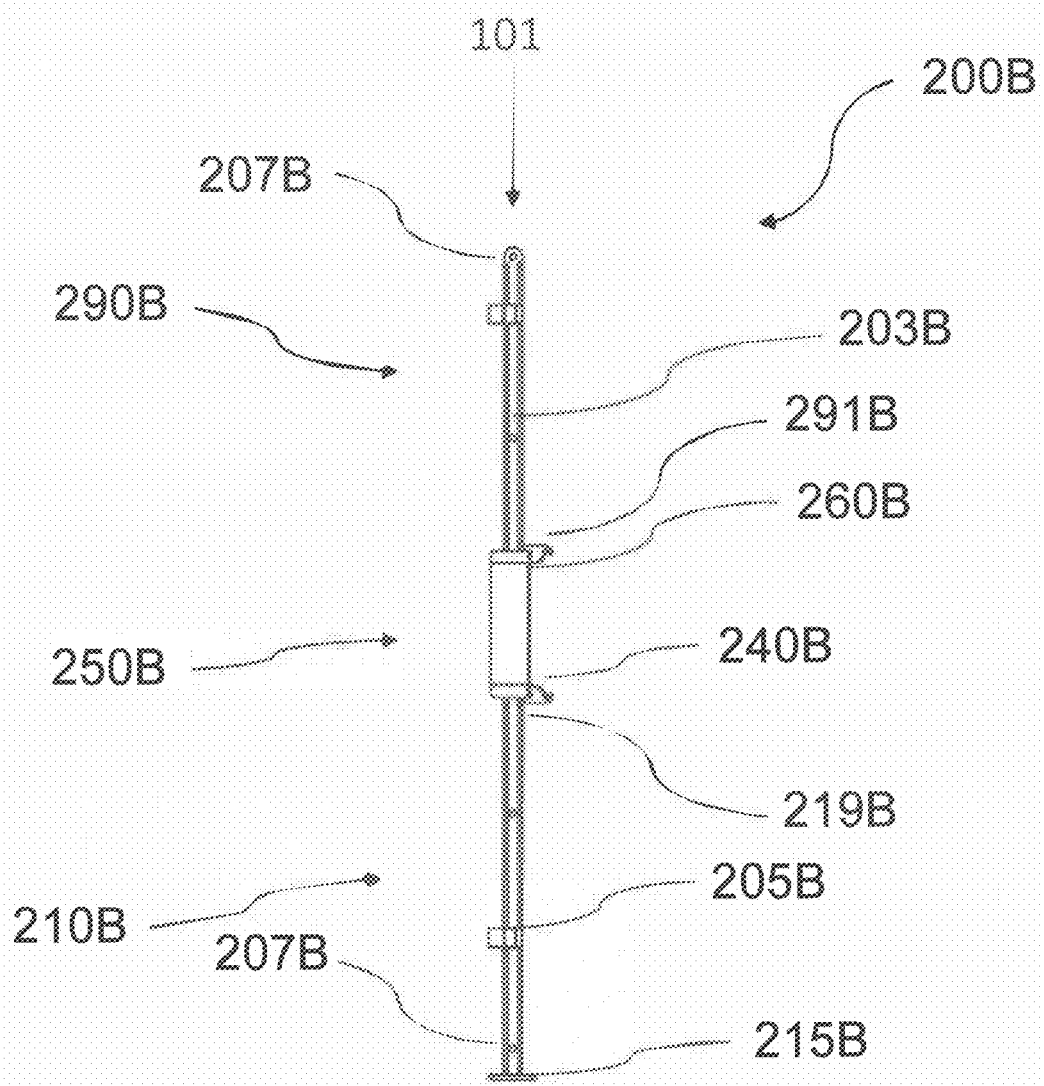
FIG. 34 illustrates the front view of the short version of the mounting guide for placing a gang box.
Figure 35:
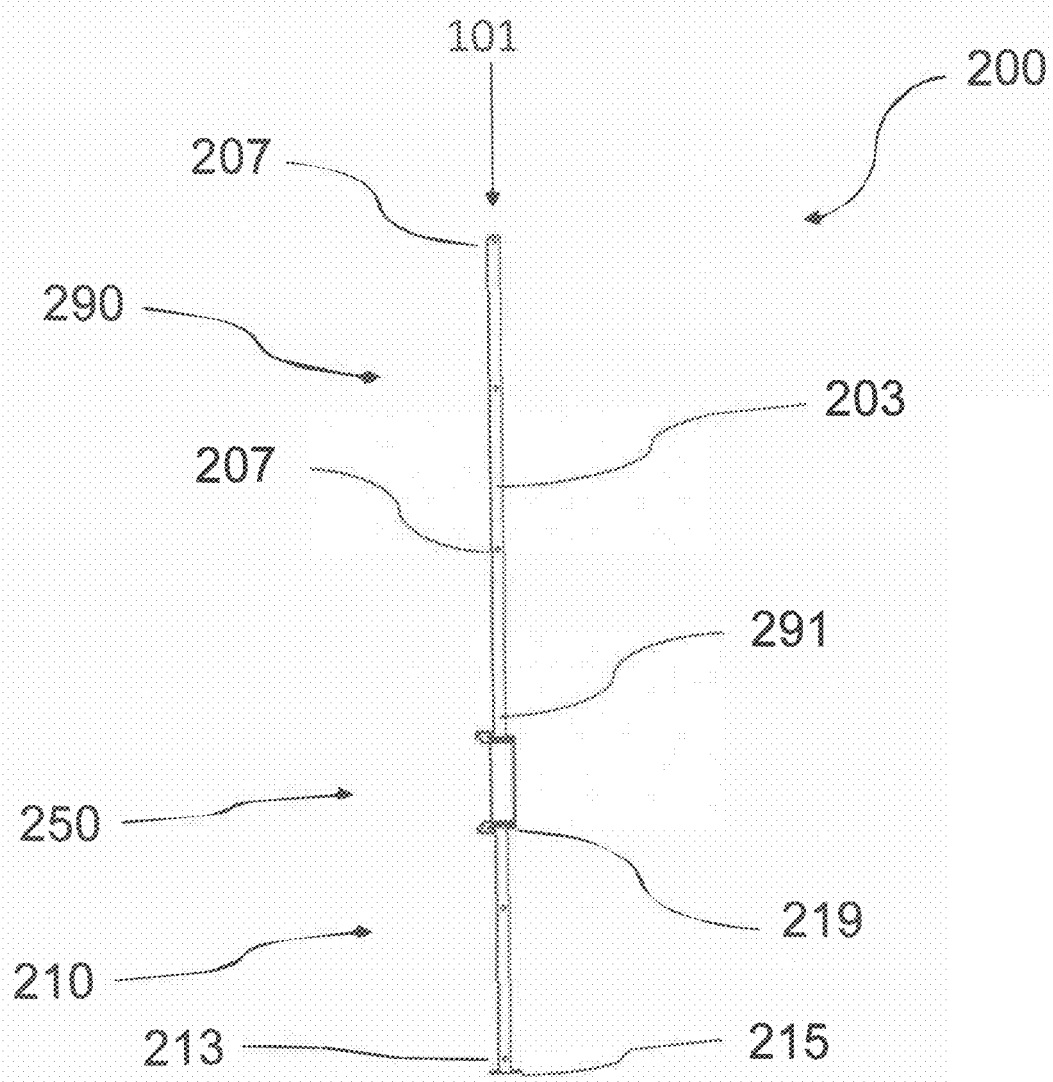
FIG. 35 illustrates another rear view of the tall mounting guide for placing a gang box.
Figure 36:
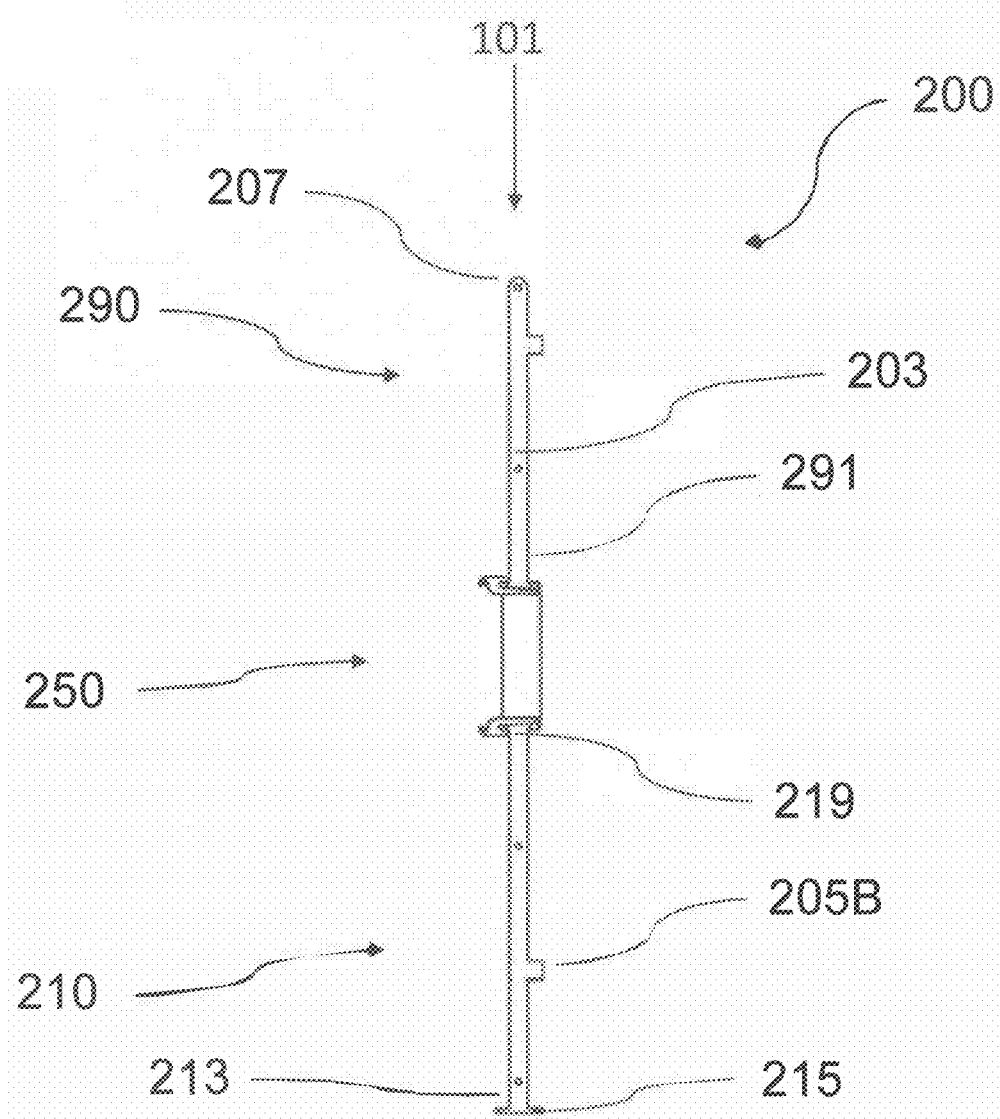
FIG. 36 illustrates another rear view of the short version of the mounting guide for placing a gang box.
Figure 37:
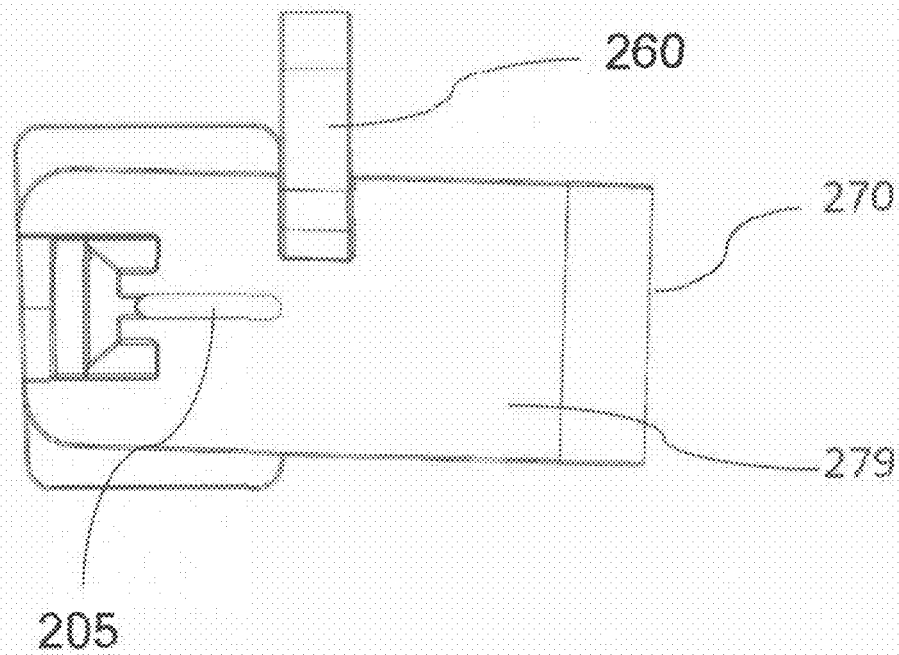
FIG. 37 illustrates a top view of the tall elongate mounting guide for placing a gang box.

FIGS. 25, and 27-28 illustrate an embodiment of the mounting guide 20A for placing an actual gang box 270 (within middle portion 250) on a wall structure wherein the spacing between the lower horizontal portion 240 and the upper horizontal portion 260 is substantially equal to the vertical height of the mounted gang box assembly 270, the lower horizontal portion 240 and the upper horizontal portion 260 designed to couple substantially contiguously to a bottom portion of the gang box assembly 271 and a top portion of the gang box assembly 279 to hold the gang box assembly 270 substantially in place.

FIGS. 27, 28, 29, and 30 illustrate one embodiment of the mounting guide 20A for placing an actual gang box 270 on a wall structure wherein one or more protrusions 297 are disposed on the upper face 211 of the lower horizontal portion 240 of the frame assembly 200 and the lower face 299 of the upper horizontal portion 260 of the frame assembly 200 and designed to prevent the gang box assembly 270 from sliding outward from the lower horizontal portion 240 and the upper horizontal portion 260 of the frame assembly 200 by coupling to corresponding groove portions 276 of the gang box assembly. Gang box member 270 also includes securing tabs 272 that protrude upward and include a channel 273 for driving a nail into the wall stud for securing the gang box 270.

Referring now to FIGS. 11, 13, 15, 17, 21-23, 26, 32, 34, 36 and 38 and mounting guide 20B, there is illustrated tall mounting guide tall 20B for placing a gang box 270 on a wall structure that has an elongate, vertical frame assembly 200B having a longitudinal axis 101 with an elongate vertical body 203B with an upper portion 290B and lower portion 210B and a center portion 250B. Center or middle portion 250B is formed from a lower horizontal planar portion 240B substantially perpendicular to the longitudinal axis 101 and extending from a top end 219B of the lower portion 210B of the frame assembly 200B and an upper horizontal portion 260B substantially perpendicular to axis 101 and extending from a bottom end 291B of the upper portion 290B of the frame assembly 200B, the upper horizontal portion 290B and the lower horizontal portion 210B extending laterally at a substantially uniform width, an upper face of the lower horizontal portion 211B opposite a lower face of the upper horizontal portion 299B. A middle or center portion of the frame assembly 220B is disposed between the upper horizontal portion 260B and the lower horizontal portion 240B and parallel and substantially offset or disposed laterally from the upper portion 290B and lower portion 210B of the frame assembly 200B. One or more hoop or clip assemblies 205B is disposed on the frame assembly 200B designed to secure at least one wire assembly. One or more hole portions 207B is disposed through the frame assembly 200B designed to receive a fastener assembly 206 therethrough. In this embodiment of the mounting guide 20B for placing a gang box 270 on a wall structure includes one or more loop or clip assemblies 205B are designed to secure the at least one wire assembly with one or more cable tie assemblies 208. In this embodiment of the mounting guide for placing a gang box 270 on a wall structure, the one or more loop assemblies or clip assemblies 205 may be a metal-clad wiring bundle style wire holder assembly 205B.

In this example embodiment of the mounting guide 20B is configured for placing a gang box 270 on a wall structure where one or more clip assemblies 205B are spaced substantially six inches from the top end 219B of the lower portion 210B of the frame assembly 200B or the bottom end 291B of the upper portion 290B of the frame assembly 200B.

Figure 22:
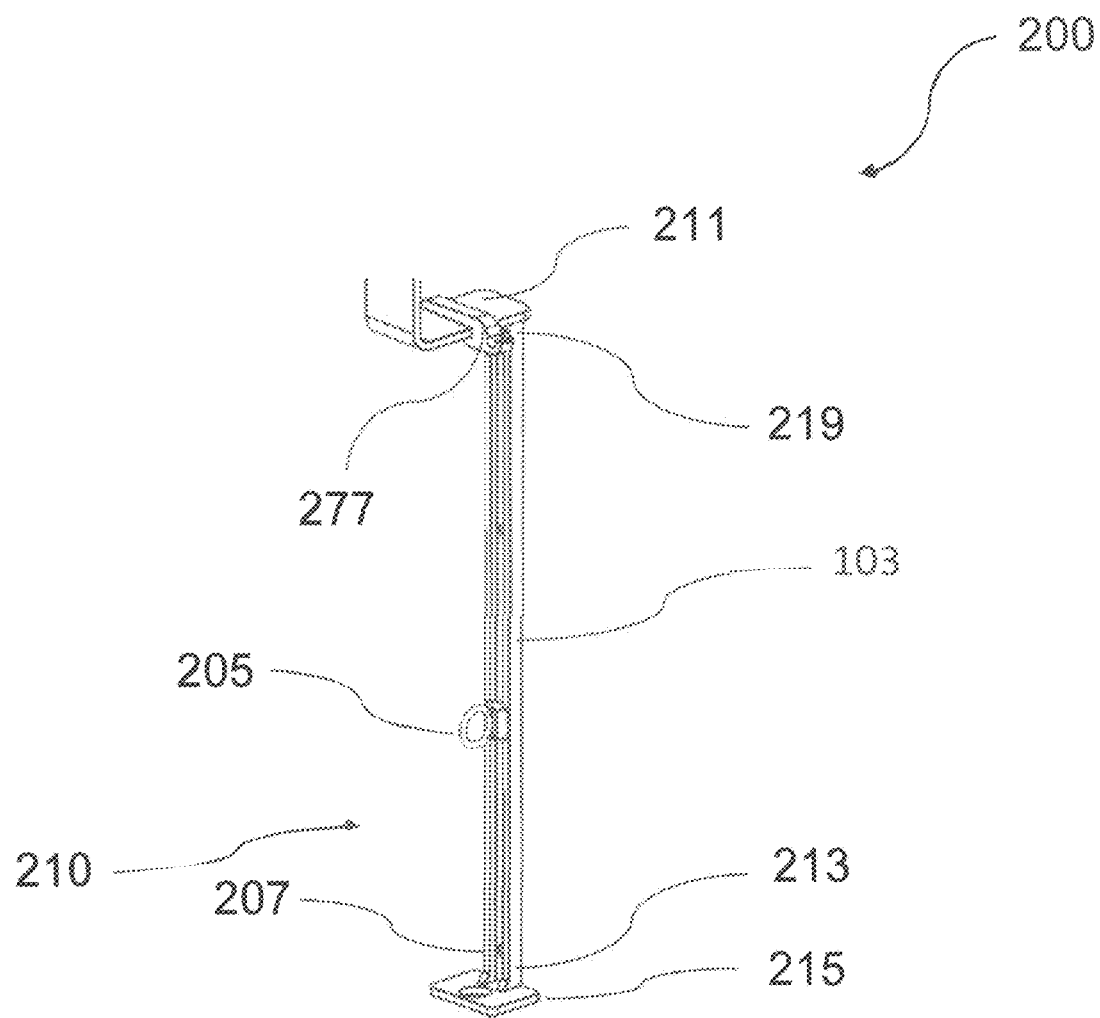
FIG. 22 illustrates a close up perspective view of the tall mounting guide for placing a gang box bottom.
Figure 23:
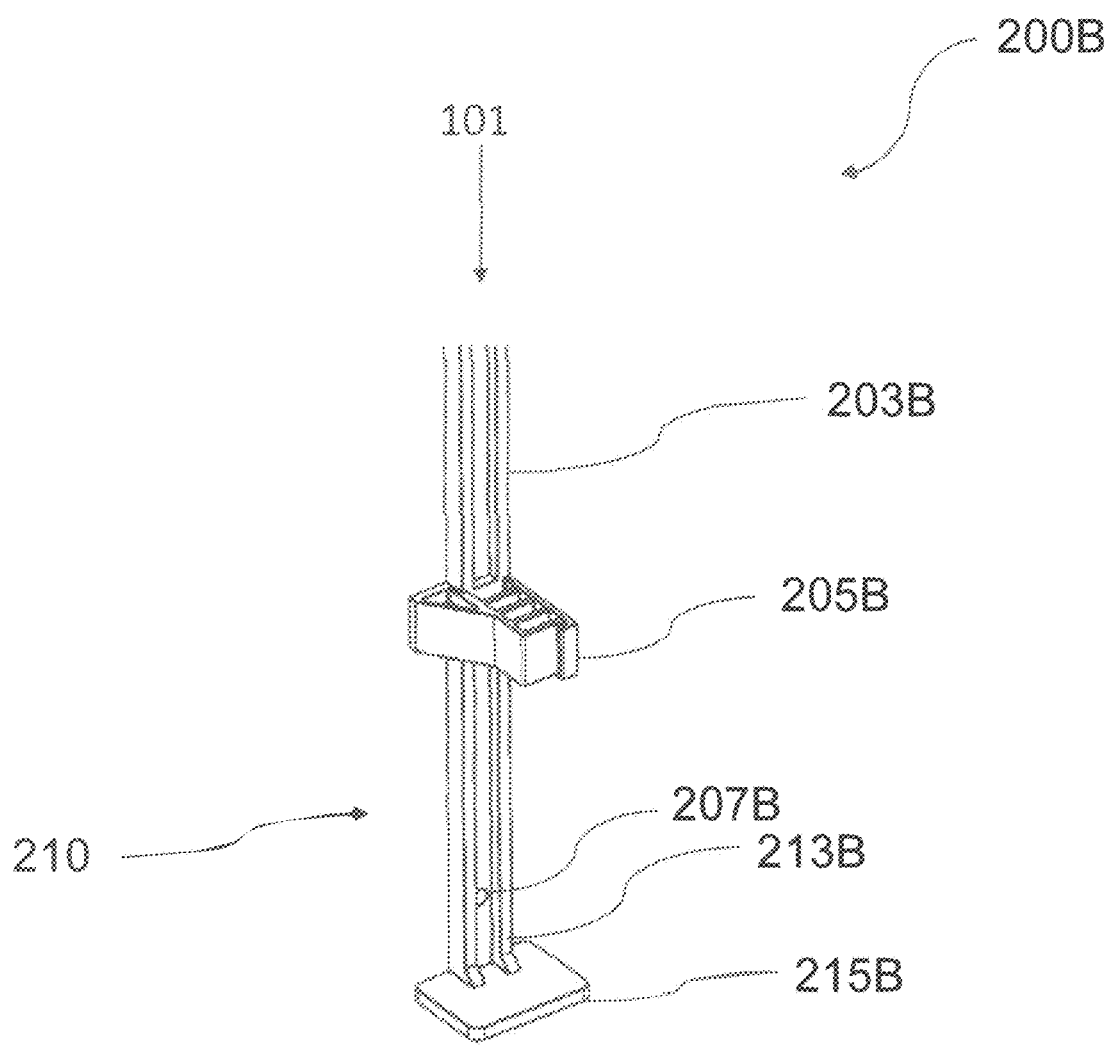
FIG. 23 illustrates a close up perspective view of the short version of the mounting guide for placing a gang box bottom.

Specifically referring to FIGS. 22-23, there is illustrated a substantially horizontally planar foot portion 215 that is coupled to a bottom end 213 of the lower portion 210 of the frame assembly 200B, the frame assembly 200B designed to rest on the foot portion 215 when the foot portion 215 is disposed on a surface, the lower portion 210 extending upward from the foot portion 215 a predetermined height for the placement of the gang box 270 between the upper horizontal portion 260B and the lower horizontal portion 240B of the frame assembly 200B.

Figure 26:
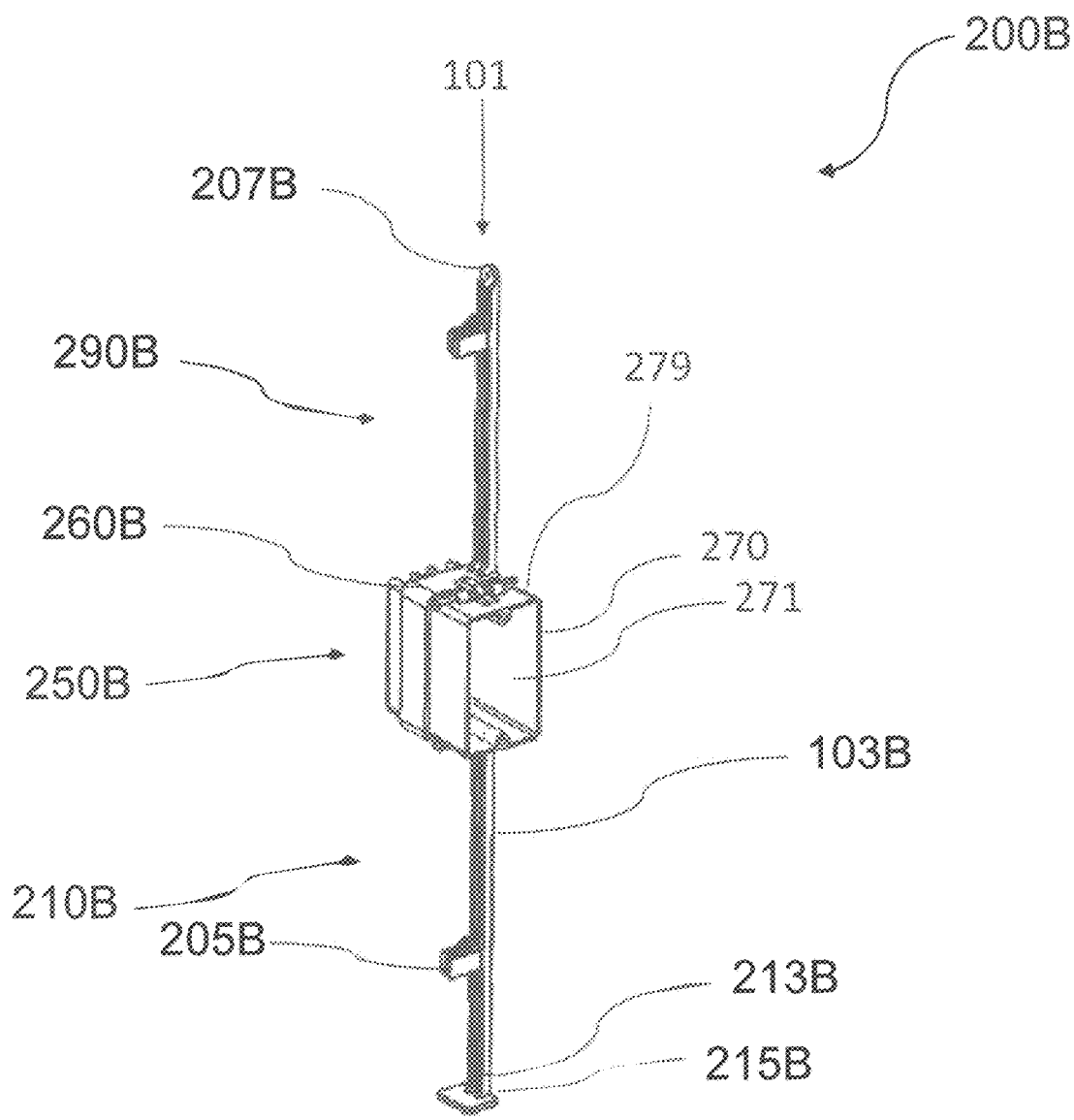
FIG. 26 illustrates a close up perspective view of the short version of the mounting guide for placing a gang box within the actual mounting guide.
Figure 38:
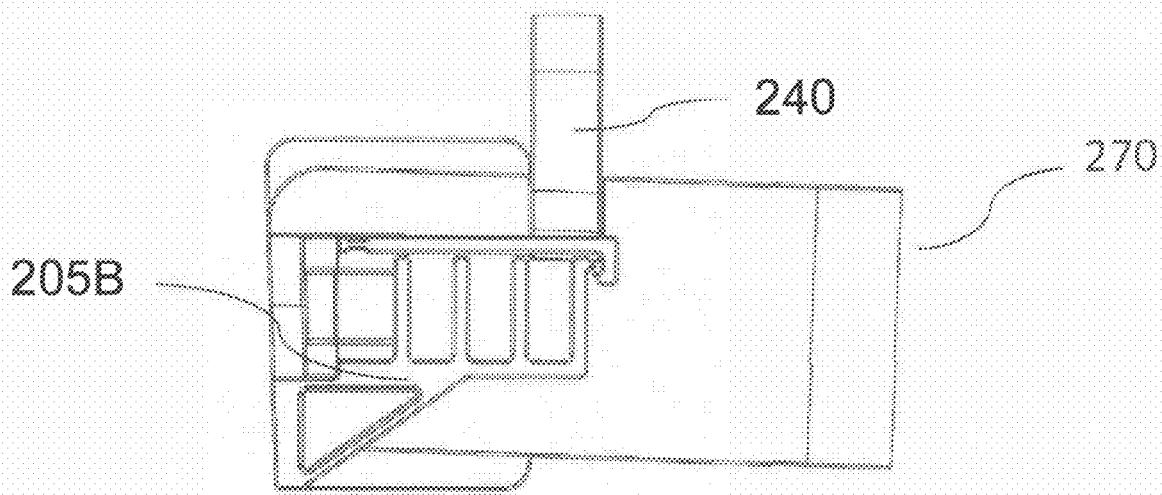
FIG. 38 illustrates a top view of the short elongate version of the mounting guide for a gang box.

Referring now to FIGS. 26 and 38, there is illustrated an embodiment of the mounting guide 20B for placing an actual gang box 270 (within middle portion 250B) on a wall structure wherein the spacing between the lower horizontal portion 240B and the upper horizontal portion 260B is substantially equal to the vertical height of the mounted gang box assembly 270, the lower horizontal portion 240B and the upper horizontal portion 260B designed to couple substantially contiguously to a bottom portion of the gang box assembly 271 and a top portion of the gang box assembly 279 to hold the gang box assembly 270 substantially in place.

Figure 39:
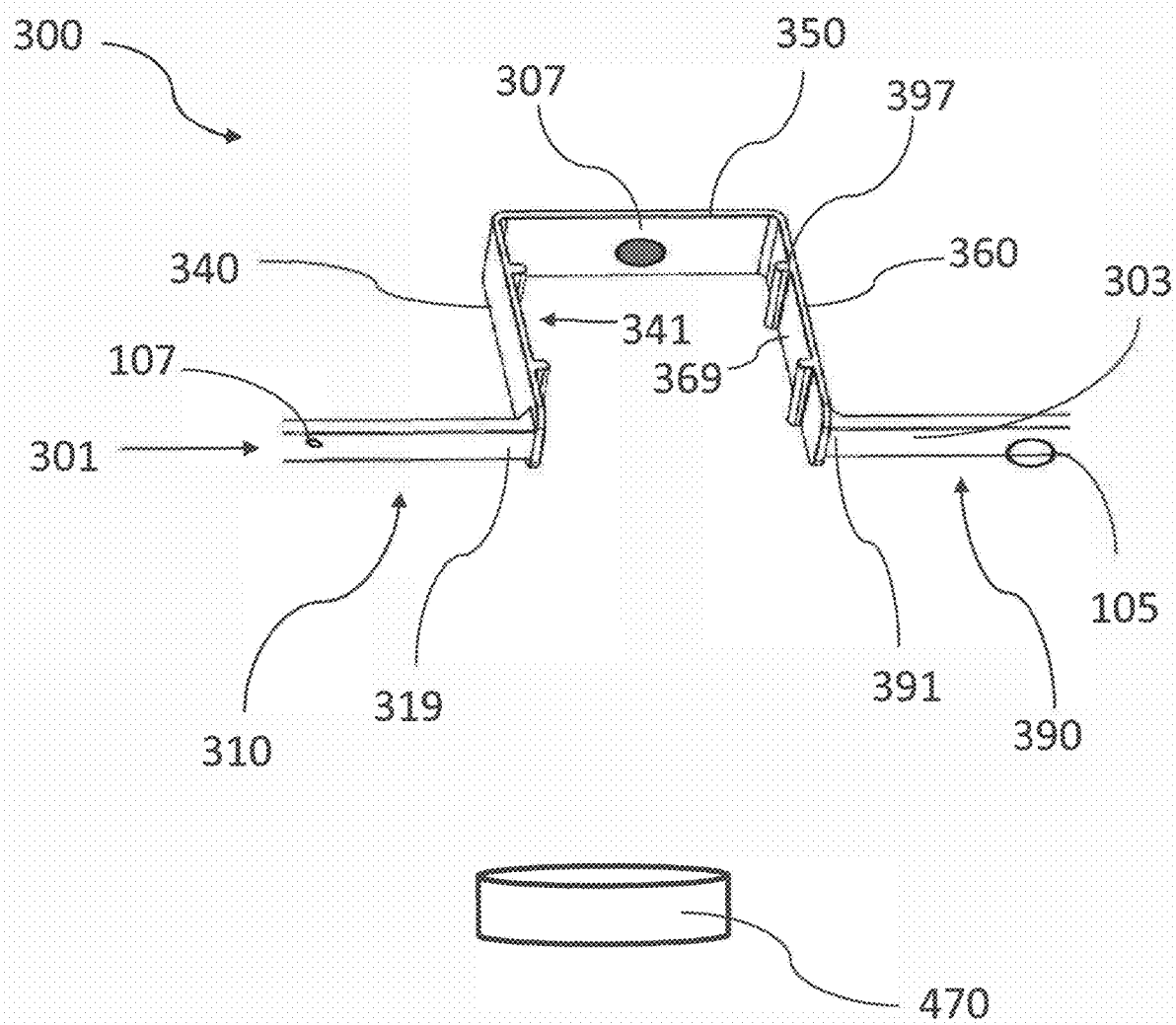
FIG. 39 illustrates a perspective view of the horizontally mounted version of the mounting guide for placing a gang box along with a paddle fan box.
Figure 40:
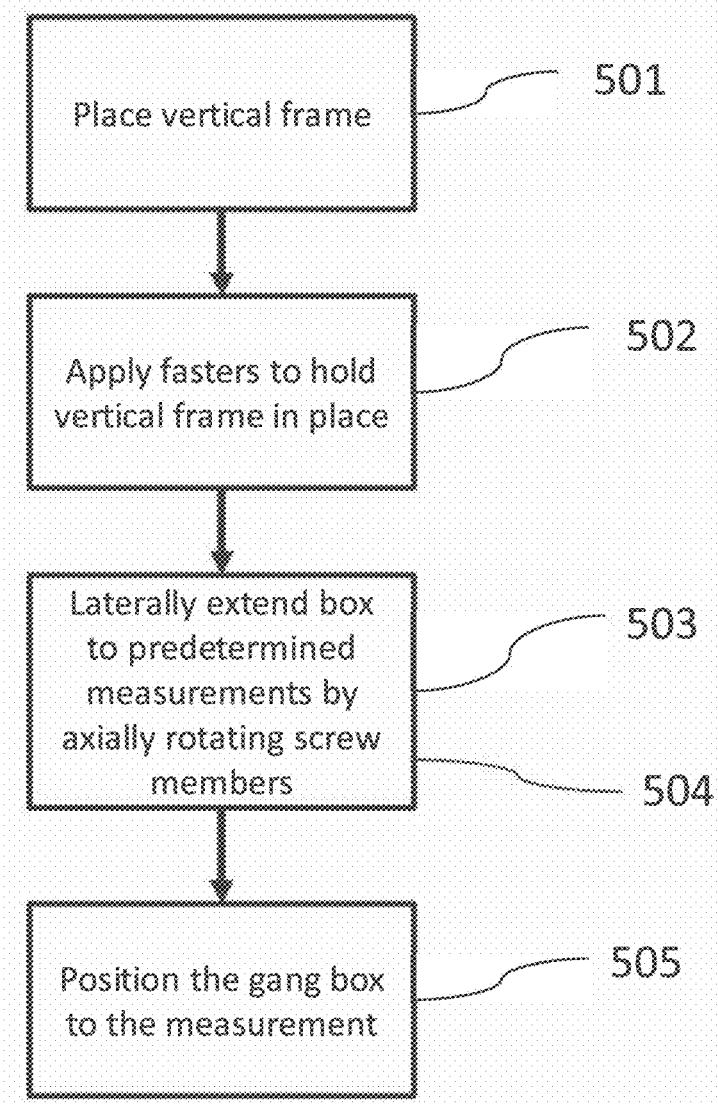
FIG. 40 illustrates a method for placing a gang box using the laterally extendable box member.

Referring now to FIG. 39, there is illustrated an embodiment of the mounting guide for placing a gang box 270 on a support structure that has an elongate, horizontal frame assembly 300 that has a longitudinal axis 301 with a horizontal body 303 with a proximal portion 310 and distal portion 390, a substantially proximal vertical portion 340 substantially perpendicular to the longitudinal axis 301 and extending from a distal end 319 of the proximal portion 310 of the frame assembly 300 and a substantially perpendicular distal vertical portion 360 extending from a proximal end of the distal portion 391 of the frame assembly 300, the distal vertical portion 360 and the proximal vertical portion 340 extending laterally at a substantially uniform width, a distal face of the proximal vertical portion 369 opposite a proximal face of the distal vertical portion 341. A middle portion of the frame assembly 350 is disposed between the distal vertical portion 360 and the proximal vertical portion 340 and parallel and substantially offset or disposed laterally from the distal portion 390 and proximal portion 310 of the frame assembly 300. One or more hoop or clip assemblies 105 is disposed on the frame assembly 300 designed to secure at least one wire assembly. One or more hole portions 107 are disposed through the frame assembly designed to receive a fastener assembly therethrough. In this embodiment, a support attachment 307 may be used to mount a gang box 270 to the horizontal frame assembly 300 to reflect a downward pull of gravity on the inventive concept when the inventive concept is in a horizontal orientation. One or more protrusions 397 may be disposed on the vertical portions of the frame assembly 340, 360.

FIG. 39 further illustrates one embodiment of the mounting guide for placing a gang box 270 on a support structure, this also a horizontally oriented embodiment of the horizontal frame assembly 300. In this embodiment, a paddle fan box may be attached 470.

Referring now to a novel mounting rail and gang box system, the embodiments of which are illustrated in FIGS. 41-68, there is provided a gang box system for installing wiring devices that provides for a high level of flexibility during construction depending on the challenged faced by the home builder or contractor. Time savers in installing gang box devices in many cases far outweigh the incremental increase in cost of using such an improved system. The mounting rail system described herein will speed up the process of locating and installing wiring boxes before drywall is installed and before door frames are installed. In some cases, wiring boxes can be installed and moved to a more desired location without the need for customized frames to support the wiring box. In construction, time is truly money hence the invention and embodiments described herein substantially reduce installation time and additional callbacks for modifications.

Figure 41:
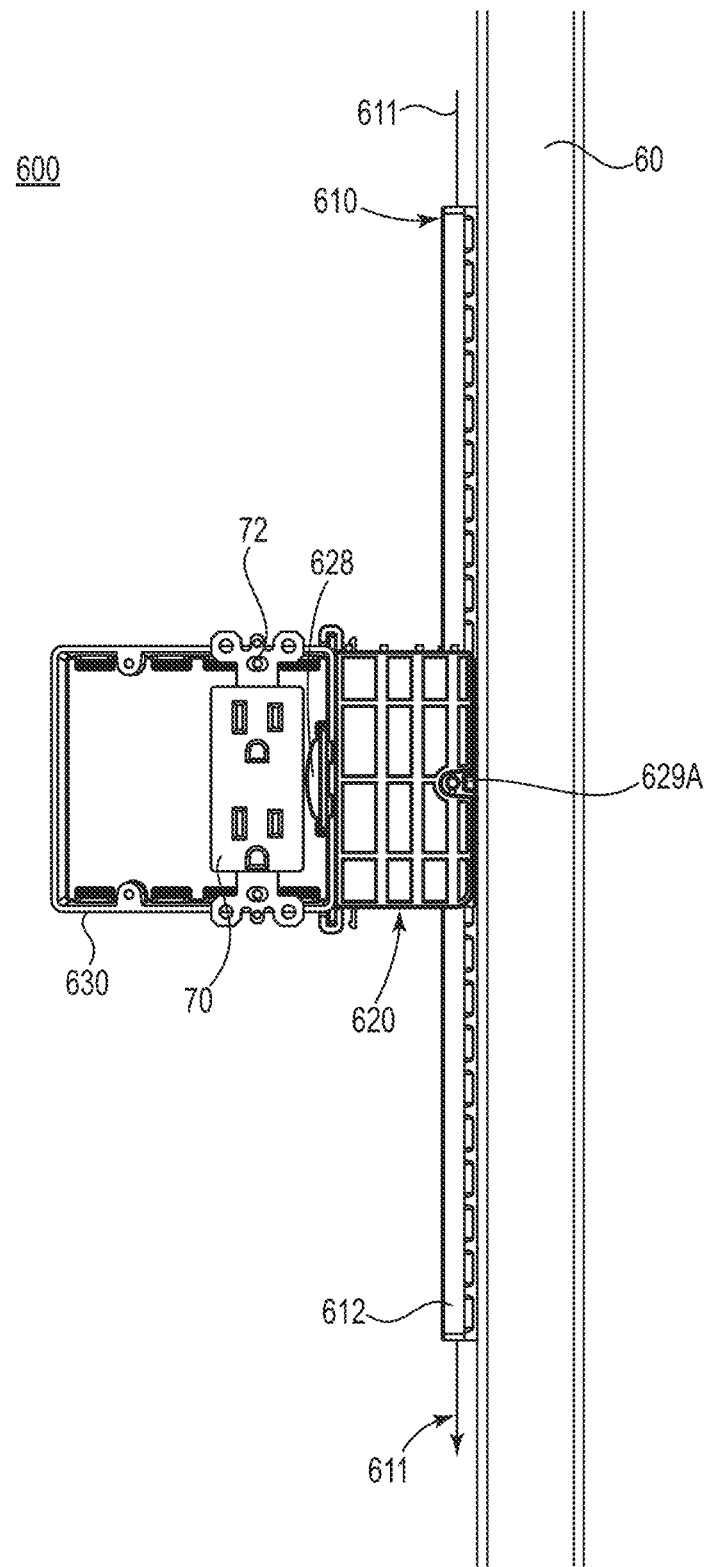
FIG. 41 illustrates a front view of an embodiment of a novel mounting rail system with a three-way adjustable gang box assembly on an extendable member for actively locating or placing a gang box member on a wall stud or wall structure.
Figure 42:
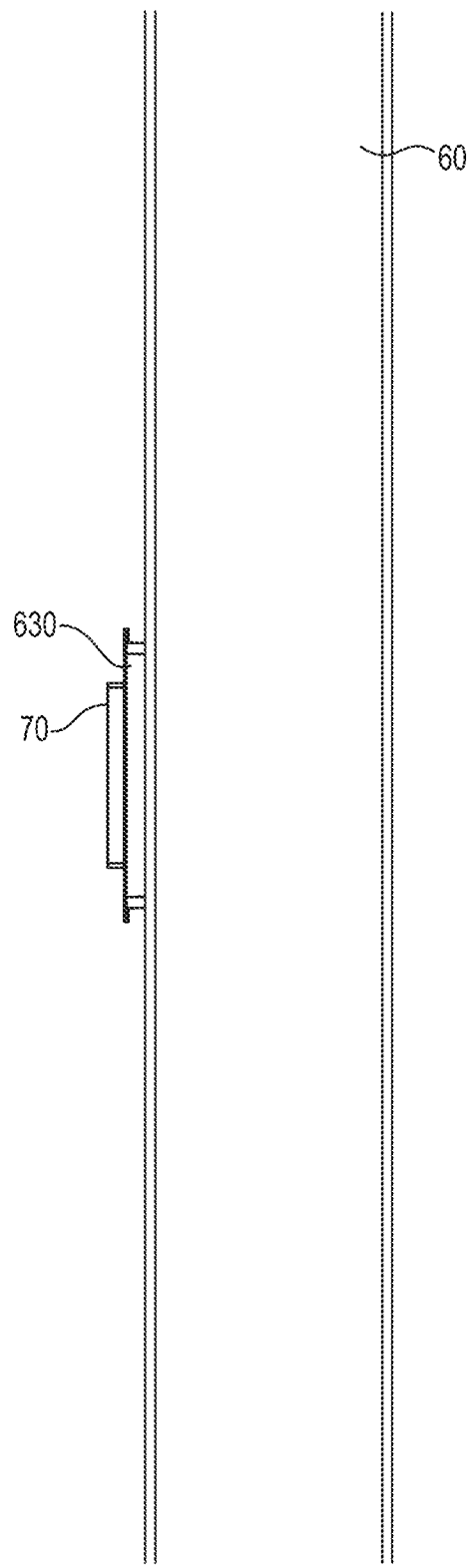
FIG. 42 illustrates a right side view of the gang box member on the mounting rail system.
Figure 43:
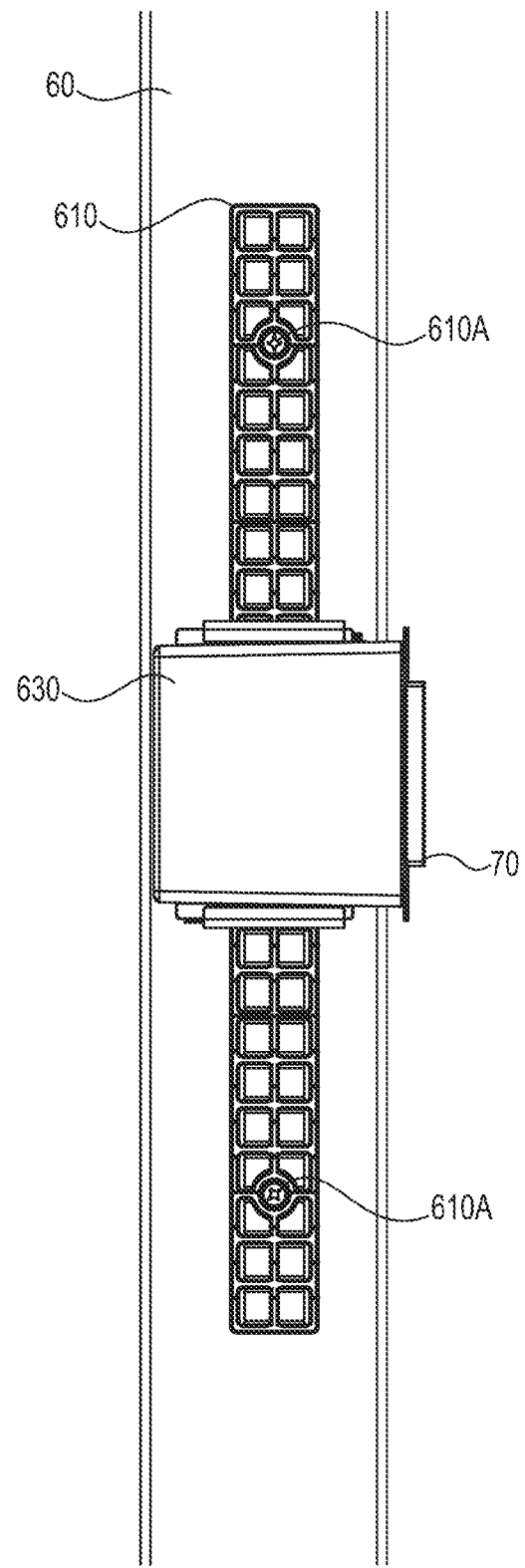
FIG. 43 illustrates a left side view of the gang box member located on the mounting rail system.
Figure 44:
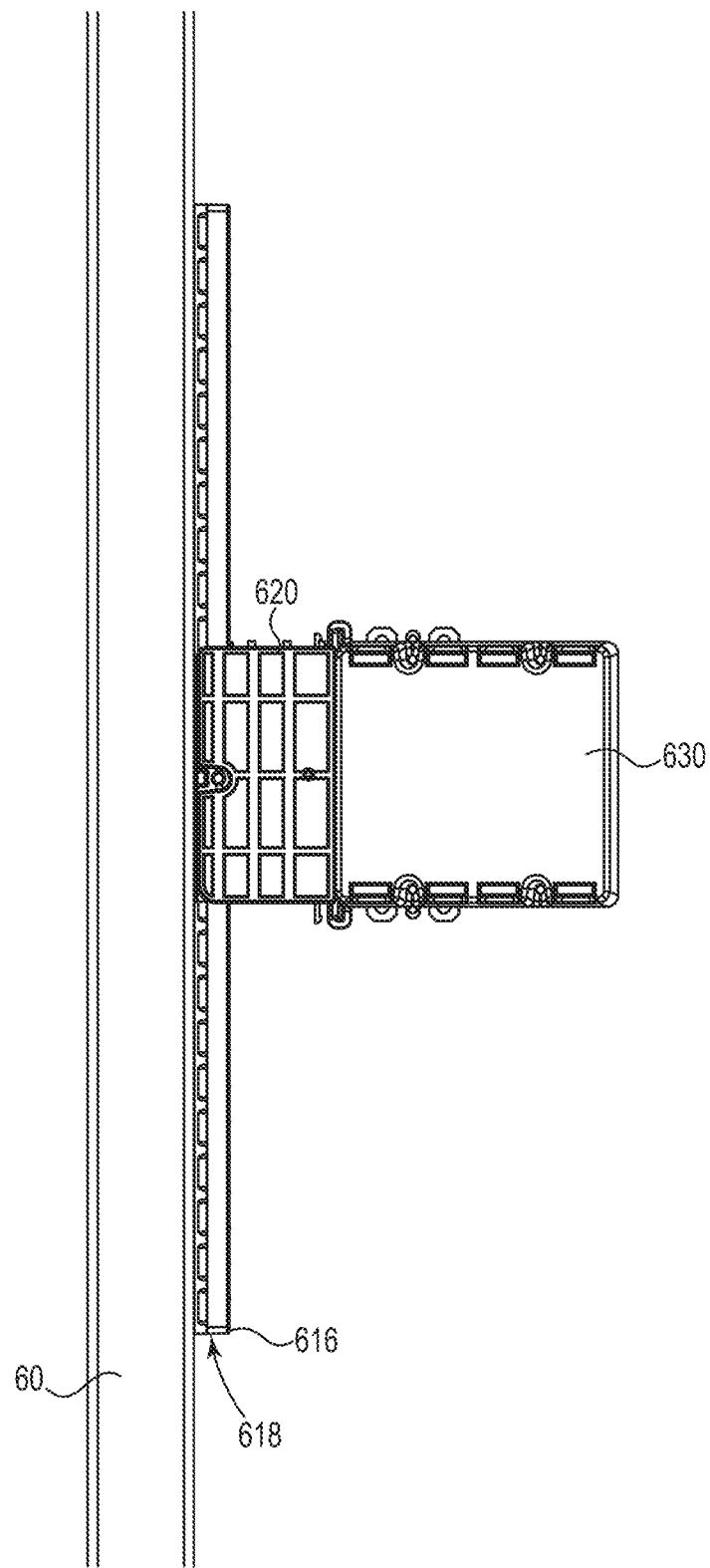
FIG. 44 illustrates a rear or back view of the mounted gang box member on the mounting rail system on the wall stud.
Figure 45:
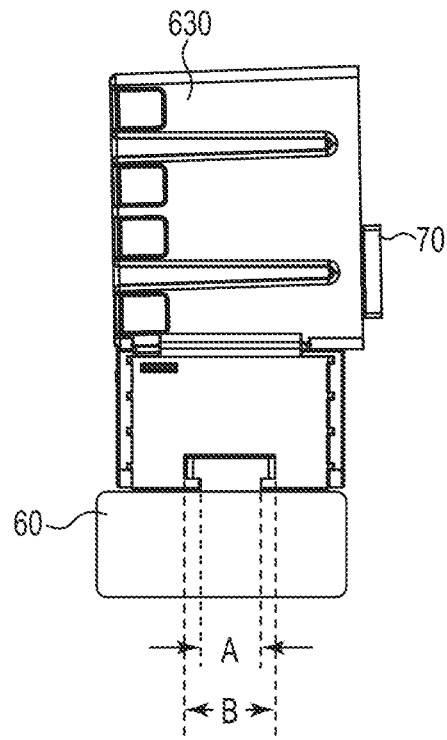
FIG. 45 illustrates a bottom view of the mounted gang box member on the mounting rail system.
Figure 46:
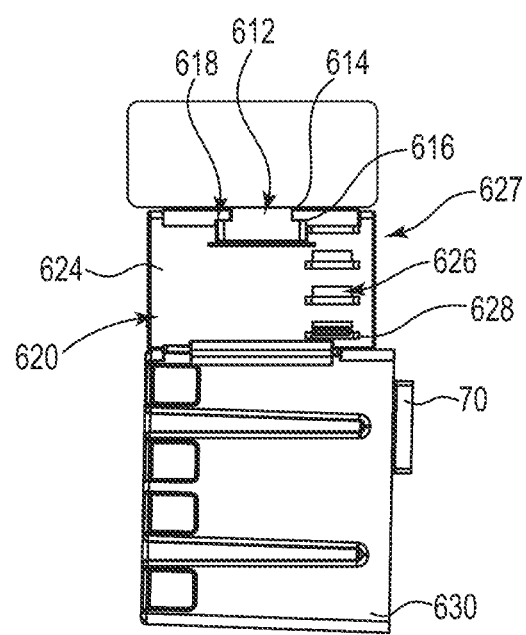
FIG. 46 illustrates a top view of the mounted gang box member with a set of lateral tabs for tab setting in an extended mode.
Figure 47:
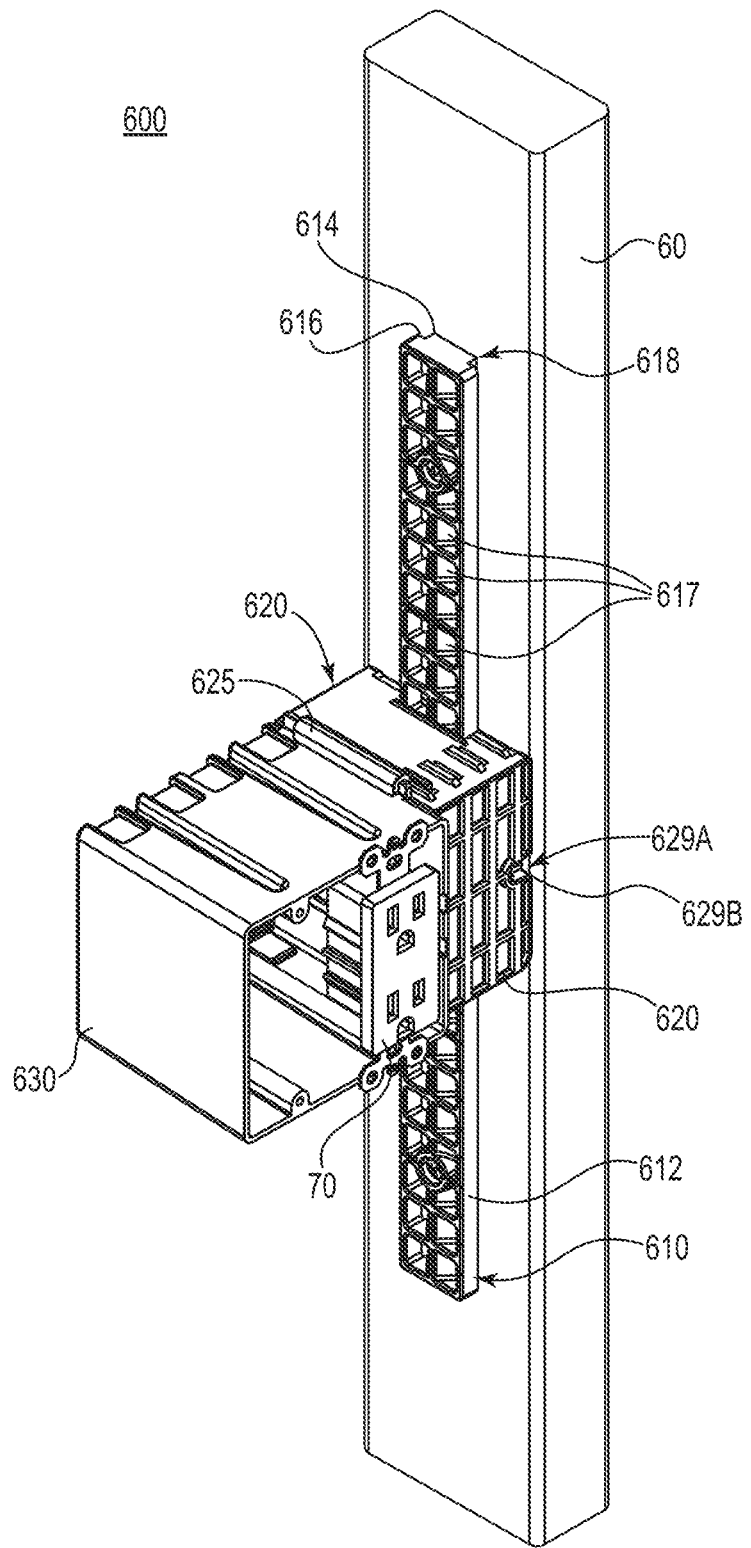
FIG. 47 illustrates a perspective view of the mounted gang box member on the mounting rail system.
Figure 48:
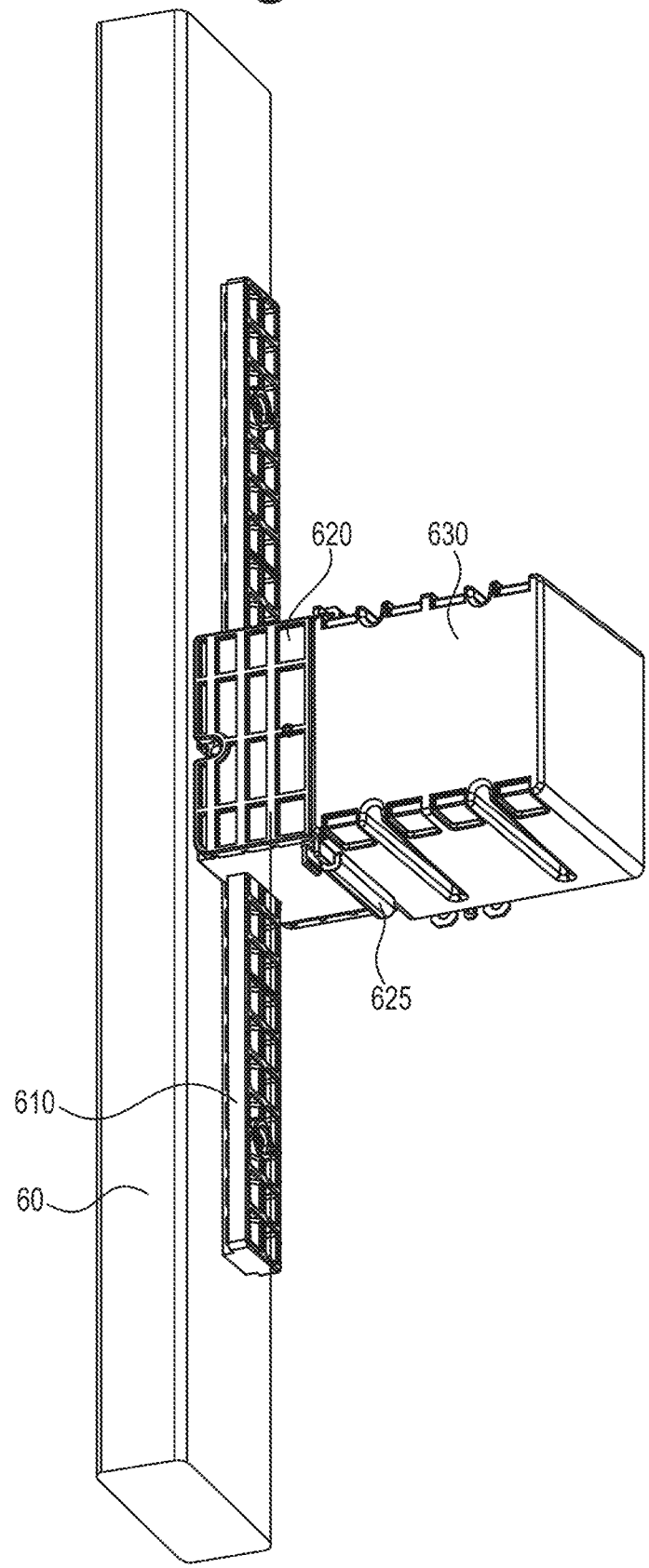
FIG. 48 illustrates a rear or back perspective view of the mounted gang box member on the mounting rail system.

Referring now to a first embodiment of a combination mounting rail system and associated gang box members 600 illustrated in FIGS. 41-53, FIGS. 41, and 49-53 primarily illustrate a novel three-way adjustable gang box member mounting system 600 that provides maximum positioning and affixing of wiring device housings (i.e., gang boxes) and wiring devices (outlets and switches or controllers or dimmers) on any wall stud or structure 60. In particular, FIG. 41 illustrates a front view of an embodiment of a novel mounting rail system 600 including a mounting rail assembly 610 supporting a three-way adjustable gang box assembly 630 disposed on an extendable member 610 for actively locating or placing a gang box member 632 on a wall stud or wall structure 60. FIGS. 42 and 43 illustrate a right side and left side views of the gang box member 632 on the mounting rail assembly 610, while FIGS. 43 and 44 illustrates a left side view of the gang box member 632 with a wiring device 70 and a rear or back view of the mounted gang box member 632 on the mounting rail assembly 610 on the wall stud 60 with screws 61 placed through holes or apertures 610A. FIG. 45 illustrates bottom view of the mounted gang box member 632 on the mounting rail assembly 610 supported by extendable member 620 while FIG. 46 illustrates a top view of the mounted gang box member 632 also supported by extendable member 620 formed from a concentric first box (not shown) 622 and a second box 624 that includes a set of lateral tabs 626 (with corresponding apertures 628) for tab setting or lateral movement in an extended mode. FIGS. 47-48 illustrate a front perspective view and a rear perspective view, respectively, of the mounted gang box member 630 on the mounting rail assembly 610.

Figure 49:
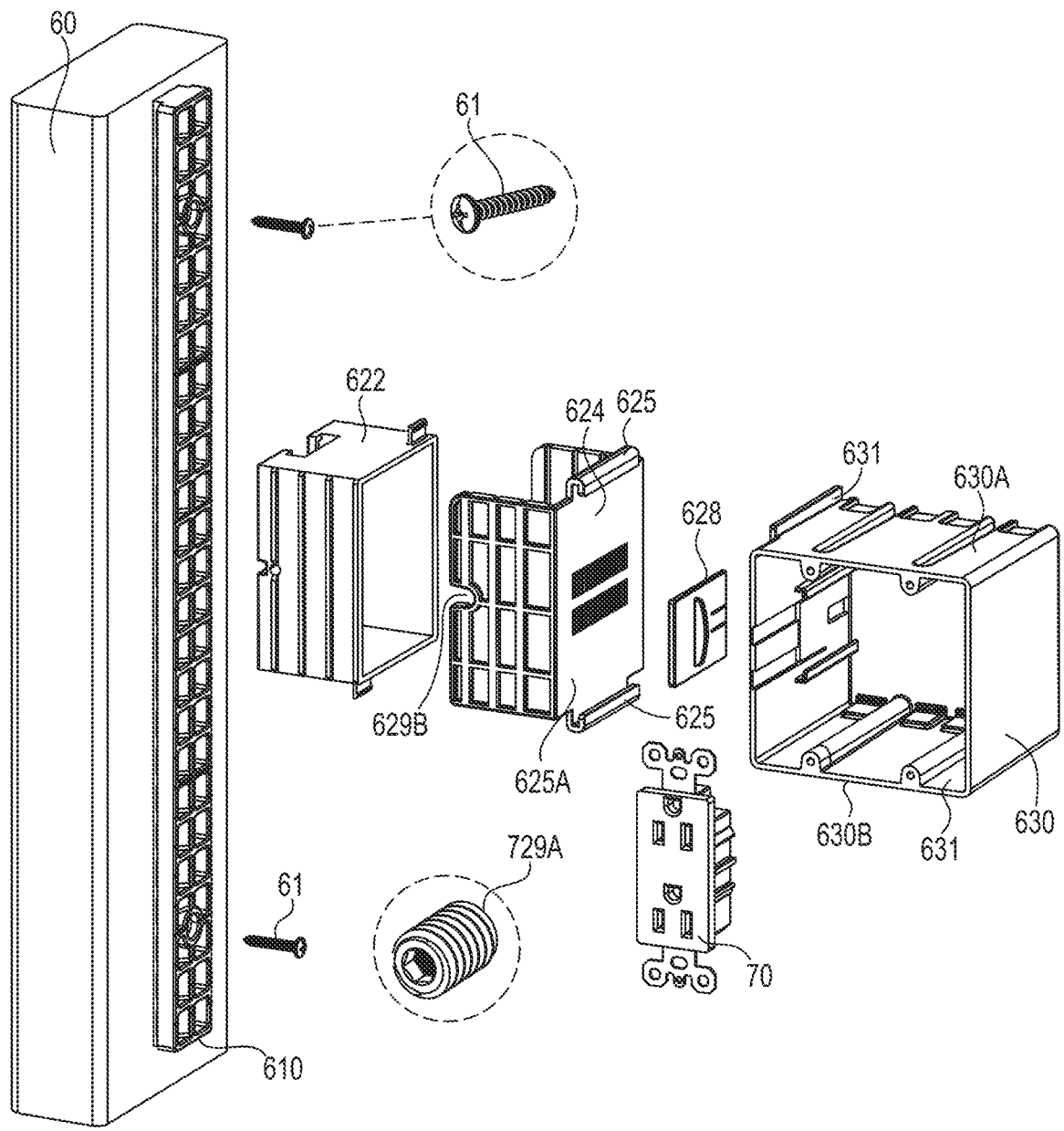
FIG. 49 illustrates an exploded perspective view of the novel mounting rail system with the three-way adjustable gang box assembly on an extendable member which is mountable on the rail system.

Referring now to FIGS. 49-53B, and more specifically to FIG. 49, there is illustrated an exploded perspective view of the novel mounting rail system 600 including mounting rail assembly 610 with the three-way (XYZ directional movement—see axes figure) adjustable gang box assembly 630 on an extendable member 610 which is mountable on the rail assembly 610 for placing or locating a gang box 632 on a wall structure 60. In this example embodiment, system 600 includes an elongate mounting rail assembly 610 (mounted on stud 60 with beam attachment screws 61) with a longitudinal axis 611 therethrough having an elongate body 612 designed to be attached to the wall structure 60 (in this case a stud), the elongate body 612 having a rail configuration that includes an elongate base portion 614 with a first width A (see FIG. 45) designed to be in contact with the wall structure and an elongate front portion 616 with a second width B (see FIG. 45) extending laterally from the elongate base portion 614, such that the elongate base and front portions 614 and 616 in combination form longitudinal side channels 618 on both sides of the elongate body 612 thereby forming the rail configuration. In this example embodiment, the first width A of the elongate base portion 614 of the elongate body 612 of the mounting rail assembly 610 is less than the second width B of the elongate front portion 216. In a related embodiment, the first width A of the elongate base portion 614 of the elongate body 612 of the mounting rail assembly 612 is greater than the second width B of the elongate front portion 616, thereby providing for a different rail configuration by which the gang box member is to move vertically. In this example embodiment, the elongate front portion 616 of the mounting rail 610 includes a plurality of apertures 617 formed through the elongate front portion 616 of the mounting rail assembly 610, each of the apertures 617 designed to receive a cable or wire member fastener for securing the cable or wire member to the elongate body 612.

In this example embodiment, system 600 further includes a laterally extendable box assembly 620 designed to be slidably mounted on the longitudinal side channels 618 of the mounting rail assembly 610 via an open rail channel 621 formed on a surface 621A of first box 622 of the extendable box assembly 620 thereby facilitating longitudinal or vertical movement of the extendable box assembly 620 along the mounting rail assembly 610. In this example embodiment, the extendable box assembly 620 includes a stop member 625 designed to affix the extendable box assembly 620 at a desired longitudinal position along the rail assembly 610. Extendable box assembly 620 is configured from a first box 622 and a second box 624 designed to fit over the first box 622 in a concentric configuration.

In this example embodiment, system 600 further includes a gang box member 630 designed to be mounted on a surface 624A of the extendable box assembly 620, which in this case is surface 624A of second box 624. Mounting surface 624A of the extendable box assembly 620 is disposed laterally away from the rail assembly 610 and elongate body 612 and includes upper and lower U-shaped latching members 625 designed to receive a side of the gang box member 630 having corresponding slider rails 632, the corresponding slider rail or rails 632 being disposed on an upper and lower portions 630A and 630B of the gang box member 630 adjacent to U-shaped latching members 625, the gang box member 630 having an open end 631 forming a plane that is parallel to the longitudinal axis 611 of the mounting rail assembly 610.

In this example embodiment, first box 622 and second box 624 of the extended box assembly 620 are configured to include at least one of a frictional fit or a latching mechanism 627 to facilitate lateral movement between the first box and the second box, thereby facilitating the horizontal movement or location of the gang box member 630 closer to or away from mounting rail 610. Latching mechanism 627 includes at least one tab member 626 protruding upwards from the first box 622 and tab receiving apertures 628 on the second box 624 that in combination facilitate lateral or horizontal movement between the first and second boxes into predetermined fixed locations or positions.

Referring now to FIGS. 49, 51A and 51B, in this example embodiment, the gang box member 630 includes an in-out sliding tab member 628 (inset A-1) designed to fit on side channels 629 located on gang box member 630 to slidably engage the extendable box assembly 620, wherein the in-out tab member 628 is designed to allow the gang box member 630 to move forward and backward (Inset B-1) from the wall structure 60. Gang box member 630 includes at least one from the group comprising a single gang box, a multiple gang box, a single mud ring member, a multiple mud ring member and a combination mud ring and gang box member.

Figure 50:
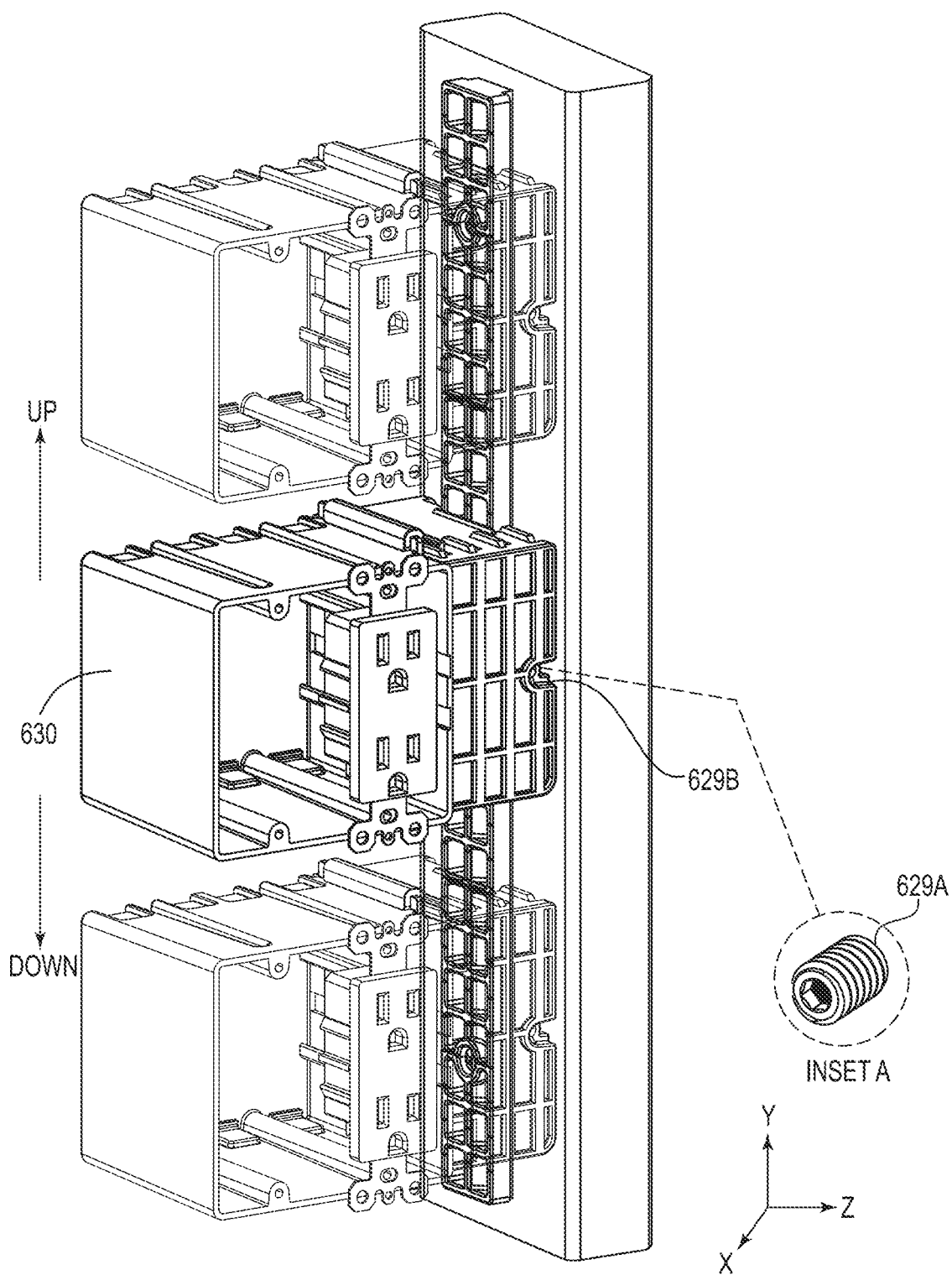
FIG. 50 illustrates a perspective view of the Y-direction adjustability (up and down along the axis of the stud) of the gang box member on the rail mounting system.

In this example embodiment, FIG. 50 illustrates a perspective view of the Y-direction adjustability (up and down along the longitudinal axis 611 of the stud 60) of the gang box member 620 on the rail mounting system 600. In particular, this embodiment utilizes stop member 629 designed to affix the extendable box assembly 620 at a desired longitudinal position along the rail assembly 610 and which uses a socket screw 629A which fits in an aperture 629B in the extendable box assembly.

In this example embodiment, FIGS. 52A and 52B illustrate perspective and side views, respectively, of the X-direction (laterally outward away from the wall stud 60) adjustability of the gang box member 630 on the rail mounting 610. FIG. 52B provides views of 3 tab settings in which gang box member 630 is movable laterally or horizontally away from wall stud 60 in successive order.

Figure 53A:
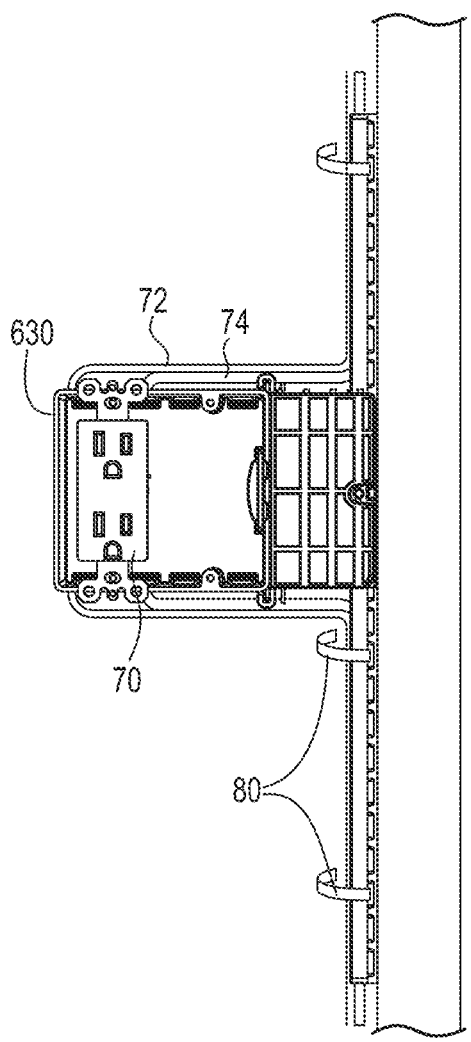
FIGS. 53A and 53B illustrate front and side views, respectively, of the mounted gang box member with actual wiring and attachment of wiring to mounting rail member.
Figure 53B:
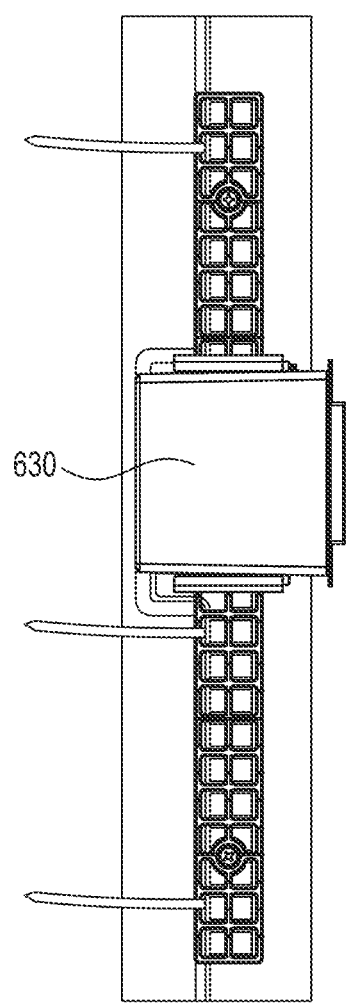

In this example embodiment, FIGS. 53A and 53B illustrate front and side views, respectively, of the mounted gang box member 630 with actual wiring 72 and 74 and attachment of wiring to mounting rail member 610 with cable ties 80 fed through the apertures in elongate body 612.

Figure 54:
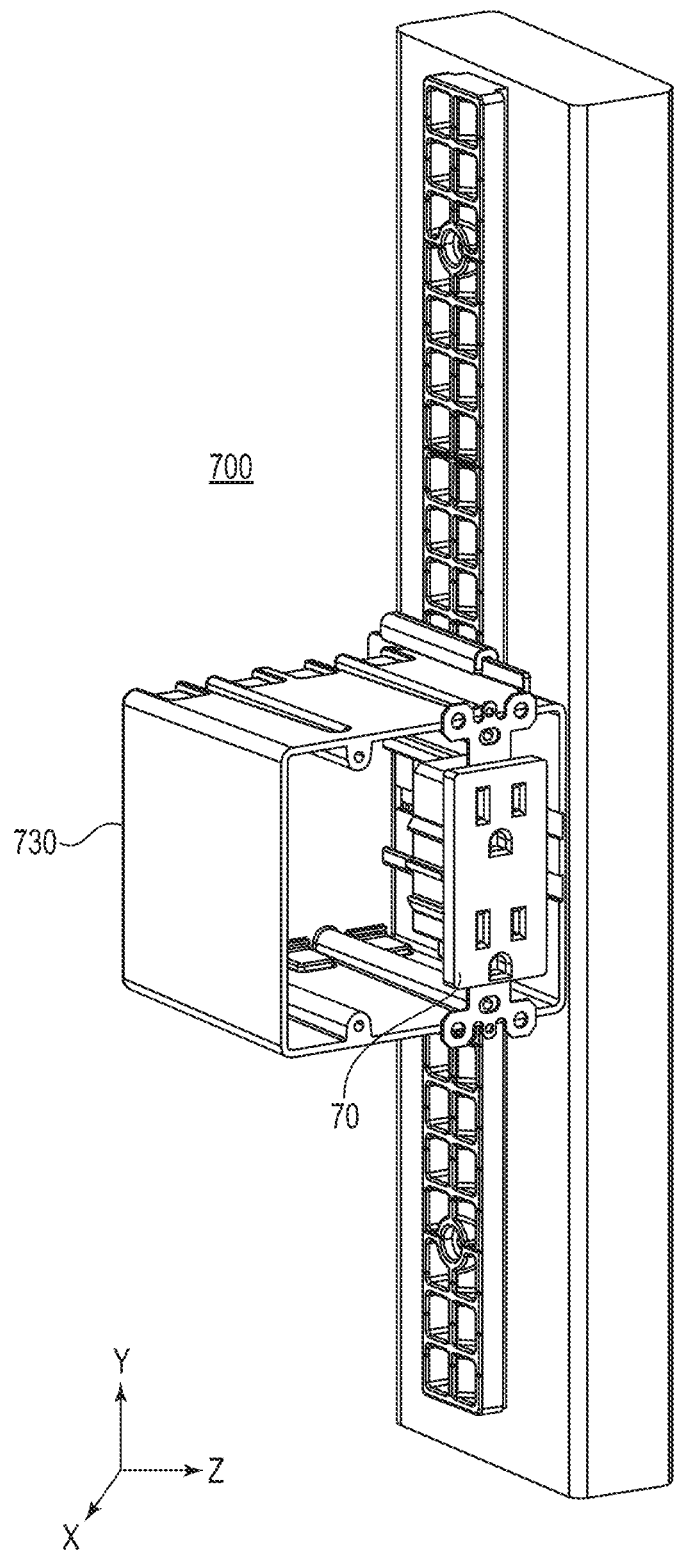
FIG. 54 illustrates a perspective view of yet another embodiment of a two-way (Y-Z direction) adjustable gang box assembly and mounting rail system.
Figure 55A:
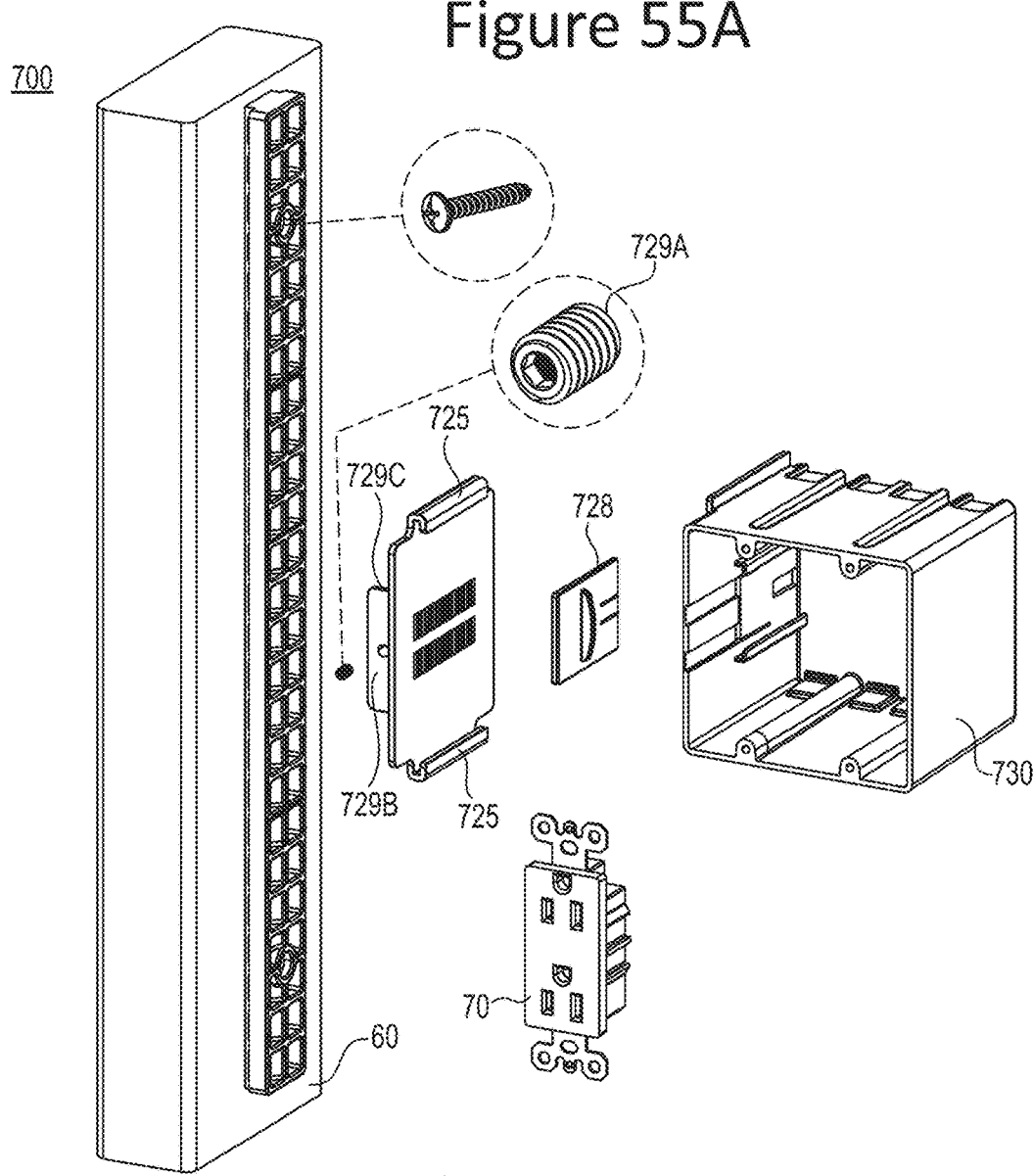
FIGS. 55A and 55B illustrate exploded perspective and front views, respectively, of the two-way adjustable gang box assembly and mounting rail system.
Figure 55B:
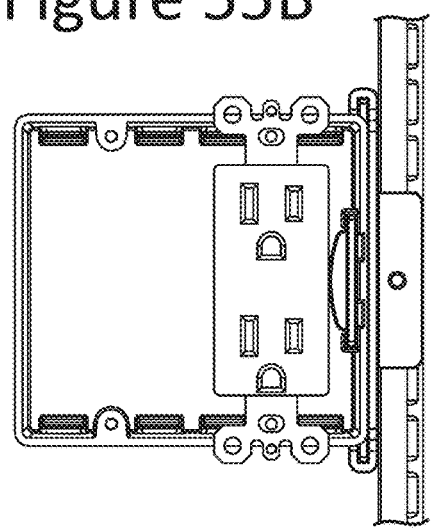
Figure 56:
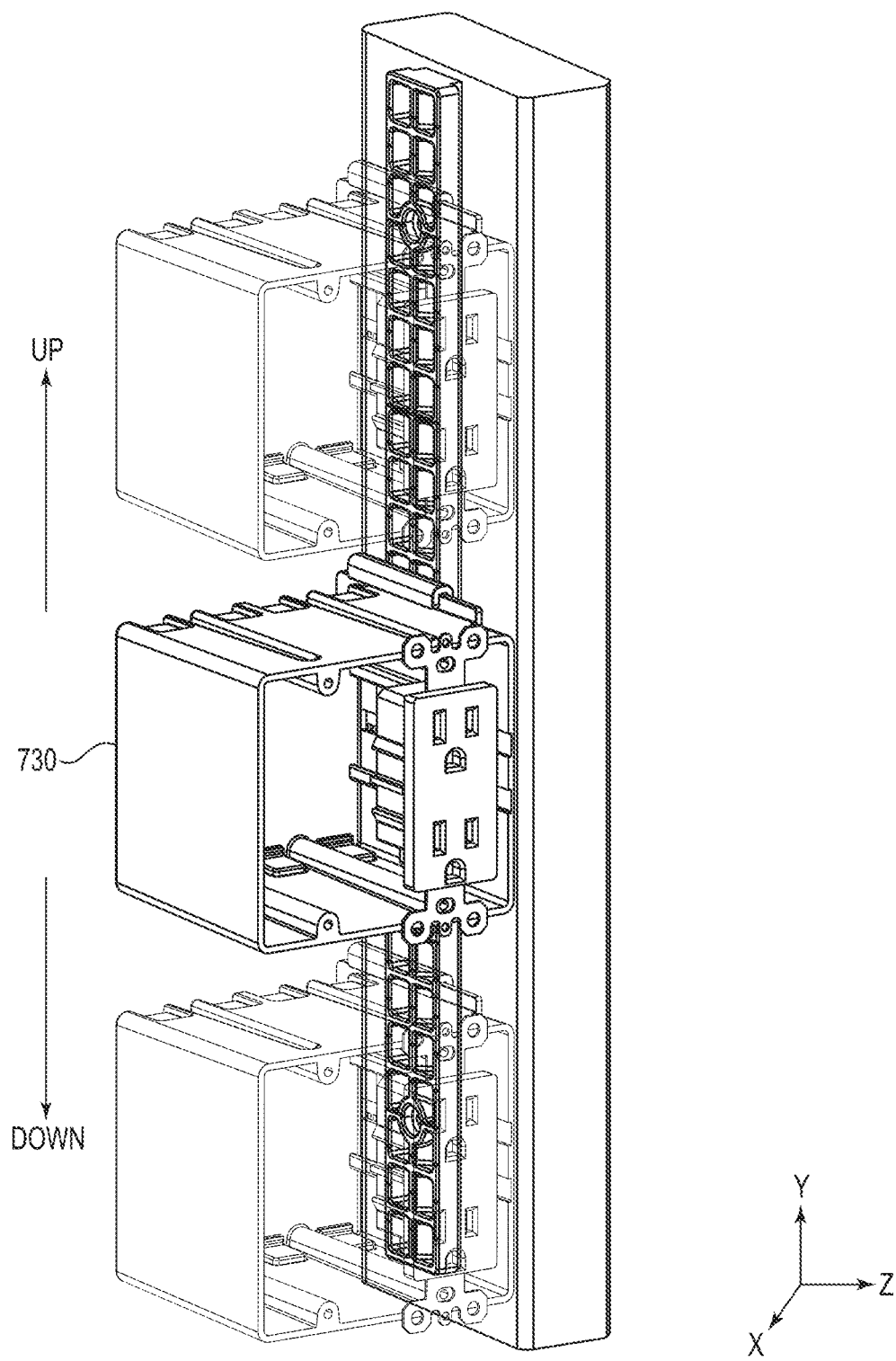
FIG. 56 illustrates a perspective view of the Y-direction adjustability of the gang box assembly on the mounting rail.

Referring now to novel gang box mounting system 700 illustrated in FIGS. 54-59, there is illustrated in FIG. 54 a perspective view of yet another embodiment of a two-way (Y-Z direction) adjustable gang box assembly 730 and mounting rail system 710. FIGS. 55A and 55B illustrate exploded perspective and front views, respectively, of the two-way adjustable gang box assembly 730 and mounting rail 710. FIG. 56 illustrates a perspective view of the Y-direction adjustability of the gang box assembly on the mounting rail.

In this example embodiment, a mounting rail and gang box member installation system 700 for placing a gang box member 730 on a wall structure 60 includes an elongate mounting rail assembly 710 with a longitudinal axis 711 therethrough having an elongate body 712 adapted to be attached to the wall structure 60, the elongate body 712 having a rail configuration that includes an elongate base portion 714 with a first width A adapted to be in contact with the wall structure and an elongate front portion 716 with a second width B extending laterally from the elongate base portion 714, wherein the elongate base and front portions 714 and 716 in combination form longitudinal side channels 718 on both sides of the elongate body 712 thereby forming the rail configuration.

In this example embodiment, a gang box member mounting bracket assembly 720 is designed to be mounted on the longitudinal side channels 718 of the mounting rail assembly 710 via a rail channel structure 721 formed on a surface of the gang box member mounting bracket assembly 720 thereby facilitating longitudinal movement of a gang box member 730 along the mounting rail 710, the gang box member mounting bracket assembly 720 including a stop member 729 designed to affix the gang box member mounting bracket assembly 720 at a desired longitudinal position along the rail assembly 710.

System 700 further includes a slidable gang box member 730 designed to be mounted on the gang box member mounting bracket assembly 720, the mounting surface 724 of the gang box mounting bracket 720 assembly disposed laterally away from the rail assembly 710 and including upper and lower U-shaped latching members 725 designed to receive a side of the gang box member 730 having corresponding slider rails 731. Slidable gang box member 730 includes an in-out tab member 728 designed to fit on the gang box member 730 to slidably engage the mounting bracket assembly 720, where the in-out tab member 728 is designed to allow the gang box member 730 to move horizontally forward and backward from the wall structure 60 so that wiring device 70 is properly aligned with the wall. In this example embodiment, elongate front portion 712 of the mounting rail assembly 710 includes a plurality of apertures 717 formed through the elongate front portion 712 of the mounting rail assembly, each of the apertures 712 designed to receive a cable or wire member fastener for securing the cable or wire member to the elongate body.

In this example embodiment, stop member 729 includes a socket screw 729A disposed within an aperture 729B in the rail channel structure 729C of the gang box member mounting bracket 720 adjacent the mounting rail assembly 710. The in-out tab member 728 in combination with the mounting bracket assembly 720 allow for a plurality of increments of horizontal movement in a Z-direction. Slidable gang box member 730 includes at least one from the group comprising a single gang box, a multiple gang box, a single mud ring member, a multiple mud ring member and a combination mud ring and gang box member.

Figure 58:
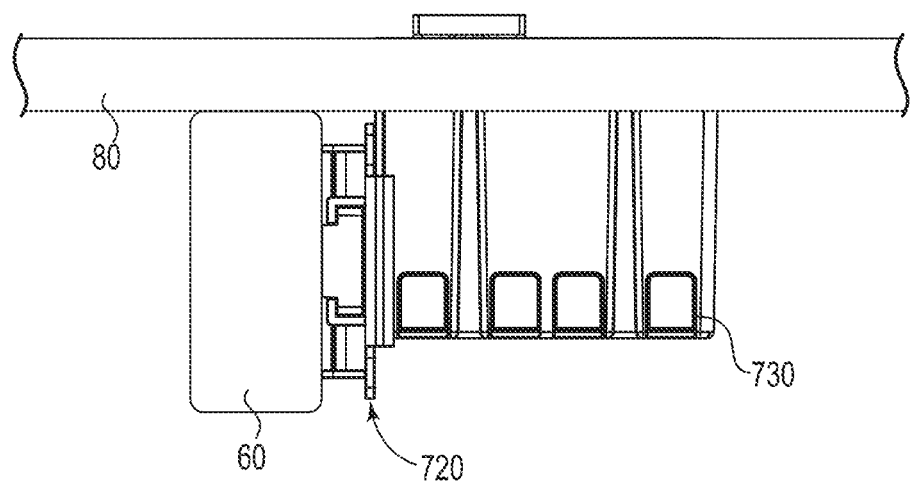
FIG. 58 illustrates a top view of the Z-direction adjustability of the two-way adjustable gang box assembly on the mounting rail before a remodeling project.
Figure 59:
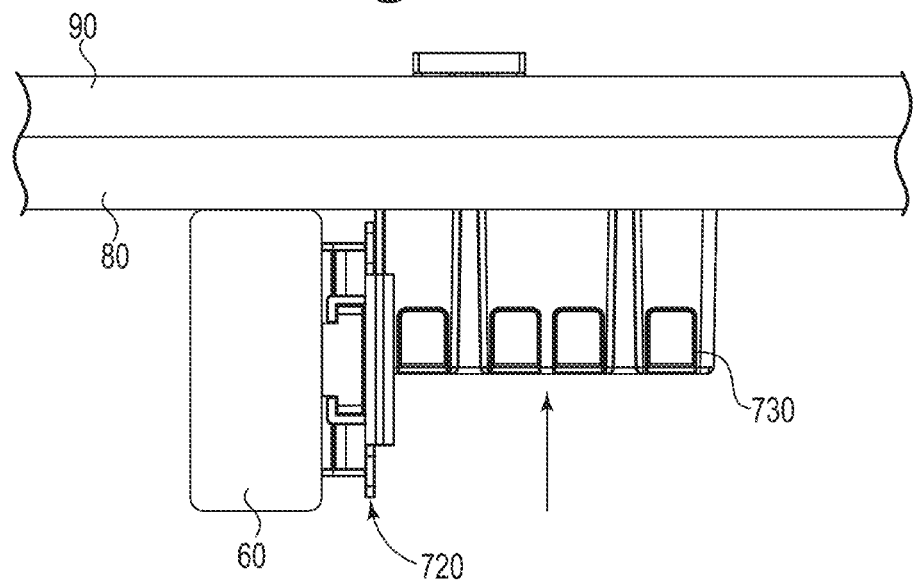
FIG. 59 a top view of the Z-direction adjustability of the two-way adjustable gang box assembly on the mounting rail after a remodeling project.

In this example embodiment, FIGS. 57A and 57B illustrate perspective and side views of the two-way Z-direction adjustability of the gang box assembly 730 on the mounting rail 710. FIG. 58 illustrates a top view of the Z-direction adjustability of the two-way adjustable gang box assembly 730 on the mounting rail 710 before a remodeling project. FIG. 59 a top view of the Z-direction adjustability of the two-way adjustable gang box assembly 730 on the mounting rail 710 after a remodeling project.

Figure 60:
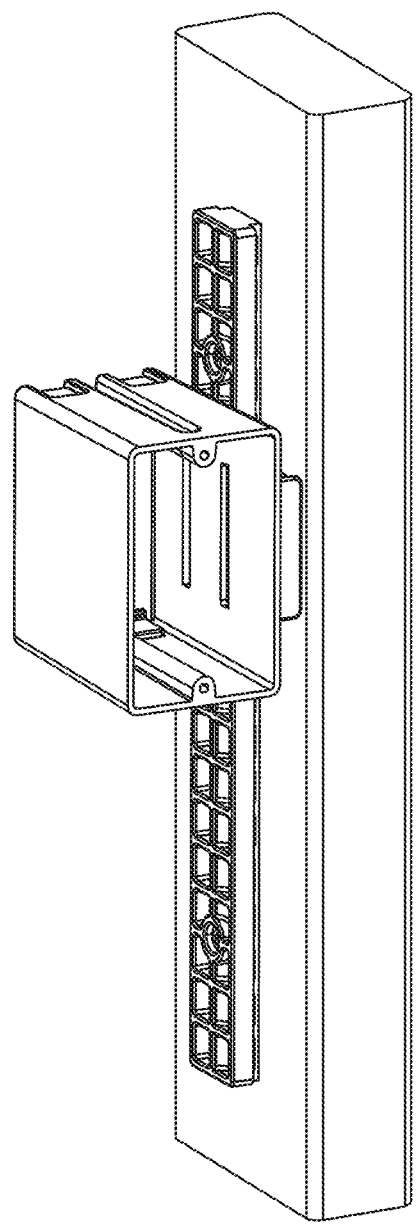
FIG. 60 illustrates a perspective view of another embodiment of a mounting rail system with a one-way Y-direction (vertical) adjustable gang box assembly for actively locating a gang box member on the mounting rail and a wall stud or wall structure.

Referring now to another mounting system for gang box members on a mounting rail 800 illustrated in FIG. 60 as a perspective view of another embodiment of a mounting rail system with a one-way Y-direction (vertical) adjustable gang box assembly for actively locating a gang box member on the mounting rail and a wall stud or wall structure 60. An elongate mounting rail assembly 810 with a longitudinal axis 811 therethrough having an elongate body 812 designed to be attached to the wall structure 60, the elongate body 812 having a rail configuration that includes an elongate base portion 814 with a first width A designed to be in contact with the wall structure 60 and an elongate front portion 816 with a second width B extending laterally from the elongate base portion 814, wherein the elongate base and front portions 814 and 816 in combination form longitudinal side channels 818 on both sides of the elongate body 812 thereby forming the rail configuration.

In this example embodiment, a slidable gang box member 820 designed to be mounted on the longitudinal side channels 818 of the mounting rail assembly 810 via a rail channel structure 830 formed on a surface of the slidable gang box member 820 to facilitate longitudinal movement of the gang box member 820 along the mounting rail assembly 810, the rail channel structure 830 including a stop member mechanism 829 designed to affix the slidable gang box member 820 at a desired longitudinal position along the rail assembly 810. Rail channel structure 830 includes at least two L-shaped sidewalls 832 protruding outward from a side 834 of the slidable gang box member 820, wherein the L-shaped sidewalls 834 are designed to fit about the rail configuration or side channels 818 of the mounting rail assembly 810.

In this example embodiment, stop member mechanism 829 includes a socket screw 829A and an aperture 829B in one of the sidewalls adapted to make frictional contact with the rail assembly to affix the slidable gang box member at a desired vertical position along the rail assembly. The slidable gang box member 830 includes at least one from the group comprising a single gang box, a multiple gang box, a single mud ring member, a multiple mud ring member and a combination mud ring and gang box member.

Figure 61A:
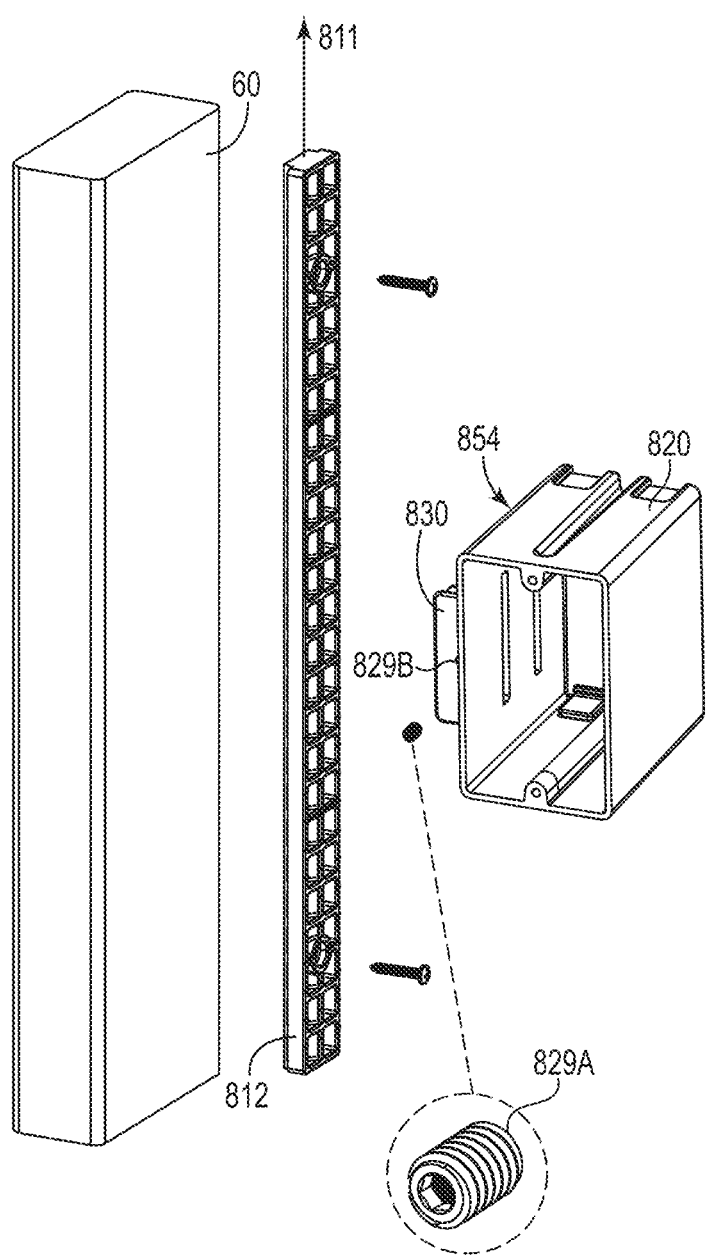
FIGS. 61A and 61B illustrate exploded perspective and front views, respectively, of the one-way adjustable gang box assembly and mounting rail system.
Figure 61B:
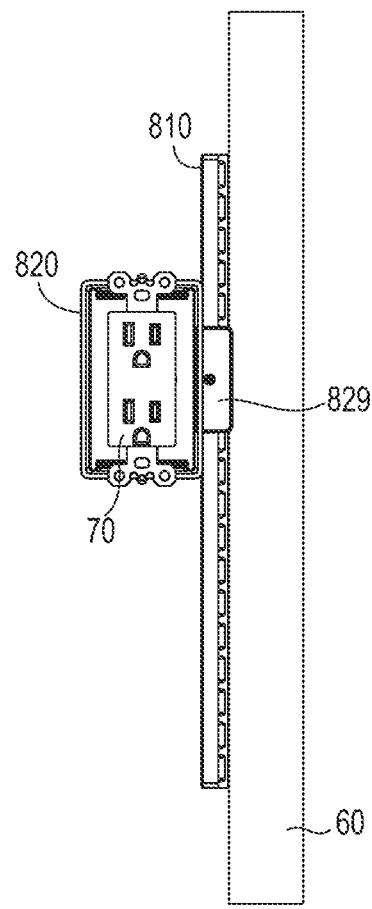

FIGS. 61A and 61B illustrate exploded perspective and front views, respectively, of the one-way adjustable gang box assembly 820 and mounting rail system 810.

Figure 62A:
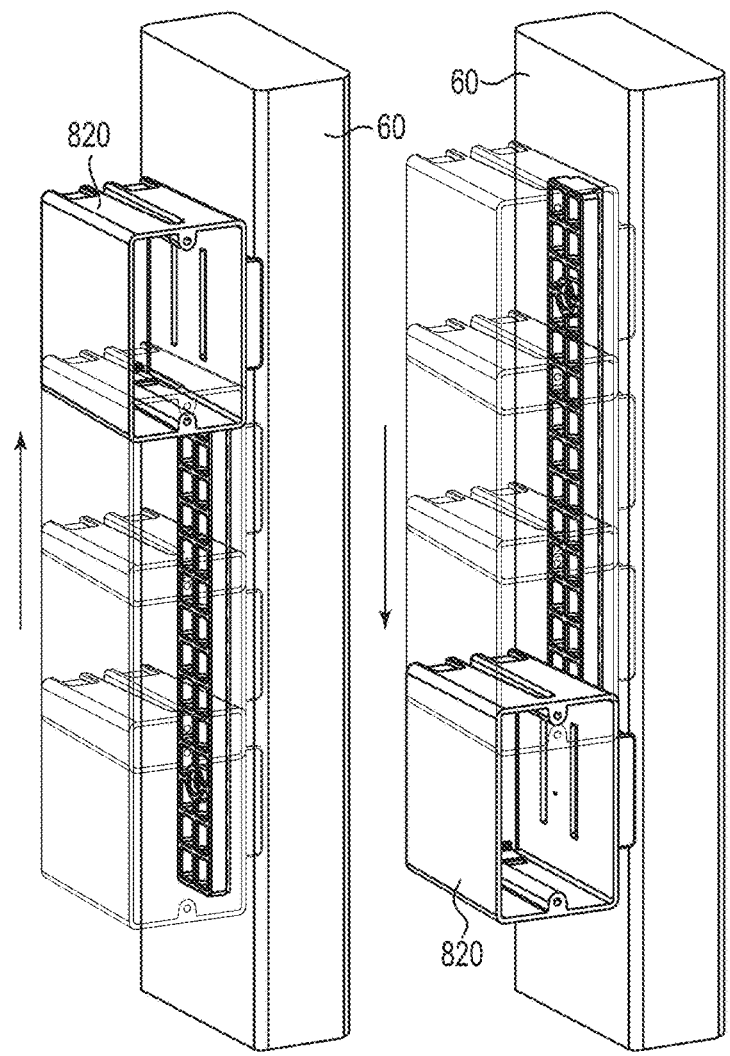
FIGS. 62A and 62B illustrate a perspective view of the one-way adjustable gang box assembly on the mounting rail and a standalone perspective view of the one-way adjustable gang box member with an elongate channel bounded by L-shaped side walls to engage the mounting rail.
Figure 62B:
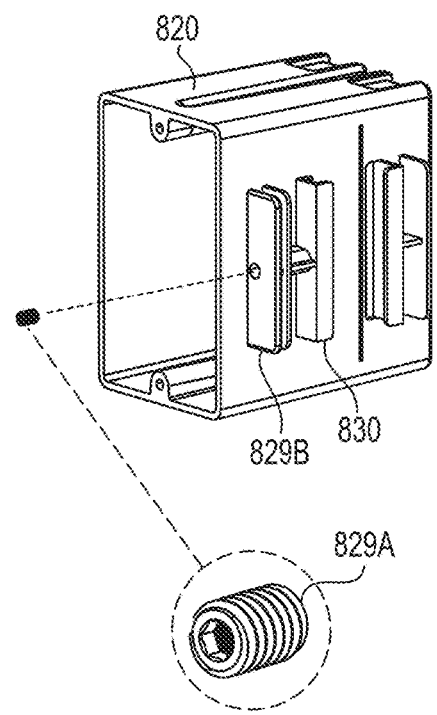
Figure 64A:
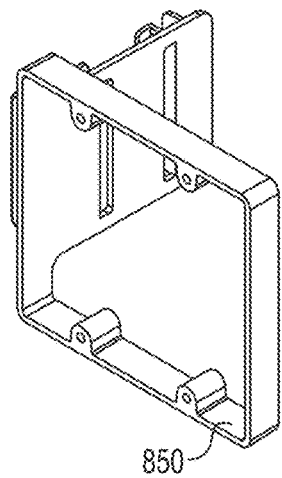
FIG. 64A-64G illustrate front and rear perspective, front and back, side and top and bottom views of a two-gang mud ring device used with the mounting rail system.
Figure 64B:
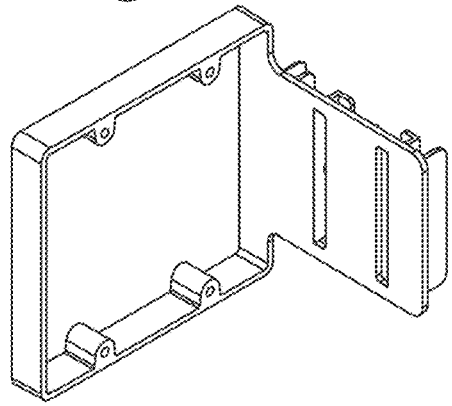
Figure 64G:
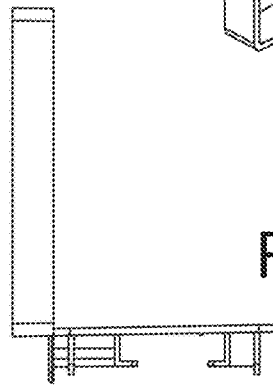
Figure 64D:
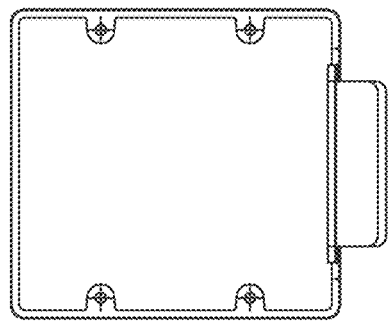
Figure 64E:
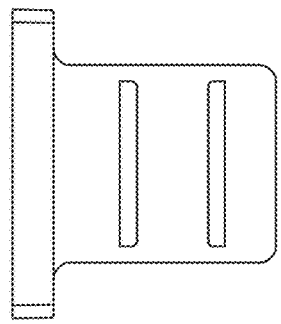
Figure 64C:
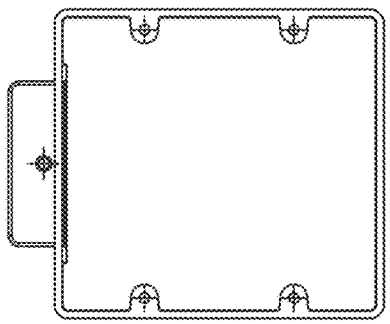
Figure 64F:
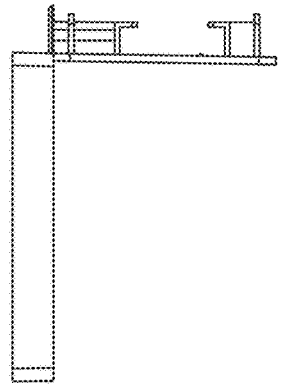
Figure 65A:
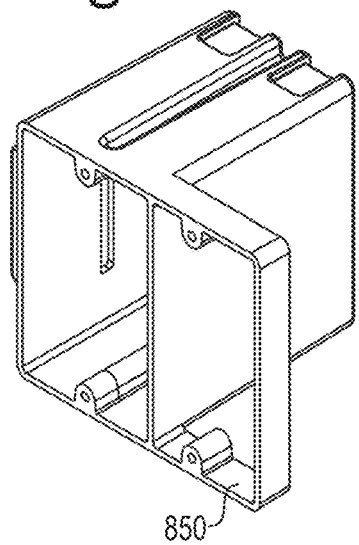
FIGS. 65A-65G illustrate front and elevated perspective, side, front and rear and top and bottom views of a single gang box and a single mud ring device used with the mounting rail system.
Figure 65B:
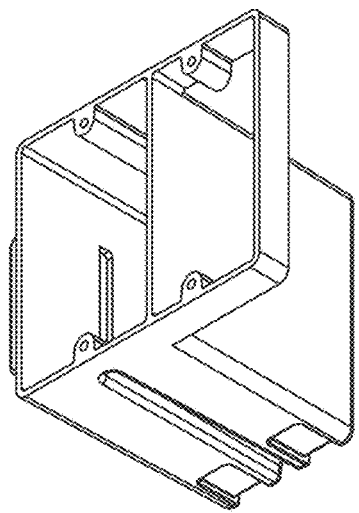
Figure 65G:
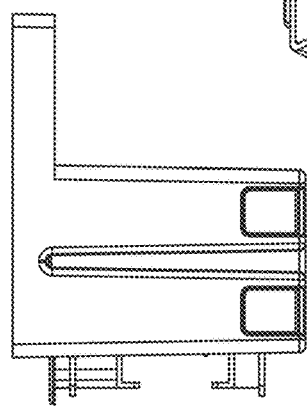
Figure 65D:
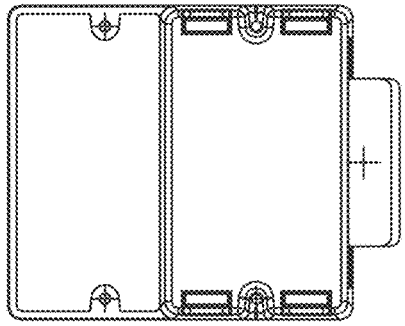
Figure 65E:
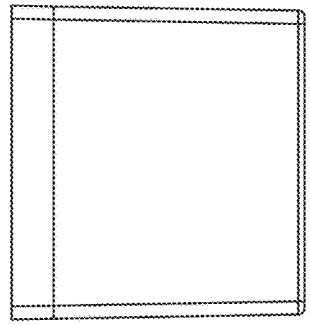
Figure 65C:
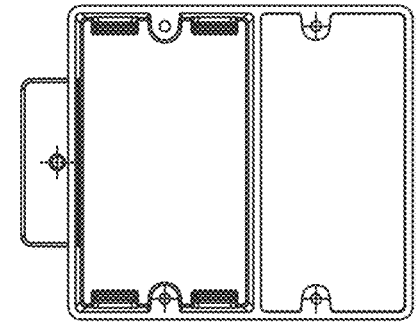
Figure 65F:
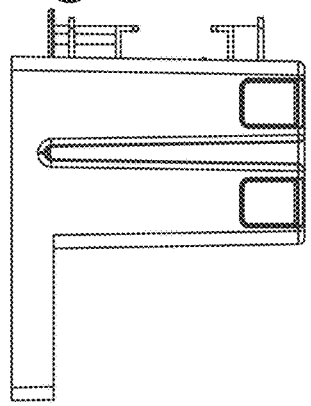
Figure 66A:
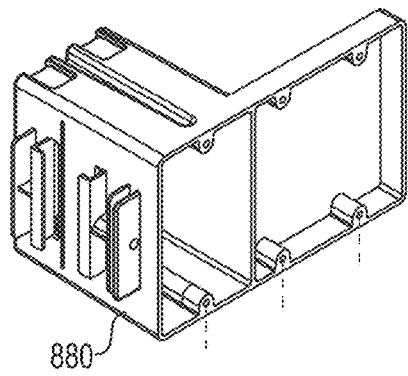
FIGS. 66A-66G illustrate front and elevated perspective, front, right and left side, and top and bottom views of a single gang box and a two gang mud ring device used with the mounting rail system.
Figure 66B:
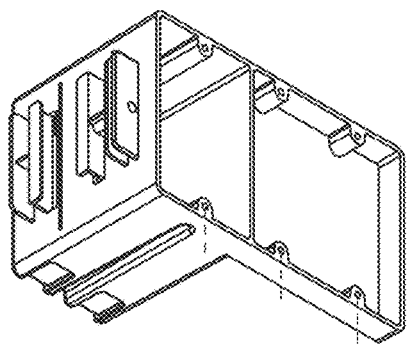
Figure 66G:
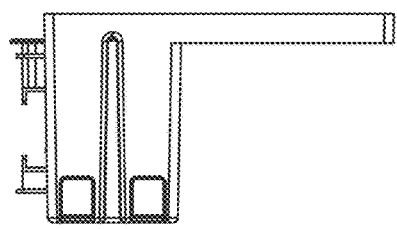
Figure 66E:
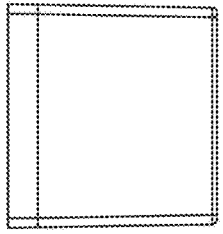
Figure 66C:
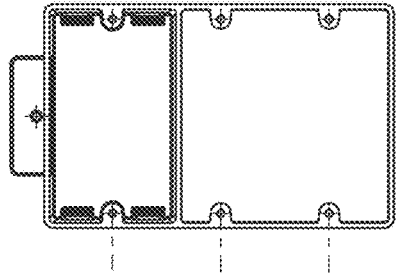
Figure 66D:
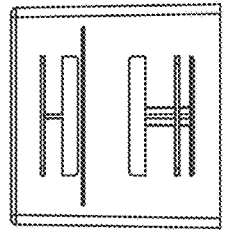
Figure 66F:
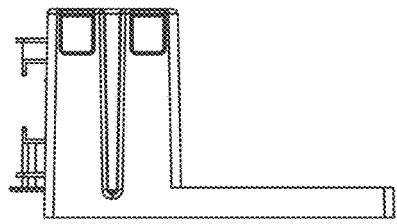
Figure 67B:
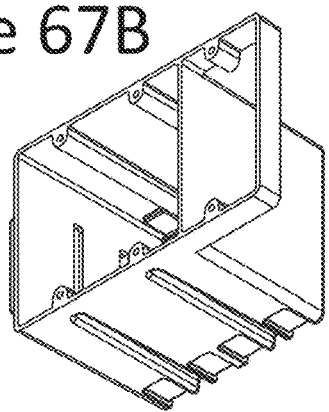
FIGS. 67A-67G illustrate front and elevated perspective, side, front and rear and top and bottom views of a two-gang box and a single mud ring device used with the mounting rail system.
Figure 67G:
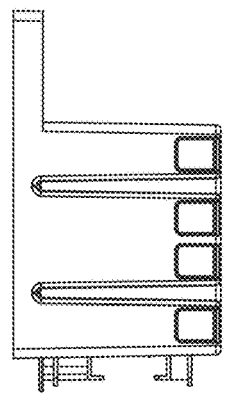
Figure 67D:
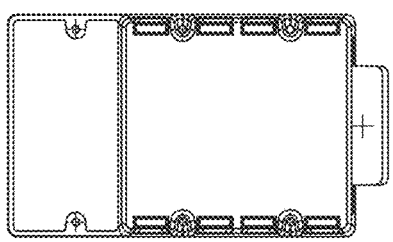
Figure 67E:
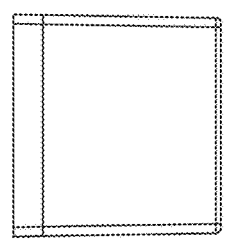
Figure 67C:
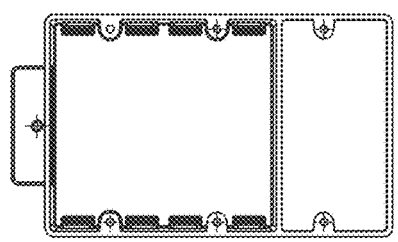
Figure 67F:
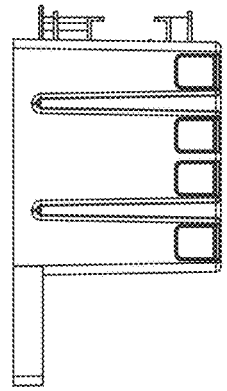
Figure 67A:
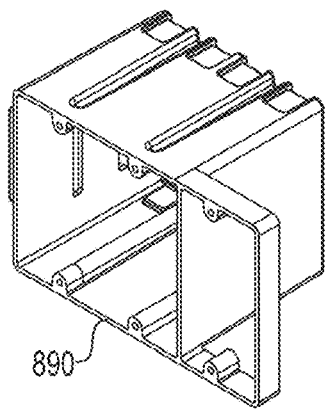

FIGS. 62A and 62B illustrate a perspective view of the one-way adjustable gang box assembly 820 on the mounting rail 810 and a standalone perspective view of the one-way adjustable gang box member 820 with an elongate channel bounded by L-shaped side walls 830 to engage the mounting rail 810.

FIGS. 63A-63F illustrate perspective, front, right and left side, top and bottom views of a single gang mud ring device 840 used with the mounting rail system 810.

FIG. 64A-64G illustrate front and rear perspective, front and back, side and top and bottom views of a two-gang mud ring device 850 used with the mounting rail system 810.

FIGS. 65A-65G illustrate front and elevated perspective, side, front and rear and top and bottom views of a single gang box and a single mud ring device 860 used with the mounting rail system 810.

FIGS. 66A-66G illustrate front and elevated perspective, front, right and left side, and top and bottom views of a single gang box and a two mud ring device 870 used with the mounting rail system 810.

FIGS. 67A-67G illustrate front and elevated perspective, side, front and rear and top and bottom views of a two-gang box and a single mud ring device 890 used with the mounting rail system 810.

FIGS. 68A-68F illustrate perspective, front, right and left side, top and bottom views of a two-gang box and two-mud ring device 900 used with the mounting rail system 810.

The following patents are incorporated by reference in their entireties: U.S. Pat. Nos. 2,962,281, 5,072,523, 5,966, 828, 6,230,464, 6,233,838, 6,857,197, 7,373,730, 8,403,289, 9,397,491, 9,735,557, 4,241,510, 4,890,391, 6,958,448, 6,967,284, and 7,503,126.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A mounting rail and gang box member installation system for placing a gang box on a wall structure comprising:
   an elongate mounting rail assembly with a longitudinal axis therethrough having an elongate body adapted to be attached to the wall structure, the elongate body having a rail configuration that includes an elongate base portion with a first width adapted to be in contact with the wall structure and an elongate front portion with a second width extending laterally from the elongate base portion, wherein the elongate base and front portions in combination form longitudinal side channels on both sides of the elongate body thereby forming the rail configuration;
   a laterally extendable box assembly adapted to be mounted on the longitudinal side channels of the mounting rail assembly via an open rail channel formed on a surface of the extendable box assembly thereby facilitating longitudinal movement of the extendable box assembly along the mounting rail assembly, the extendable box assembly including a stop member adapted to affix the extendable box assembly at a desired longitudinal position along the rail assembly, the extendable box assembly configured from a first box and a second box adapted to fit over the first box in a concentric configuration; and
   a gang box member adapted to be mounted on a surface of the extendable box assembly, the mounting surface of the extendable box assembly disposed laterally away from the rail assembly and including upper and lower U-shaped latching members adapted to receive a side of the gang box member having corresponding slider rails, the corresponding slider rails disposed on an upper and lower portion of the gang box member adjacent to U-shaped latching members, the gang box member having an open end forming a plane that is parallel to the longitudinal axis of the mounting rail assembly.

2. The system of the claim 1 wherein the first width of the elongate base portion of the elongate body of the mounting rail assembly is less than the second width of the elongate front portion.

3. The system of the claim 1 wherein the first width of the elongate base portion of the elongate body of the mounting rail assembly is greater than the second width of the elongate front portion.

4. The system of the claim 1 wherein the elongate front portion of the mounting rail assembly includes a plurality of apertures formed through the elongate front portion of the mounting rail assembly, each of the apertures adapted to receive a cable or wire member fastener for securing the cable or wire member to the elongate body.

5. The system of claim 1 wherein the first box and second box of the extended box assembly are configured to include at least one of a frictional fit or a latching mechanism to facilitate lateral movement between the first box and the second box, thereby moving a horizontal location of the gang box member.

6. The system of claim 5 wherein the latching mechanism includes a tab member protruding upwards from the first box and tab receiving apertures on the second box that in combination facilitate lateral horizontal movement between the first and second boxes into predetermined fixed locations or positions.

7. The system of claim 1 wherein the gang box member includes an in-out tab member adapted to fit on the gang box member to slidably engage the extendable box assembly, wherein the in-out tab member is adapted to allow the gang box member to move forward and backward from the wall structure.

8. The system of claim 1 wherein the mounting rail assembly includes a plurality of apertures formed therethrough which are adapted to receive a cable or wire member fastener for securing the cable or wire member to the elongate body.

9. The system of claim 1 wherein the gang box member includes at least one from the group comprising a single gang box, a multiple gang box, a single mud ring member, a multiple mud ring member and a combination mud ring and gang box member.

10. A mounting rail and gang box member installation system for placing a gang box on a wall structure comprising:
    an elongate mounting rail assembly with a longitudinal axis therethrough having an elongate body adapted to be attached to the wall structure, the elongate body having a rail configuration that includes an elongate base portion with a first width adapted to be in contact with the wall structure and an elongate front portion with a second width extending laterally from the elongate base portion, wherein the elongate base and front portions in combination form longitudinal side channels on both sides of the elongate body thereby forming the rail configuration;
    a gang box member mounting bracket assembly adapted to be mounted on the longitudinal side channels of the mounting rail assembly via a rail channel structure formed on a surface of the gang box member mounting bracket assembly thereby facilitating longitudinal movement of a gang box member along the mounting rail assembly, the gang box member mounting bracket assembly including a stop member adapted to affix the gang box member mounting bracket assembly at a desired longitudinal position along the rail assembly; and
    a slidable gang box member adapted to be mounted on the gang box member mounting bracket assembly, such mounting surface of the extendable box assembly disposed laterally away from the rail assembly and including upper and lower U-shaped latching members adapted to receive a side of the gang box member having corresponding slider rails, wherein the slidable gang box member includes an in-out tab member adapted to fit on the gang box member to slidably engage the mounting bracket assembly, wherein the in-out tab member is adapted to allow the gang box member to move horizontally forward and backward from the wall structure.

11. The system of the claim 10 wherein the first width of the elongate base portion of the elongate body of the mounting rail assembly is less than the second width of the elongate front portion.

12. The system of the claim 10 wherein the first width of the elongate base portion of the elongate body of the mounting rail assembly is greater than the second width of the elongate front portion.

13. The system of the claim 10 wherein the elongate front portion of the mounting rail assembly includes a plurality of apertures formed through the elongate front portion of the mounting rail assembly, each of the apertures adapted to receive a cable or wire member fastener for securing the cable or wire member to the elongate body.

14. The system of claim 10 wherein the stop member includes a socket screw disposed within an aperture in the rail channel structure of the gang box member mounting bracket adjacent the mounting rail assembly.

15. The system of claim 10 wherein the in-out tab member in combination with the mounting bracket assembly allow for a plurality of increments of horizontal movement in a Z-direction.

16. The system of claim 10 wherein the slidable gang box member includes at least one from the group comprising a single gang box, a multiple gang box, a single mud ring member, a multiple mud ring member and a combination mud ring and gang box member.

17. A mounting rail and gang box member installation system for placing a gang box on a wall structure comprising:

an elongate mounting rail assembly with a longitudinal axis therethrough having an elongate body adapted to be attached to the wall structure, the elongate body having a rail configuration that includes an elongate base portion with a first width adapted to be in contact with the wall structure and an elongate front portion with a second width extending laterally from the elongate base portion, wherein the elongate base and front portions in combination form longitudinal side channels on both sides of the elongate body thereby forming the rail configuration; and a slidable gang box member adapted to be mounted on the longitudinal side channels of the mounting rail assembly via a rail channel structure formed on a surface of the slidable gang box member to facilitate longitudinal movement of the gang box member along the mounting rail assembly, the rail channel structure including a stop member mechanism adapted to affix the slidable gang box member at a desired longitudinal position along the rail assembly.

18. The system of claim 17 wherein the rail channel structure includes at least two L-shaped sidewalls protruding outward from a side of the slidable gang box member, wherein the L-shaped sidewalls are adapted to fit about the rail configuration of the mounting rail assembly.

19. The system of claim 18 wherein the stop member mechanism includes a socket screw and an aperture in one of the sidewalls adapted to make frictional contact with the rail assembly to affix the slidable gang box member at a desired vertical position along the rail assembly.

20. The system of claim 17 wherein the slidable gang box member includes at least one from the group comprising a single gang box, a multiple gang box, a single mud ring member, a multiple mud ring member and a combination mud ring and gang box member.

* * * * *